(12) United States Patent
Jagannatha et al.

(10) Patent No.: US 10,877,998 B2
(45) Date of Patent: Dec. 29, 2020

(54) HIGHLY ATOMIZED SEGMENTED AND INTERROGATABLE DATA SYSTEMS (HASIDS)

(71) Applicants: Ravi Jagannatha, Plano, TX (US); Durga Prasad Turaga, Murphy, TX (US)

(72) Inventors: Ravi Jagannatha, Plano, TX (US); Durga Prasad Turaga, Murphy, TX (US)

(73) Assignee: Durga Turaga, Murphy, TX (US)

( * ) Notice: Subject to any disclaimer, the term of this patent is extended or adjusted under 35 U.S.C. 154(b) by 237 days.

(21) Appl. No.: 15/712,325

(22) Filed: Sep. 22, 2017

(65) Prior Publication Data

US 2019/0012361 A1 Jan. 10, 2019

Related U.S. Application Data

(60) Provisional application No. 62/529,465, filed on Jul. 6, 2017.

(51) Int. Cl.
| | |
|---|---|
| G06F 16/20 | (2019.01) |
| G06F 16/28 | (2019.01) |
| G06F 17/30 | (2006.01) |
| G06F 16/2455 | (2019.01) |
| G06F 16/22 | (2019.01) |

(52) U.S. Cl.
CPC ........ *G06F 16/285* (2019.01); *G06F 16/2228* (2019.01); *G06F 16/24554* (2019.01); *G06F 16/24568* (2019.01); *G06F 17/30486* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 8,527,544 B1 * | 9/2013 | Colgrove | G06F 3/0608 707/791 |
| 9,424,321 B1 * | 8/2016 | Miller | G06F 16/24575 |
| 9,639,589 B1 * | 5/2017 | Theimer | G06F 11/1461 |
| 2002/0138464 A1 * | 9/2002 | Calascibetta | G06F 16/24524 |
| 2004/0006455 A1 * | 1/2004 | Fux | G06F 40/216 704/4 |

(Continued)

OTHER PUBLICATIONS

International Search Report and Written Opinion—PCT/US2018/040877—ISA/EPO—dated Apr. 29, 2019.

(Continued)

*Primary Examiner* — Jau Shya Meng
(74) *Attorney, Agent, or Firm* — Muncy, Geissler, Olds & Lowe, P.C.

(57) ABSTRACT

Systems and methods for data interrogation and investigation using the exemplary Highly Atomized Segmented and Interrogatable Data System (HASIDS) include receiving a source set of data elements and associating a common key with each of at least a subset of the source set of data elements. One or more unary keysets are generated, with each unary keyset corresponding to one of the data elements of the subset, and each unary keyset being single-dimensional and comprising the common key. The HASIDS allows flexible querying and efficient storage and processing of the unary keysets.

20 Claims, 50 Drawing Sheets

(56) References Cited

U.S. PATENT DOCUMENTS

| | | | |
|---|---|---|---|
| 2005/0273584 A1* | 12/2005 | Wisecup | G06F 9/4401 713/1 |
| 2011/0083167 A1* | 4/2011 | Carpenter | G06F 16/2228 709/217 |
| 2015/0286681 A1* | 10/2015 | Baer | G06F 16/24554 707/754 |
| 2016/0180019 A1* | 6/2016 | Van Rooyen | G06N 3/002 702/19 |
| 2017/0046367 A1* | 2/2017 | Chang | G06F 16/215 |
| 2017/0063976 A1* | 3/2017 | Bohling | H04L 67/1008 |
| 2017/0116278 A1* | 4/2017 | Baby | G06F 16/27 |
| 2017/0147576 A1* | 5/2017 | Des Jardins | G10L 15/063 |

OTHER PUBLICATIONS

Stone Paul, et al., "Review of Relational Algebra for Query Processing in Dynamic Distributed Federated Databases", Sep. 30, 2010 (Sep. 30, 2010), XP055195990, Retrieved from the Internet: URL: http://www.usukita.org/papers/6027/TA3_21_Stone_review_of_relational.pdf [retrieved on Jun. 16, 2015] the whole document.
Hannula Miika, et al., "On Independence Atoms and Keys", Confernece on Information and Knowledge Management, Act, 2 Penn Plaza, Suite 701 New Yourk NY 10121-0701 USA, Nov. 3, 2014 (Nov. 3, 2014), pp. 1229-1238, XP058061105, DOI: 10.1145/2662058 ISBN: 978-1-4503-2598-1 the whole document.

* cited by examiner

| Order-Number | Order-Date | Product | Manufacturer | Department | Quantity | Cost | Tax | Total |
|---|---|---|---|---|---|---|---|---|
| 243008 | May 12, 2017 | 45" LED-TV | ACME | Electronics | 2 | $800 | $80 | $880 |
| 243010 | Feb 31, 2017 | DVD_Flip Top | ZNITH | Electronics | 1 | $40 | $4 | $44 |
| . | . | . | . | . | . | . | . | . |
| 243031 | Jan 4, 2017 | 50" LED-TV | KRAK | Electronics | 1 | $600 | $60 | $660 |

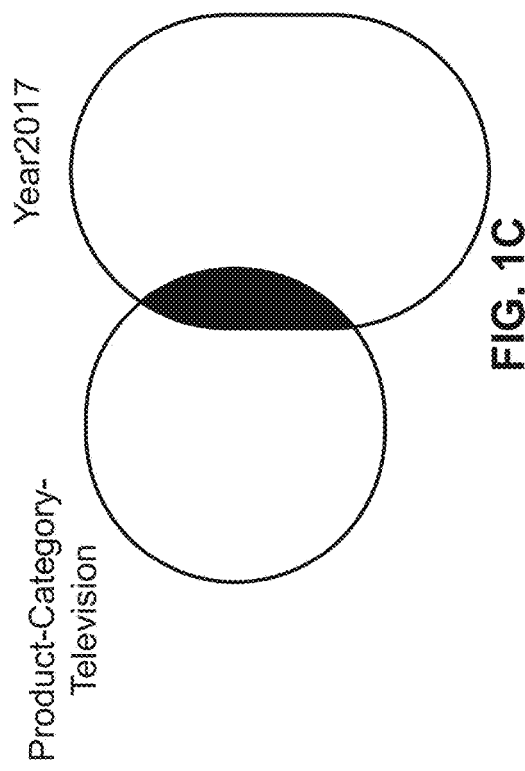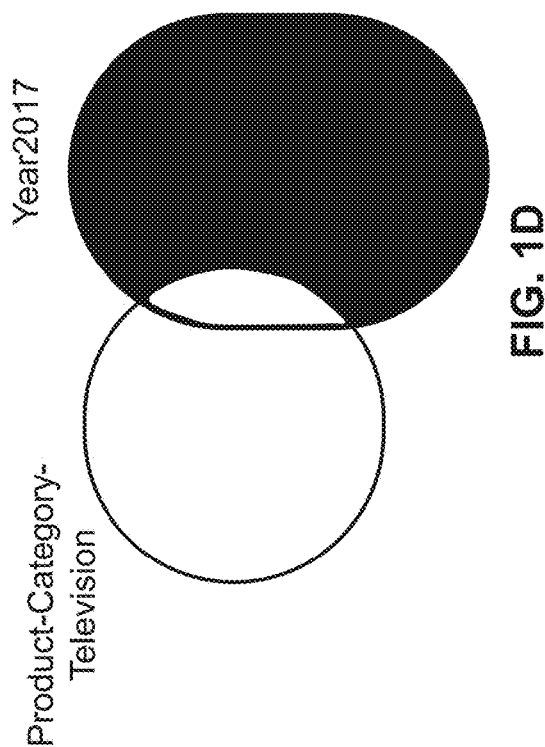

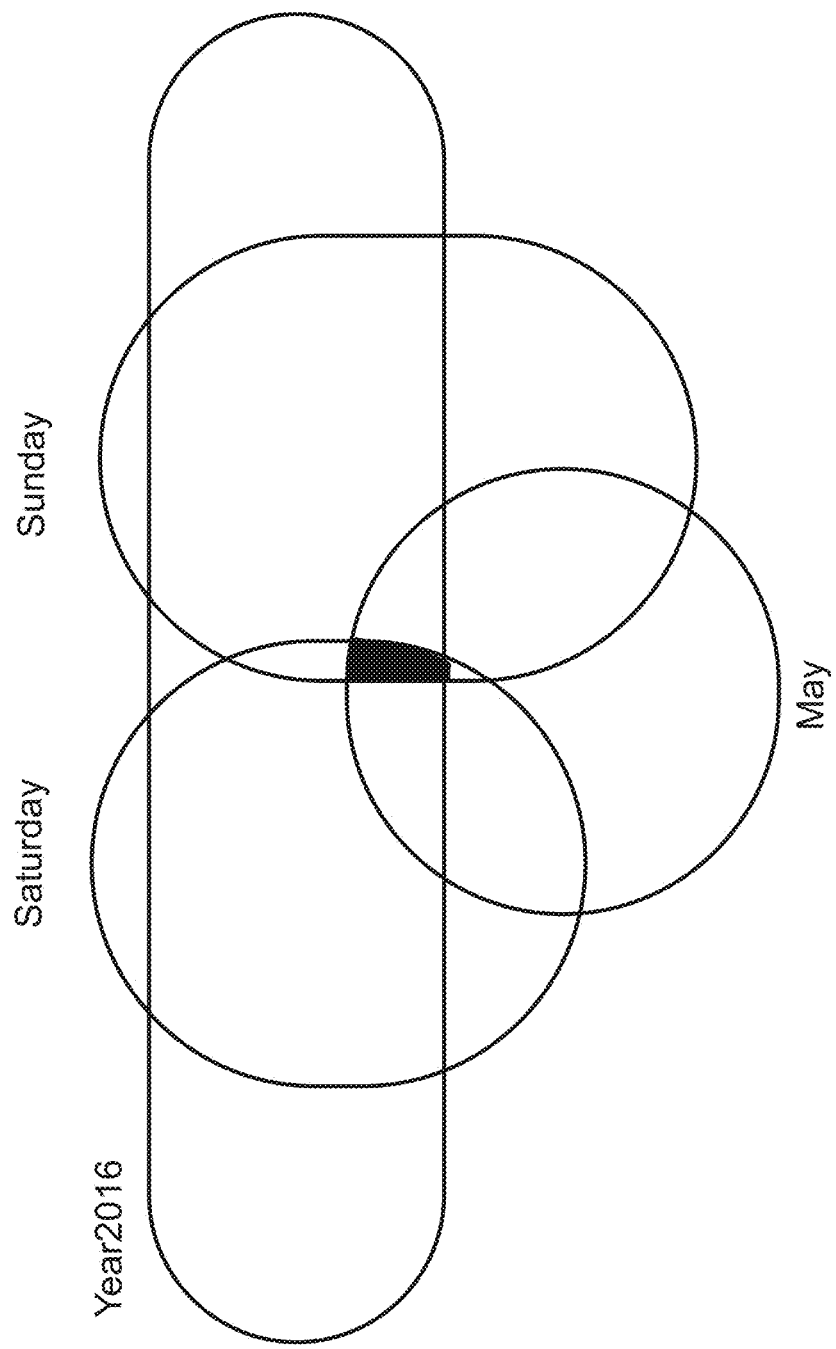

| Order-Number | Quantity | Cost | Tax | Total |
|---|---|---|---|---|
| 243008 | 2 | $800 | $80 | $880 |
| 243010 | 1 | $40 | $4 | $44 |
| - | - | - | - | - |
| 243031 | 1 | $600 | $60 | $660 |

| Order-Number | Product | Manufacturer | Department | Quantity | Cost | Tax | Total |
|---|---|---|---|---|---|---|---|
| 243008 | 45" LED-TV | ACME | Electronics | 2 | $800 | $80 | $880 |
| 243010 | DVD_FlipTop | ZNITH | Electronics | 1 | $40 | $4 | $44 |
| ... | ... | ... | ... | ... | ... | ... | ... |
| 243031 | 50" LED-TV | KRAK | Electronics | 1 | $600 | $60 | $660 |

FIG. 1I

| Order-Number | Quantity | Cost | Tax | Total |
|---|---|---|---|---|
| 243008 | 2 | $800 | $80 | $880 |
| 243010 | 1 | $40 | $4 | $44 |
| ... | ... | ... | ... | ... |
| 243031 | 1 | $600 | $60 | $660 |

FIG. 1J

| Key | Sex |
|---|---|
| M | Males |
| F | Female |
| O | Other |
| U | Undisclosed |

FIG. 1K

| OLTP | Data Warehouse | HASIDS | HASIDS Data Structure |
|---|---|---|---|
| Object Entity (Customer, Store, Employee) | Dimension (e.g. Customer, Store, Employee) | Dimension Cluster (e.g. Customer atomized, Store atomized, Employee atomized) | Single key datasets |
| Transaction Entity (Order, order detail) | Fact (Sales) | Fact Cluster with fact related dimensions atomized | Single key datasets with facts |
| Document Entity | N/A | Document Cluster with words in document atomized | Words = dimension (single key datasets); document name = fact (tuple dataset with key and document name) |
| Relationship Entity | Relationship Entity (star/snow-flake joins) | Dynamic runtime context association driven by Meta Cluster | Tuple datasets with two keys |

FIG. 2

| HASIDS METADATA - SOURCE DEFINITION (101A/101B) | | | | | |
|---|---|---|---|---|---|
| SOURCE NAME | SOURCE CATEGORY | SOURCE PLATFORM | SOURCE TYPE | SOURCE SERVER | SOURCE URL |
| S_Customer | OLTP | RDBMS | SQL Server | <Source Server TCP/IP> | <connection string> |
| S_Revenue | OLTP | RDBMS | Oracle | <Source Server TCP/IP> | <connection string> |
| S_Service | DOCUMENT | FILE SERVER | Word | <File Server name and mapping> | <drive mapping> |
| S_Revenue_ODS | OLAP | RDBMS | Oracle | <Source Server TCP/IP> | <connection string> |

| HASIDS METADATA - CLUSTER/SUBJECT DEFINITION (101C/101D) | | | | | |
|---|---|---|---|---|---|
| CLUSTER / SUBJECT NAME | CLUSTER ID | CLUSTER ID SOURCE | CLUSTER OBJECT | CLUSTER ID OBJECT | CLUSTER ID ATTRIBUTE |
| CUSTOMER | Customer Id | S_Customer | CUSTOMER | | CUST_ID |
| REVENUE | Order Id | S_Revenue | ORDER | | ORDER_ID |
| SERVICE DOCUMENTS | Document Id | Internal Sequence | OBJ_DOC_SEQ | | NEXT VALUE |
| PARTS - INVENTORY | Inventory Id | S_Parts | | <INV_MAIN> | <PART_ID> |

| | | | | | | | | | | | |
|---|---|---|---|---|---|---|---|---|---|---|---|
| HASIDS METADATA : ELEMENT CLUSTER DEFINITION (101E/101F) | | | | | | | | | | | |
| SUBJECT | ELM. CLUSTER | TYPE | SOURCE | SOURCE OBJ | SOURCE ATTR | REF OBJ | REF ATTR | CTX OBJ | CTX ATTR | DOMAIN CTX KEYS | DOMAIN CTX VALUES | HASIDS FUNCTION |
| Customer | State | Relational | S_Customer | CUSTOMER | STATE | STATE | ID | STATE | CODE | | | |
| Customer | Customer Type | Relational | S_Customer | CUSTOMER | CUST_TYP | CUSTOMER_TYP | ID | CUSTOMER_TYP | VALUE | | | |
| Customer | Race | Relational | S_Customer | CUSTOMER | RACE | RACE | ID | RACE | VALUE | | | |
| Customer | Sex | Domain | S_Customer | CUSTOMER | SEX | | | | | M,F,O | Male, Female, Other | |
| Customer | Registration Date Day of Month | Derived | S_Customer | CUSTOMER | REG_DATE | | | | | | | DayOfMonth |
| Customer | Registration Date Month of Year | Derived | S_Customer | CUSTOMER | REG_DATE | | | | | | | MonthOfYear |
| Customer | Registration Date Year | Derived | S_Customer | CUSTOMER | REG_DATE | | | | | | | Year |
| Customer | Registration Date Day of Week | Derived/ Extended | S_Customer | CUSTOMER | REG_DATE | | | | | | | DayOfWeek |

UNARY/BOS DATASET Naming Convention: DS_<CLUSTER>_<ELM. CLUSTER>_<KEY VALUE>

HASIDS METADATA : GENERATE ATTRIBUTE VALUE SOURCE MAPPING (101G)

| SUBJECT | CONTEXT | ATOMIC CTX | SOURCE | SOURCE OBJ | SOURCE ATTR | DATA CLAUSE |
|---|---|---|---|---|---|---|
| CUSTOMER | STATE | AL | S_Customer | Customer | STATE | "= 1" |
| CUSTOMER | STATE | AR | S_Customer | Customer | STATE | "= 2" |
| CUSTOMER | STATE | AK | S_Customer | Customer | STATE | "= 3" |
| CUSTOMER | STATE | AA | S_Customer | Customer | STATE | "= 4" |
| CUSTOMER | CUSTOMER TYPE | Individual | S_Customer | Customer | CUST_TYP | "= 1" |
| CUSTOMER | CUSTOMER TYPE | Business | S_Customer | Customer | CUST_TYP | "= 2" |
| CUSTOMER | CUSTOMER TYPE | Institution | S_Customer | Customer | CUST_TYP | "= 3" |
| CUSTOMER | CUSTOMER TYPE | Government | S_Customer | Customer | CUST_TYP | "= 4" |
| CUSTOMER | RACE | Hispanic | S_Customer | Customer | RACE | "= 1" |
| CUSTOMER | RACE | Asian | S_Customer | Customer | RACE | "= 2" |
| CUSTOMER | RACE | Black American | S_Customer | Customer | RACE | "= 3" |
| CUSTOMER | RACE | White | S_Customer | Customer | RACE | "= 4" |
| CUSTOMER | RACE | Pacific Islander | S_Customer | Customer | RACE | "= 5" |
| CUSTOMER | RACE | Native American | S_Customer | Customer | RACE | "= 6" |
| CUSTOMER | SEX | M | S_Customer | Customer | SEX | " = 'M'" |
| CUSTOMER | SEX | F | S_Customer | Customer | SEX | " = 'F'" |
| CUSTOMER | SEX | O | S_Customer | Customer | SEX | " = 'O'" |

FIG. 10C

UNARY/BOS DATASET Naming Convention: DS_<CLUSTER>_<ELM. CLUSTER>_<KEY VALUE>

| | HASIDS METADATA: GENERATE METADATA (101H(a)) | | | |
|---|---|---|---|---|
| SUBJECT | CONTEXT | ATOMIC CTX | DATASET | LANGUAGE TOKENS |
| CUSTOMER | STATE | AL | DS_CUST_State_AL | Alabama |
| CUSTOMER | STATE | AR | DS_CUST_State_AR | Arizona |
| CUSTOMER | CUSTOMER TYPE | Individual | DS_CUST_CST_Individual | Individuals |
| CUSTOMER | CUSTOMER TYPE | Business | DS_CUST_CST_Business | Businesses |
| CUSTOMER | RACE | Hispanic | DS_CUST_RACE_Hispanic | Latin American |
| CUSTOMER | RACE | Asian | DS_CUST_RACE_Asian | Asians |
| CUSTOMER | RACE | Nat. American | DS_CUST_RACE_Na_American | Natives, Red Indians |
| CUSTOMER | SEX | M | DS_CUST_SEX_M | Males |
| CUSTOMER | SEX | F | DS_CUST_SEX_F | Females |
| CUSTOMER | SEX | O | DS_CUST_SEX_O | Others |
| CUSTOMER | ZIP | 35001 | DS_CUST_Zip_35001 | zip, zip code 35001 |
| CUSTOMER | ZIP | 75002 | DS_CUST_Zip_75002 | zip, zip code 75002 |
| CUSTOMER | REG DATE YEAR | 1969 | DS_CUST_RD_Year_1969 | Registration year |
| CUSTOMER | REG DATE YEAR | 1997 | DS_CUST_RD_Year_1997 | Registration year |
| CUSTOMER | REG DATE MNTH | Jan | DS_CUST_RD_Month_Jan | Registered, registration month;January |
| CUSTOMER | REG DATE MNTH | Sep | DS_CUST_RD_Month_Sep | Registration month;September |

FIG. 10D

BOBSS DATASET Naming Convention: DS_<CLUSTER>_<ELEMENT CLUSTER>

HASIDS METADATA: GENERATE METADATA(101H(b))

| SUBJECT | CONTEXT | ATOMIC CTX | DATASET | LANGUAGE_TOKENS | UTF CODE |
|---|---|---|---|---|---|
| CUSTOMER | STATE | AL | DS_CUST_State | Alabama | 1 |
| CUSTOMER | STATE | AR | DS_CUST_State | Arizona | 2 |
| CUSTOMER | CUSTOMER TYPE | Individual | DS_CUST_CUSTOMER_TYPE | Individuals | 1 |
| CUSTOMER | CUSTOMER TYPE | Business | DS_CUST_CUSTOMER_TYPE | Businesses | 2 |
| CUSTOMER | RACE | Hispanic | DS_CUST_RACE | Latin American | 1 |
| CUSTOMER | RACE | Asian | DS_CUST_RACE | Asians | 2 |
| CUSTOMER | SEX | M | DS_CUST_SEX | Males | 1 |
| CUSTOMER | SEX | F | DS_CUST_SEX | Females | 2 |
| CUSTOMER | ZIP | 35001 | DS_CUST_ZIP | zip, zip code 35001 | 1 |
| CUSTOMER | ZIP | 75002 | DS_CUST_ZIP | zip, zip code 75002 | 10 |
| CUSTOMER | REGISTRATION DATE YEAR | 1969 | DS_CUST_RD_YEAR | Registered, registration year, 1969 | 1 |
| CUSTOMER | REGISTRATION DATE YEAR | 1997 | DS_CUST_RD_YEAR | Registered, registration year, 1997 | 29 |
| CUSTOMER | REGISTRATION DATE MONTH | Jan | DS_CUST_RD_MONTH | Registered, registration month;January, Jan | 1 |
| CUSTOMER | REGISTRATION DATE MONTH | Sep | DS_CUST_RD_MONTH | Registered, registration month;September, Sep | 9 |

THE UTF CODES ARE UTF VALUES; A UNIQUE CODE ASSIGNED TO A COMBINATION OF SUBJECT, CONTEXT AND ATOMIC CONTEXT

FIG. 10E

COMPARISON OF STRUCTURES: UNARY, BOS AND BOBSS

UNARY REPRESENTATION OF THE RACE CONTEXT WITHIN THE CUSTOMER SUBJECT FOR A SEGMENT SEGMENT START = 1000001; SEGMENT END = 1000025

| DS_CUST_RACE_ BLACK | DS_CUST_RACE_ WHITE | DS_CUST_RACE_ ASIAN | DS_CUST_RACE_ HISPANIC |
|---|---|---|---|
| 1000001 | 1000002 | 1000006 | 1000009 |
| 1000004 | 1000003 | 1000007 | 1000010 |
| 1000011 | 1000005 | 1000008 | 1000016 |
| 1000015 | 1000012 | 1000014 | 1000017 |
| 1000018 | 1000013 | 1000019 | 1000020 |
| 1000023 | 1000024 | 1000025 | 1000021 |

BOS REPRESENTATION OF THE RACE CONTEXT WITHIN THE CUSTOMER SUBJECT FOR A SEGMENT; SEGMENT START = 1000001; SEGMENT END = 1000025; 0 – ID IN THAT POSITION AT AN OFFSET FROM SEGMENT LOW IS FALSE; 1 – ID IN THAT POSITION AT AN OFFSET FROM SEGMENT LOW IS TRUE

| DATASET NAME | DATA |
|---|---|
| DS_CUST_RACE_BLACK | 1001000000100010010000100 |
| DS_CUST_RACE_WHITE | 0110100000110000000000010 |
| DS_CUST_RACE_ASIAN | 0000011100001000010000001 |
| DS_CUST_RACE_HISPANIC | 0000000011000001000110000 |

BOBSS REPRESENTATION OF THE RACE CONTEXT WITHIN THE CUSTOMER SUBJECT FOR A SEGMENT; SEGMENT START = 1000001; SEGMENT END = 1000025; A POSITION OFFSET REPRESENTS BOTH THE ID CALCULATED AS OFFSET FROM SEGMENT LOW AS WELL AS THE ATOMIC CONTEXT IT REPRESENTS

| DATASET NAME | DATA |
|---|---|
| DS_CUST_RACE | ABBABCCDDABBCADDACDD0ABC |

A – BLACK, B – WHITE, C – ASIAN, D – HISPANIC

FIG. 10F

COMPARISON OF STRUCTURES: UNARY, BOS AND BOBSS

| DATABASE STRUCTURE | STORAGE | OPTIMIZED STORAGE | MEMORY | OPTIMIZED MEMORY | OPERATIONS |
|---|---|---|---|---|---|
| UNARY | | | | | |
| VALUES <= 1 | 225 | 113-150 | 1800 * No. Attr | 1800 * No. Attr | SET INTERATION |
| VALUES > 1 | 225 | 113-150 | 1800 * No. Attr | 1800 * No. Attr | SET INTERATION |
| BOS | | | | | |
| VALUES <= 1 | 50 | 25 | 64 | 64 | BITSET INTERACTION |
| VALUES > 1 | 25 * no of Values | 25 * no of Values/2 | 64 * no of Values | 64 * no of Values/2 | BITSET INTERACTION |
| BOBSS | | | | | |
| VALUES <= 1 | 25 | 25 | 64 | 64 | BITSET INTERACTION |
| VALUES > 2 <= 255 | 25 | 25 | 64 * no of Values | 64 * no of Values/2 | BITSET INTERACTION |
| VALUES (256-32767) | 50 | 50 | 64 * no of Values | 64 * no of Values/2 | BITSET INTERACTION |

FOR A SAMPLE OF 25 IDS IN THE RANGE 100001 TO 1000025 REPRESENTING AN ATTRIBUTE LIKE SEX, RACE ETC. OF A CUSTOMER SUBJECT HAVING A DOMAIN OF ATOMIC CONTEXT VALUES. ALL CALCULATIONA ARE IN BYTES. MEMORY CALCULATION DOES NOT INCLUDE VALUES FOR ANY CLASSES/STRUCTURES THAT HOLD THE DATA AS THEY VARY BY PROGRAMMING LANGUAGE LIKE C++, JAVA ETC.

FIG. 10G

COMPARISON OF STRUCTURES: UNARY, BOS AND BOBSS

| DATABASE STRUCTURE | STORAGE | OPTIMIZED STORAGE | MEMORY | OPTIMIZED MEMORY | OPERATIONS |
|---|---|---|---|---|---|
| UNARY | | | | | |
| VALUES <= 1 | 89 Million | 44 Million | 640 Million | 640 Million | SET INTERATION |
| VALUES > 1 | 89 Million | 44 Million | 640 Million | 640 Million | SET INTERATION |
| BOS (Memory = 1/8 of Raw Storage for a single attribute) | | | | | |
| VALUES <= 1 | 10 Million | 10 Million | 1.25 Million | 1.25 Million | BITSET INTERACTION |
| VALUES > 1 | 10 Mil * no of Values | 10 Mil * no values/2 | 1.25 Mil * no of Values | 1.25 Mil * no Values/2 | BITSET INTERACTION |
| VALUES = 99999 | 999,999 Million | 499,999 Million | 125 Billion | 62.5 Billion | BITSET INTERACTION |
| BOBSS | | | | | |
| VALUES <= 1 | 10 Million | 10 Million | 1.25 Million | 1.25 Million | BITSET INTERACTION |
| VALUES > 2 <= 255 | 10 Million | 10 Million | 1.25 Mil * no of Values | 1.25 Mil * no Values/2 | BITSET INTERACTION |
| VALUES (256-32767) | 20 Million | 20 Million | 1.25 Mil * no of Values | 1.25 * no of Values/2 | BITSET INTERACTION |
| VALUES = 99999 | 60 Million | 60 Million | 125 Billion | 62.5 Billion | BITSET INTERACTION |

FOR A SAMPLE OF 10 MILLION IDS IN THE RANGE 1 TO 10,000,000 REPRESENTING ONE ATTRIBUTE LIKE SEX, RACE ETC. OF A CUSTOMER SUBJECT HAVING A DOMAIN OF ATOMIC CONTEXT VALUES. ALL CALCULATIONA ARE IN BYTES. MEMORY CALCULATION DOES NOT INCLUDE VALUES FOR ANY CLASSES/STRUCTURES THAT HOLD THE DATA AS THEY VARY BY PROGRAMMING LANGUAGE LIKE C++, JAVA ETC.

FIG. 10H

| ORDER_KEY, SALES VALUE, TAX VALUE |
|---|
| 10001, 100.25, 10.02 |
| 10002, 125.90, 12.59 |
| 10003, 78.00, 7.80 |
| 10004, 376.54, 37.65 |

UNARY KEY BASED FACT SET

| | SEGMENT LOW: 10001 |
| --- | --- |
| | SEGMENT HIGH: 10010 |

| DATASET NAME | DATA |
|---|---|
| DS_ORDERS_SALES | 0000000000010025000000000001259000000000000780 0000000000000000000000000000000000000000000000000000000000000000000000000000000000000000000000000000000000000000000000003765400000000000000000000000000000000000000000000 |
| DS_ORDERS_TAX | 0000000000001002000000000000125900000000000078 00000000000000000000000000000000000000000000000000000000000000000000000000000000000000000000000000000000000000000000003765000000000000000000000000000000000000000000000 |

BOBSS BASED FACT SET

THE BOBSS BASED STRUCTURE IS OFFSET BASED. IN THE ABOVE EXAMPLE, THE DATA VALUE IS DEFINED TO BE 16 POSITIONS LONG WITH TWO DECIMAL POSITIONS. THE FIRST 16 DIGITS WOULD REPRESENT THE SALES VALUE OF ORDER 10001. THE SECOND 16 POSITIONS REPRESENT THE SALES VALUE FOR the NEXT ID 10002. THIS OFFSET WOULD CONTINUE TILL THE HIGH ID OF THE SEGMENT. THE BEGINNING OF THE OFFSET FOR ID 10005 WOULD THEREFORE BE 16 * (10005-10001) = 64. THE LENGTH IS 16 FROM THE 64th POSITION.

FIG. 10I

FIG. 12C

REDUCE FACT DATA - BUILD LINK SETS (11B)

| Order_Id | Order_Date | ~~Product_Id~~ | Order_Value | Tax_Value | ~~Promotion_cd~~ | Cust_id | Employee_id |
|---|---|---|---|---|---|---|---|
| 1001 | ~~06/05/2016~~ | ~~PTV45FLG~~ | 400 | 32 | ~~C123~~ | 1001001 | 12346 |

- COMPRESS AND USE CLUSTER KEY
- KEEP ORDER_VALUE IN ORDER FACT DATASET
- KEEP TAX_VALUE IN ORDER FACT DATASET
- CUST_ID = 1001001; ASSIGN CLUSTER KEY TO DATASET DS_REV_CUST_XXX_YY AND ORDER<>CUSTOMER LINK SET
- EMPLOYEE_ID = 123456; ASSIGN CLUSTER KEY TO DATASET DS_REV_EMP_AAA_BB AND ORDER<>EMPLOYEE LINK SET

ORDER FACT REDUCED TO A SET CONTAINING ONLY FACTS
- ORDER_ID
- ORDER_VALUE
- TAX_VALUE

TWO LINKSETS CREATED:
- ORDER ↔ EMPLOYEE
- ORDER ↔ CUSTOMER

LINKSET METADATA

| Primary Cluster | Secondary Cluster | Primary Key | Secondary Key | Dataset |
|---|---|---|---|---|
| REVENUE | CUSTOMER | Order_id | Cust_id | DS_REVENUE_CUSTOMER |
| CUSTOMER | REVENUE | Cust_id | Order_id | DS_CUSTOMER_REVENUE |
| REVENUE | EMPLOYEE | Order_id | Cust_id | DS_REVENUE_EMPLOYEE |
| EMPLOYEE | REVENUE | Cust_id | Order_id | DS_EMPLOYEE_REVENUE |

SYSTEM MEMORY
HASH MAPS OF DATASET NAMES AND LISTS OF CLUSTER KEYS

FIG. 12E

| Unicode code point | Character | UTF-8 (dec.) | Name | Decimal Value |
|---|---|---|---|---|
| U+0021 | ! | 33 | EXCLAMATION MARK | 0 |
| U+0022 | " | 34 | QUOTATION MARK | 1 |
| U+0023 | # | 35 | NUMBER SIGN | 2 |
| U+0024 | $ | 36 | DOLLAR SIGN | 3 |
| U+0025 | % | 37 | PERCENT SIGN | 4 |
| U+0026 | & | 38 | AMPERSAND | 5 |
| U+0027 | ' | 39 | APOSTROPHE | 6 |
| U+0028 | ( | 40 | LEFT PARENTHESIS | 7 |
| U+0029 | ) | 41 | RIGHT PARENTHESIS | 8 |
| U+002A | * | 42 | ASTERISK | 9 |
| U+002B | + | 43 | PLUS SIGN | 10 |
| U+002C | , | 44 | COMMA | 11 |
| U+002D | - | 45 | HYPHEN-MINUS | 12 |
| U+002F | / | 47 | SOLIDUS | 13 |
| U+0030 | 0 | 48 | DIGIT ZERO | 14 |
| U+0031 | 1 | 49 | DIGIT ONE | 15 |
| U+0032 | 2 | 50 | DIGIT TWO | 16 |
| U+0033 | 3 | 51 | DIGIT THREE | 17 |
| U+0034 | 4 | 52 | DIGIT FOUR | 18 |
| U+0035 | 5 | 53 | DIGIT FIVE | 19 |
| U+0036 | 6 | 54 | DIGIT SIX | 20 |
| U+0037 | 7 | 55 | DIGIT SEVEN | 21 |
| U+0038 | 8 | 56 | DIGIT EIGHT | 22 |
| U+0039 | 9 | 57 | DIGIT NINE | 23 |
| U+003A | : | 58 | COLON | 24 |
| U+003B | ; | 59 | SEMICOLON | 25 |
| U+003C | < | 60 | LESS-THAN SIGN | 26 |
| U+003D | = | 61 | EQUALS SIGN | 27 |
| U+003E | > | 62 | GREATER-THAN SIGN | 28 |
| U+003F | ? | 63 | QUESTION MARK | 29 |
| U+0040 | @ | 64 | COMMERCIAL AT | 30 |
| U+0041 | A | 65 | LATIN CAPITAL LETTER A | 31 |
| U+0042 | B | 66 | LATIN CAPITAL LETTER B | 32 |
| U+0043 | C | 67 | LATIN CAPITAL LETTER C | 33 |
| U+0044 | D | 68 | LATIN CAPITAL LETTER D | 34 |
| U+0045 | E | 69 | LATIN CAPITAL LETTER E | 35 |
| U+0046 | F | 70 | LATIN CAPITAL LETTER F | 36 |
| U+0047 | G | 71 | LATIN CAPITAL LETTER G | 37 |
| U+0048 | H | 72 | LATIN CAPITAL LETTER H | 38 |
| U+0049 | I | 73 | LATIN CAPITAL LETTER I | 39 |

FIG. 12G

| Unicode code point | Character | UTF-8 (dec.) | Name | Decimal Value |
|---|---|---|---|---|
| U+004A | J | 74 | LATIN CAPITAL LETTER J | 40 |
| U+004B | K | 75 | LATIN CAPITAL LETTER K | 41 |
| U+004C | L | 76 | LATIN CAPITAL LETTER L | 42 |
| U+004D | M | 77 | LATIN CAPITAL LETTER M | 43 |
| U+004E | N | 78 | LATIN CAPITAL LETTER N | 44 |
| U+004F | O | 79 | LATIN CAPITAL LETTER O | 45 |
| U+0050 | P | 80 | LATIN CAPITAL LETTER P | 46 |
| U+0051 | Q | 81 | LATIN CAPITAL LETTER Q | 47 |
| U+0052 | R | 82 | LATIN CAPITAL LETTER R | 48 |
| U+0053 | S | 83 | LATIN CAPITAL LETTER S | 49 |
| U+0054 | T | 84 | LATIN CAPITAL LETTER T | 50 |
| U+0055 | U | 85 | LATIN CAPITAL LETTER U | 51 |
| U+0056 | V | 86 | LATIN CAPITAL LETTER V | 52 |
| U+0057 | W | 87 | LATIN CAPITAL LETTER W | 53 |
| U+0058 | X | 88 | LATIN CAPITAL LETTER X | 54 |
| U+0059 | Y | 89 | LATIN CAPITAL LETTER Y | 55 |
| U+005A | Z | 90 | LATIN CAPITAL LETTER Z | 56 |
| U+005B | [ | 91 | LEFT SQUARE BRACKET | 57 |
| U+005C | \ | 92 | REVERSE SOLIDUS | 58 |
| U+005D | ] | 93 | RIGHT SQUARE BRACKET | 59 |

| Unicode code point | Character | UTF-8 (dec.) | Name | Decimal Value |
|---|---|---|---|---|
| U+005E | ^ | 94 | CIRCUMFLEX ACCENT | 60 |
| U+005F | _ | 95 | LOW LINE | 61 |
| U+0060 | ` | 96 | GRAVE ACCENT | 62 |
| U+0061 | a | 97 | LATIN SMALL LETTER A | 63 |
| U+0062 | b | 98 | LATIN SMALL LETTER B | 64 |
| U+0063 | c | 99 | LATIN SMALL LETTER C | 65 |
| U+0064 | d | 100 | LATIN SMALL LETTER D | 66 |
| U+0065 | e | 101 | LATIN SMALL LETTER E | 67 |
| U+0066 | f | 102 | LATIN SMALL LETTER F | 68 |
| U+0067 | g | 103 | LATIN SMALL LETTER G | 69 |
| U+0068 | h | 104 | LATIN SMALL LETTER H | 70 |
| U+0069 | i | 105 | LATIN SMALL LETTER I | 71 |
| U+006A | j | 106 | LATIN SMALL LETTER J | 72 |
| U+006B | k | 107 | LATIN SMALL LETTER K | 73 |
| U+006C | l | 108 | LATIN SMALL LETTER L | 74 |
| U+006D | m | 109 | LATIN SMALL LETTER M | 75 |
| U+006E | n | 110 | LATIN SMALL LETTER N | 76 |
| U+006F | o | 111 | LATIN SMALL LETTER O | 77 |
| U+0070 | p | 112 | LATIN SMALL LETTER P | 78 |
| U+0071 | q | 113 | LATIN SMALL LETTER Q | 79 |

FIG. 12H

Decimal to HASIDS Centimal

0 = !
1 = 01 = "
10 = +
100 = "¡
1000 = +¡
10000 = "¡¡
100000 = +¡¡
100001 = +¡"

| Unicode code point | Character | UTF-8 (dec.) | Name | Decimal Value |
|---|---|---|---|---|
| U+0072 | r | 114 | LATIN SMALL LETTER R | 80 |
| U+0073 | s | 115 | LATIN SMALL LETTER S | 81 |
| U+0074 | t | 116 | LATIN SMALL LETTER T | 82 |
| U+0075 | u | 117 | LATIN SMALL LETTER U | 83 |
| U+0076 | v | 118 | LATIN SMALL LETTER V | 84 |
| U+0077 | w | 119 | LATIN SMALL LETTER W | 85 |
| U+0078 | x | 120 | LATIN SMALL LETTER X | 86 |
| U+0079 | y | 121 | LATIN SMALL LETTER Y | 87 |
| U+007A | z | 122 | LATIN SMALL LETTER Z | 88 |
| U+007B | { | 123 | LEFT CURLY BRACKET | 89 |
| U+007C | \| | 124 | VERTICAL LINE | 90 |
| U+007D | } | 125 | RIGHT CURLY BRACKET | 91 |
| U+007E | ~ | 126 | TILDE | 92 |
| U+00A1 | ¡ | 161 | INVERTED EXCLAMATION MARK | 93 |
| U+00A2 | ¢ | 162 | CENT SIGN | 94 |
| U+00A3 | £ | 163 | POUND SIGN | 95 |
| U+00A4 | ¤ | 164 | CURRENCY SIGN | 96 |
| U+00A5 | ¥ | 165 | YEN SIGN | 97 |
| U+00A6 | ¦ | 166 | BROKEN BAR | 98 |
| U+00A9 | © | 169 | COPYRIGHT SIGN | 99 |

FIG. 12I

Example 1.
User request: A list of customers born on 1st Jan 1960
Current System: SQL querying from customer dimension table where the attribute date of birth is 1st Jan 1960.
SQL: Select cust_id from customer_dim where date_of_birth = date('01-01-1960', 'MM-DD-YYYY')
Pre requisite: Index on date of birth column
HASIDS: Will be interpreted to mean a) output is a list, b) born relates to date of birth context, c)1st means day 1 of month of date of birth sub-context, Jan means January month of date of birth sub-context, 1960 means year 1960 of date of birth sub-context UNARY Query expression: DOB_DAY_1 intersect DOB_Month_Jan intersect DOB_YEAR_1960

BOBSS Query expression: DOB_DAY(UNICODE FOR DAY 1) intersect DOB_Month(UNICODE FOR JANUARY) intersect DOB_YEAR(UNICODE FOR 1960)

Example 2.
User request: Number of males registered in 1990
Current System: SQL querying from customer dimension table where the attribute registration date is 1990 and attribute Sex has a value of M.
SQL: Select count(cust_id) from customer_dim where year(registration_date) = 1990 and sex = 'M'
Pre requisite: Index on date of birth column and gender column
HASIDS: Will be interpreted to mean a) output is a count, b) males relates to gender context dn males sub-context, c)registered means a context of registration date with a sub-context of 1990

UNARY Query expression: COUNT(RD_YEAR_1990 intersect SEX_Males)

BOBSS Query expression: COUNT(RD_YEAR(UNICODE FOR 1990) intersect SEX(UNICODE FOR MALES))

FIG. 18B

Example 3.
User request: Number of males and females registered in 1990 grouped by gender
Current System: : SQL querying from customer dimension table where the attribute registration date is 1990 and attribute Sex has a value of either M or F resulting in 2X2 dimensional output.
SQL: Select Sex, count(cust_id) from customer_dim where year(registration_date) = 1990 and sex in ('M', 'F') group by sex
Pre requisite: Index on registration date column and gender column
HASIDS: Will be interpreted to mean a) output is a grouping of counts, b) males relates to gender context and males sub-context, c) females relates to gender context and females sub-context, c)registered means a context of registration date with a sub-context of 1990

UNARY Query expression:  (COUNT(RD_YEAR_1990 intersect SEX_Males)) Union (COUNT(RD_YEAR_1990 intersect SEX_Females))

BOBSS Query expression:  (COUNT(RD_YEAR(UNICODE FOR 1990) intersect SEX(UNICODE FOR MALES))) Union (COUNT(RD_YEAR(UNICODE FOR 1990) intersect SEX(UNICODE FOR FEMALES)))

FIG. 18C

Example 4.
User request: Number of male customers
Current System: SQL querying from customer dimension table where the attribute Sex has a value of M.
SQL: Select count(cust_id) from customer_dim where sex = 'M'
Pre requisite: Index on gender column This information will be picked up from the HASIDS Metadata itself without the need for an actual query.

FIG. 18D

Example 5.
User request: Number of flat screen tvs sold in Q3 2016
Current System: : The attribute "Flat" may not be stored in current DWH systems. Assuming the product key can be used to determine it, Samsung product key has letter 'F' in 4th pos, LG product key has letter 'F' in 5th position and Sony product key has letter 'F' in 3rd position, the results have to be derived.
SQL: Select product_id, sum(num_items) from sales where product_id in (select product_id from product_dim, manufacturing_dim where product_dim.product_id = manufacturer_dim.product_id and manufacturer_dim.name = 'Sony' and substr(product_id, 3, 1) = 'F' UNION repeat above for LG UNION repeat above for Samsung) and sales.order_dt_key = order_date_dim.order_dt_key and order_dt_dim.quarter = 'Q3' and order_dt_dim.year = 2016 group by product_id
Pre requisite: Index on product_id, order_dt HASIDS: Will be interpreted to mean a) output is a sum, b) flat screen tvs relates to product context and flat screen sub-context, c) sold in Q3 2016 will mean order date context and Q3 quarter and 2016 year sub-contexts.

UNARY Query expression: (SUM (NUM_ITEMS) of (ORDER_DT_Q3 <u>intersect</u> ORDER_DT_2016 <u>intersect</u> PRODUCT_TV_FLAT))

BOBSS Query expression: (SUM (NUM_ITEMS) of (ORDER_DT(UNICODE FOR Q3) <u>intersect</u> ORDER_DT(UNICODE FOR 2016) <u>intersect</u> PRODUCT_TV_TYPE(UNICODE FOR FLAT)))

FIG. 18E

| CUSTOMER | |
|---|---|
| cust_id (Primary Key) | Customer Identifier |
| cust_first_name | Customer First Name |
| cust_last_name | Customer Last Name |
| cust_ph_num | Customer Phone Number |
| cust_address | Customer Address |
| cust_state | Customer Address State |
| cust_county | Customer Address County |
| cust_zip | Customer Address Zip |
| cust_dob | Customer Date of Birth |
| cust_sex | Customer Sex |
| cust_enroll_dt | Customer Enrollment Date |

| Metadata Extension | | |
|---|---|---|
| | Element | Source |
| | Level | User Defined |
| | Subjects | Metadata.Subject |
| | Contexts/Element Clusters | Metadata.Context |
| | Atomic CTXs | Metadata.Atomic CTX |
| | Dataset | System calculated |
| | Language Tokens | Metadata.Language Token |
| | Min Key | Metadata.Min Key |
| | Max Key | Metadata.Max Key |
| | Count | System calculated |
| | Sales Value | System calculated |
| | Tax Value | System calculated |
| | Promotion Value | System calculated |

| LINKSET METADATA | | | | |
|---|---|---|---|---|
| Primary Cluster | Secondary Cluster | Primary Key | Secondary Key | Dataset |
| REVENUE | CUSTOMER | Order_id | Cust_id | DS_REVENUE_CUSTOMER |
| CUSTOMER | REVENUE | Cust_id | Order_id | DS_CUSTOMER_REVENUE |
| REVENUE | EMPLOYEE | Order_id | Cust_id | DS_REVENUE_EMPLOYEE |
| EMPLOYEE | REVENUE | Cust_id | Order_id | DS_EMPLOYEE_REVENUE |

FIG. 19A

DATASET PARTITION METADATA

| DATASET NAME | PARTITION NO | MIN RANGE | MAX RANGE | COUNT | UNARY SET KEYS |
|---|---|---|---|---|---|
| A 1 | 1 | 3 | 8 | 3 | 3,5,8 |
| A 2 | 2 | 11 | 16 | 2 | 11,16 |
| A 3 | 3 | 24 | 30 | 5 | 24,25,27,28,30 |
| B 1 | 1 | 1 | 2 | 2 | 1,2 |
| B 2 | 2 | 11 | 19 | 4 | 11,16,17,19 |
| B 3 | 3 | 21 | 25 | 3 | 21,24,25 |
| C 1 | 1 | 2 | 7 | 2 | 2,7 |
| C 2 | 2 | 12 | 19 | 5 | 12,14,16,18,19 |
| C 3 | 3 | 21 | 30 | 6 | 21,22,24,26,28,30 |
| D 1 | 1 | 1 | 9 | 4 | 1,3,7,9 |
| D 2 | 2 | 11 | 17 | 5 | 11,12,13,16,17 |
| D 3 | 3 | 25 | 29 | 5 | 25,26,27,28,29 |

DATASET METADATA

| DATASET NAME | MIN RANGE | MAX RANGE | COUNT |
|---|---|---|---|
| A | 3 | 4126778 | 3560000 |
| B | 11 | 9126334 | 8657442 |
| C | 24 | 3123667 | 2555312 |
| D | 1 | 6882008 | 6443172 |

FIG. 19B

HIGHLY ATOMIZED SEGMENTED AND INTERROGATABLE DATA SYSTEMS (HASIDS)

CLAIM OF PRIORITY UNDER 35 U.S.C. § 119

The present Application for patent claims the benefit of Provisional Patent Application No. 62/529,465 entitled "HIGHLY ATOMIZED SEGMENTED AND INTERROGATABLE DATA SYSTEMS (HASIDS)" filed Jul. 6, 2017, pending, and assigned to the assignee hereof and hereby expressly incorporated herein by reference in its entirety.

FIELD OF DISCLOSURE

Disclosed aspects are directed to improving database management. More specifically, exemplary aspects are directed to Highly Atomized Segmented and Interrogatable Data Systems (HASIDS).

BACKGROUND

Early decades of computerization in the mid-twentieth century resulted in databases that recorded the data of the business processes they supported. Such databases were designed for efficient storage with specific needs for effective transaction data creation, updation, and deletion. As data was captured from such record keeping systems, or OnLine Transaction Processing (OLTP) systems, companies tried to capitalize on the data either for reporting and better analytical decision making. This led to, what William H. Inmon (recognized by many as the father of data warehousing) stated, as extract processing, wherein businesses empowered by the Personal Computer revolution of the 1980s indulged in extracting OLTP data and that they then customized for their own departmental reporting and decision making. Pervasiveness of such extract processing was aided with the advent of spreadsheet software applications (such as Lotus Notes and subsequently by Microsoft Excel) and resulted in what is referred to as the spider-web. This spider-web of frequently extracted, selectively customized and circulated information which was not centralized, secure, or controlled created problems with data integrity for business problem solving and decision making.

This evolving quest to capitalize data as an information asset beyond the need for record keeping led to the advent of management information systems (MIS) that evolved into more responsive Decision Support Systems (DSS). Such systems took information from OLTP systems and restructured and presented them for executive decision making and sometimes for operational decision making. Central to such repurposing of data was the concept of warehousing of data with a specific focus on use for decision support (e.g., as discussed in the textbooks, "Building the Data Warehouse" by the author W. H. Inmon; and "The Data Warehouse Toolkit: The Definitive Guide to Dimensional Modeling" by the author Ralph Kimbal). This restructuring of data was a shift from a record-keeping data model to a complementary data model called a multidimensional data model. Perhaps the most pervasive of such models was Kimball's start-schema approach that took business attributes related to product, geography and time and treated them as business decision dimensions that were linked to a central set of business measures or facts such as revenue, sales volume and such. This combination of dimensions includes separate tables or datasets that are linked to a central fact-table with common key. The data representation is called a star-schema as the central fact table is linked and surrounded by radiating dimension tables.

The motivation for such dimensional data modeling was to overcome the inherent constrains in the OLTP data models which were created for supporting the record keeping needs of businesses but not for decision making. The star-schema (and OnLine Analytical Processing (OLAP)) approaches support query processing with the express intent of enabling data analysis for decision making. This makes ad-hoc querying, summarizing, and presenting of information for consumption for decision making and analysis more efficient and effective. Decision making required more than this and often DSS have to cater to user requirements for quick information analysis involving slice-dice of datasets, drill-down, and roll-up across hierarchies in dimension, etc. This led to the OLAP products that pre-computed data across all relevant hierarchies of dimension, allowing for rapid information analysis such as slice-dice, roll-up/drill-down, etc.

Embedded Data Relationships (EDRs) include data models premised on explicit data structure embedded linkages between dimension and facts that help with quick querying. But this embedded nature of relationships between dimension and facts constrains the user from forming run-time relationships to arrive at contexts that are not inherently tied into the data structure. Data intensive applications such as data warehousing, OLAP, Geographic Information Systems (GIS), etc., are currently constrained from being able to define run-time relationships resulting in dynamic contexts due to limitations imposed by factors such as (1) Data structure, (2) Data linkages and relationships, and (3) Data storage and access mechanisms.

Such limitations constrain the ability to dynamically and rapidly change query context or sub-context outside of the structurally Embedded Data Relationships (EDRs) in conventional systems, wherein the ability to dynamically and rapidly change query context, if available, can enable the ability to freely interrogate and investigate the database. Information interrogation and investigation require the ability to rapidly interact with the data by iteratively changing and manipulating the context/sub-content of the query used to access the data. EDRs result in insufficiently atomized information and atomized linkage. Insufficiently atomized information and linkage imply the existence of pre-set data relationships which are hard to refactor/restructure by queries at run time.

Data Interrogation is defined as a series of evolving data queries that are evolved through data and data-context discovery, unconstrained by EDRs, such that the data interrogation may be aided by the ability to change parts of the query to dynamically change some aspect of the query context iteratively and rapidly.

Data Investigation is defined as searching for potential patterns (pattern matching) in the data unconstrained by EDRs. The "3Is" of data interrogation and investigation pertain to the ability to Interactively, Iteratively and Immediately (i.e. real-time) change context of the query used to interrogate data, defined further below:

(1) Interactive: Converse with the data using granular (atomized) data, data relationships and associated semantics that easily supports natural language interface and semantic APIs;

(2) Iterative: Converse with the database by continually and rapidly changing the context of the query used to interrogate the data (without necessarily waiting for the query to be fully processed); and (3) Immediate: Such conversations with database require extremely flexible and granular information handling capability to dynamically interrelate and bring together data at different levels of context with no structurally embedded relationships.

Existing data intensive applications associated with data warehousing, data mining, multidimensional databases, GIS etc., are currently constrained by limitations imposed by data definition, data structure, data relationships, data storage and data access mechanisms to rapidly escalate or change contexts/sub-contexts on the fly while interrogating (i.e. iterative interaction) the data. The nature and mechanisms of data storage and pre-defined relationships between disparate pieces of data in conventional systems preclude interpreting context-driven human expressions for building data relationships dynamically and on-the-fly, thus severely limiting the user interface of these systems to pre-defined and structured interrogation.

In conventional database management systems supporting both online transaction processing and online analytical processing, data structures are relational in nature and managed as tables with rows and columns mimicking a spreadsheet. This structure means that an entire record must be retrieved even when only a single column is queried. When queries across multiple columns are executed, the conventional database management system must perform a full scan of each of the columns across the entire table to retrieve the keys associated with matching values. To speed up interrogation of these conventional data structures, indices must be established that contain unique keys to identify the location of matching records in the underlying storage system.

In analytical processing data structures with many dimensions, a unique key is comprised of a fact with many dimensions. A process of indexing the data structure using a composite key results in a b-tree like structure, whose size is often many times the actual data itself. Another conventional approach to indexing into the data structure involves indexing into individual columns or groups of columns, which also produces overhead data that is quite large and requires expensive storage. Conventional indexing operations morph data retrieval into a two-step operation: a first step to read an index to retrieve the key and identify the storage block where data resides; and the second step to read the data in the identified storage block.

For very large conventional database implementations, the tables must be partitioned across well-defined ranges for efficiency. This can be a major challenge when the database contains many large tables containing diverse data. Main tables may be partitioned on subject key ranges, transaction tables partitioned on transaction identifiers, and, historical tables may be partitioned by date ranges. This organization of tables increases the complexity of generating queries across the various tables in an efficient manner which has a fast response time.

Row-based databases have scalability issues associated with queries running on large data sets.

Conventional implementations of column-based databases, though suitable for data warehousing, data analysis, and business intelligence (BI), require systems with high computing power. The conventional column-based databases are seen to be unsuitable for transaction processing, offer slow import/export speeds and must store both the keys and values increasing storage. Since both keys and values are stored within the tables, there is not seen to be an easy way of separating data and its context/semantics.

Databases other than Structured Query Language (SQL) databases, such as Non-SQL or Not-Only-SQL (referred to as "NoSQL") based databases using key-value stores may require that the entire data be loaded into memory and thus these conventional NoSQL database implementations may have poor query capability. NoSQL based databases using document stores have poor query capability and are suitable mainly for unstructured and semi-structured data. NoSQL based databases using column stores have very poor query capability and high latency of response to queries.

In relational systems, data structures are dependent on each other and have pre-defined relationships between them, confining their usage to only a certain way. Relationships between two data structures are established by embedding keys from one structure into another structure (referred to as foreign keys). This organization forces data between two structures to be bound in a relationship in a pre-determined manner during the design of the database. The data in these structures cannot be independently bound to any other data outside the pre-defined relationship, thus severely limiting the ability to dynamically associate relationships at run-time.

The conventional database management systems do not allow querying inputs to change dynamically on the fly. In a conventional implementation, a query cannot be altered once its execution has begun. The results of a query cannot be reused for further changes unless the database management system provides for an implementation to store results in temporary tables and the query itself has been first executed in a temporary mode.

In conventional implementations, Data Structures can be interrogated only through a structured query language (e.g., SQL) managed by the underlying database management system. However, structured queries cannot be derived from a context or language semantics using known approaches. They must be generated either by humans who understand the underlying data structures and their relationships, or, by systems that have the definitions of the structures and their relationships embedded within their programs.

Accordingly, there is a recognized need in the art to avoid the aforementioned drawbacks of conventional database management solutions, while enabling interactive, iterative, and immediate (real-time) changes to context of queries used to interrogate and investigate data.

SUMMARY

Exemplary aspects of the invention are directed to systems and methods for data interrogation and investigation using the exemplary Highly Atomized Segmented and Interrogatable Data Systems (HASIDS). Characteristics of the HASIDS include (1) a high-degree of data and data-relationship granularity that is predicated on the need for information interrogation (fully atomized information for interrogation and not data atomicity defined for the transactions); (2) semantic metadata to help build complex data relationships in real-time (i.e. derive higher order information context); (3) datasets that are naturally and implicitly indexed (un-indexed datasets in that they require no explicit indices and the related overheads of storage and processing using indices); (4) data structures whose innate structure supports massive parallel processing (simple unary datasets that lend themselves to simple clear data partitioning and processing); and (5) use of simple set operators and mathematical functions (without the complexity of standard structured query language that were designed for Relational database management systems (RDBMS)).

For example, an exemplary aspect is directed to a method of receiving a source set of data elements, associating a common key with each of at least a subset of the source set of data elements, and generating one or more unary keysets, each unary keyset corresponding to one of the data elements of the subset, and each unary keyset being single-dimensional and comprising the common key. The method may further include flexible querying of the unary keysets and efficient storage and processing of the data elements using the unary keysets.

Another exemplary aspect is directed to a database management system comprising means for receiving a source set of data elements, means for associating a common key with each of at least a subset of the source set of data elements, and means for generating one or more unary keysets, each unary keyset corresponding to one of the data elements of the subset, and each unary keyset being single-dimensional and comprising the common key.

BRIEF DESCRIPTION OF THE DRAWINGS

The accompanying drawings are presented to aid in the description of aspects of the invention and are provided solely for illustration of the aspects and not limitation thereof.

FIGS. 1A-J illustrate aspects of atomization and querying data according to HASIDS of this disclosure.

FIG. 1K illustrates aspects of a table in OLTP or ROLAP system for capturing potential lists or types of customers.

FIG. 2 illustrates exemplary aspects of HASIDS compared to other data intensive applications.

FIGS. 10A-E depict examples of the HASIDS metadata after each step in the process flow of FIG. 8.

FIG. 10F depicts an example of the same set of data represented in the three data formats of HASIDS: unary, BOS and BOBSS, based on the example process of FIG. 8.

FIGS. 10G-H illustrates the storage and memory associated with each of the above data storage formats for a set of 25 and 10 million records/identifiers for a single attribute.

FIG. 10I depicts an example of a fact dataset in both the unary and the BOBSS data formats.

FIGS. 12A-F illustrate examples and further details of the process flow illustrated in FIG. 11.

FIGS. 12G-I illustrates an exemplary aspect of the HASIDS storage technique wherein all cluster identifiers in the datasets are compressed.

FIGS. 18A-E illustrate representative and illustrative examples of using an example of HASIDS for data analysis and interrogation.

FIGS. 19A-B illustrates a data model pertaining to partitioning within an exemplary HASIDS as a system.

DETAILED DESCRIPTION

Figure 1A:

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The following list of terms used in this disclosure has been provided with example definitions as below to aid in the understanding of the detailed discussion of exemplary aspects below.

(1) OLTP: Online Transaction Processing
(2) OLAP: Online Analytical Processing
(3) Unary Key Datasets, Unary Keysets, or Unary Key Lists: Datasets (in data clusters) that have only one key, referred to as the unary key.
(4) BOS: Bit Offset Structure, Datasets wherein the unary keys are represented as a sequence of single-byte values of zero or one.
(5) BOBSS: Bit Offset Byte Storage Structure, Datasets where multiple BOS sets within an element cluster are combined into a single set and the zero/one replaced by a unique byte.
(6) Atomization: The process of taking source data (from OLTP, Documents, etc.) and flattening attributes and reducing facts to unary keysets.
(7) Attribute Data Flattening: Exploding individual attributes in the domain of attributes from source data to individual unary keysets (resulting in one-dimension sets per attribute value).
(8) Keyset Selection: The process of querying for HASIDS data using set operators on unary key lists, which produces results sets in the form of a list of unary keys.
(9) Interrogation: Real-time processing of interactive, iterative, and immediate contextualized/re-contextualized query.
(10) Data Cluster: A logical cluster of datasets that share the same type of unary keys.
(11) Cluster Key: Unary key belonging to a data cluster.
(12) Link set: used to link two or more clusters using a relationship between their respective cluster keys (i.e. their respective unary keys).

In exemplary aspects of this disclosure, atomicity and atomization of data is discussed. Atomization of Data is an important aspect of the exemplary Highly Atomized Segmented and Interrogatable Data Systems (HASIDS). Traditionally, atomicity is one of the four ACID properties attributed to databases transactions (others being Consistency, Isolation and Durability). A sequence of database operations that satisfies the ACID properties and, thus, can be perceived as a single logical operation on the (business transaction) data, is called a transaction. While this definition of atomicity is central to and predicated on the data management needs for transaction processing, analytical or query intensive systems (as opposed to transaction processing systems) are seen to benefit from a different type of atomicity, which is referred to herein as information atomization and elaborated further in the following sections.

Atomization in the context of organizing data in this disclosure includes at least the "four degrees of atomization", which are characteristics enumerated below. The four degrees of atomization enable iterative and interactive querying of the data in one exemplary aspect:

(1) atomized Data: any data attribute or fact is fully atomized such that it is further irreducible without loss of the meaning or context;
(2) atomized Linkage: the linkage between such atomic data is also atomized. In an aspect this refers to unary key linkage, wherein all data within a cluster (i.e. a subject area) will be linked via a common key. Complex multi-key joins and composite indices are avoided;
(3) atomized Operators: the basic set operators such as Element-of ($\in$), Intersection ($\cap$), Union ($\cup$), subset ($\subset$) and Difference (−) and their complements are to be applicable on one unary keysets or between two unary keysets; and
(4) atomized Context: a context is a query expression made up of datasets and set operators—any dataset has its own meaning/semantic and thus its context is also atomized (this characteristic may be viewed as a corollary of "(1) atomized Data" mentioned above, which implies irreducibility of atomic data leading to the most granular information with atomized context).

The acronym COLD is used to refer to the attributes "Context", "Operators", "Linkage", and "Data" in the four degrees of atomization noted above.

Higher order context of data can be created with compound query expressions built on the most granular COLD atomized data or with other higher order context datasets. Such higher order contexts are designed to do the following:

(1) combine multiple unary keysets, i.e. fact datasets and dimension datasets;
(2) perform the above combination with the unary keys for providing the linkage;
(3) use set operators for keyset selection in the above combination; and
(4) use mathematical functions (such as sum, count, average, etc.) for fact derivation.

Dynamic context changes of the above can result in runtime modification of query expression. A series of HASIDS database interactions using such query modification that is interactive and iterative providing immediate information is used to facilitate interrogation in exemplary aspects.

FIG. 1A illustrates a database table in OLTP (specifically capturing order transaction information). Specifically an order record 100 with order details is shown, considered to comprise a source set of data elements in exemplary aspects. The set of data elements in record 100 may include attributes and/or facts. Attributes are characteristics of entities involved in the transaction such as date, product and department. Facts are measures or values of the transaction. Facts can be derived to be used as attributes. In this disclosure, data is viewed as molecules if the data (attributes or facts) can be further reduced to more granular meaningful data until it is not reducible further, at which point the irreducible data represents highly atomized information referred to as atoms.

For instance, considering the first record on the first row of record 100, OrdNo243008 is the Order-Number and it is a representation of an atom of order identification information. As shown in FIG. 1A, "45' LED-TV" represents one atom of Product information; "Electronics" is a department in the store and it represents one atom of Department Information. The fields shown under Quantity, Cost, Tax, and Total, with respective values of "2", "$600", "$80", and "$880" are facts about the transaction. The information "Television (TV)" is an atom of the product type and is derived information. Although not shown in FIG. 1A but shown in FIG. 1B, "May" is the month the order was placed on and it represents one atom of date information; "12" is the day-of-month the order was placed on and it represents one atom of (day-of-month) date information; "2017" is the year the order was placed on and it represents one atom of (year) date information. Each atom is an item in a unary keyset, wherein a unary keyset (or unary key list) is has only one type of value, or in other words, is single-dimensional. Furthermore, as will be further explained, it is possible to associate a common key (e.g., the order number) with each of the data elements (or at least a subset of the data elements) and generate one or more unary keysets with each keyset corresponding to one of the data elements, and wherein each one of the one or more unary keysets comprise the common key.

Figure 1B:
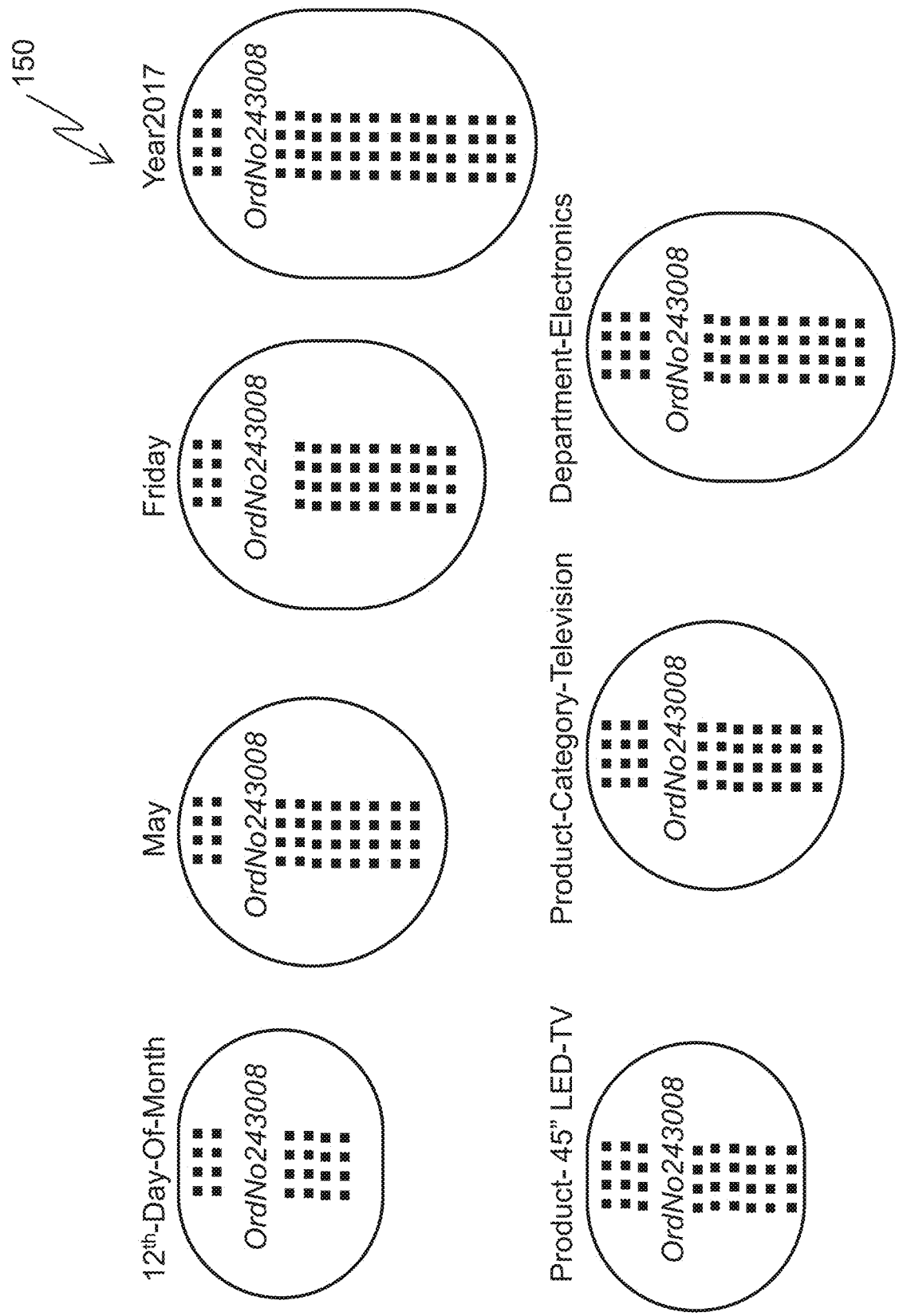

FIG. 1B illustrates a set of unary keysets 150, referred to as a cluster of unary keysets, each comprising a set of common keys or order numbers. A cluster of one or more unary keysets such as cluster 150 may be linked with a common key. A HASIDS database with its atomized data sourced from an OLTP order table such as record 100 may be converted to such unary keysets of cluster 150, each with Order Numbers as their only elements, thus making them one-dimensional. The above-mentioned order number OrdNo243008 is specifically shown in each of the unary keysets in cluster 150, while the remaining elements in each of these unary keysets is shown generally by dots, wherein these represent other order numbers that belong to the respective unary keysets (in other words, each of unary keysets 150 may be viewed as lists of order numbers). There may be hundreds of such unary keysets even though only a few representative ones have been illustrated for the sake of brevity. For example, unary keysets may be formed with one unary keyset for: each day of the year, each month of the year, each year, each day of the week, for each product, for each product category, each department, etc. These unary keysets in cluster 150 have only one item of value, i.e., Order Numbers. The data in each of unary keysets in cluster 150 is essentially one or more common keys, i.e., the order numbers (alternatively referred to as the order keys).

As seen in the above example, the data elements may be sourced from an order table. In various other examples which will be described herein, the data elements may be generated by converting structured or unstructured sources including one or more of a table, record, documents, message objects, or webpage text into the source set of data elements, with the common key associated with an identifier for a row and the subset comprising elements of the row in the case of the table. It is also possible to convert natural language into the source set of data elements based on context associated with one or more of tokens, subjects, or phrases representing semantics occurring in the natural language as will also be explained further in this disclosure.

FIGS. 1C-E illustrate aspects of run-time querying of data or information using the atomized data in unary keysets of cluster 150 of FIG. 1B, for example, with set operators comprising one or more of intersection, union, subset, or difference operators. In FIG. 1C, a Venn diagram is shown, illustrating an intersection of the two unary keysets resulting in a reduced dataset of order numbers (dark areas representing order numbers for the intersection of "Televisions" in the year "2017" shown as Televisions∩Year 2017). With such atomized information, it is possible to query for a list of order numbers using simple set operators. For example, asking for list of orders numbers for Televisions in May in the year 2017 can be represented using the query expression: (Televisions∩Year 2017), wherein Televisions and Year 2017 are unary keysets with just the order numbers of Televisions in the year 2017.

In FIG. 1D, a Venn diagram is shown, wherein the darkened part of the Year 2017 dataset is the subset of order numbers of all product sold in 2017 other than Televisions (Year 2017−(Product-Category-Television∩Year 2017)).

FIG. 1E illustrates querying for list of orders on the weekend of May in the year 2017 can be represented as: (May∩(Saturday∩Sunday))∩Year 2017, wherein May, Saturday, Sunday and Year 2017 are all unary keysets with a list of order keys that were placed on Saturdays, Sundays, May months and in the Year 2017. In FIG. 1E, the darkened portion illustrates an intersection of all the unary keysets in a dataset of order numbers, which is what is expected from the database in the above query.

Figures 1F, 1G:
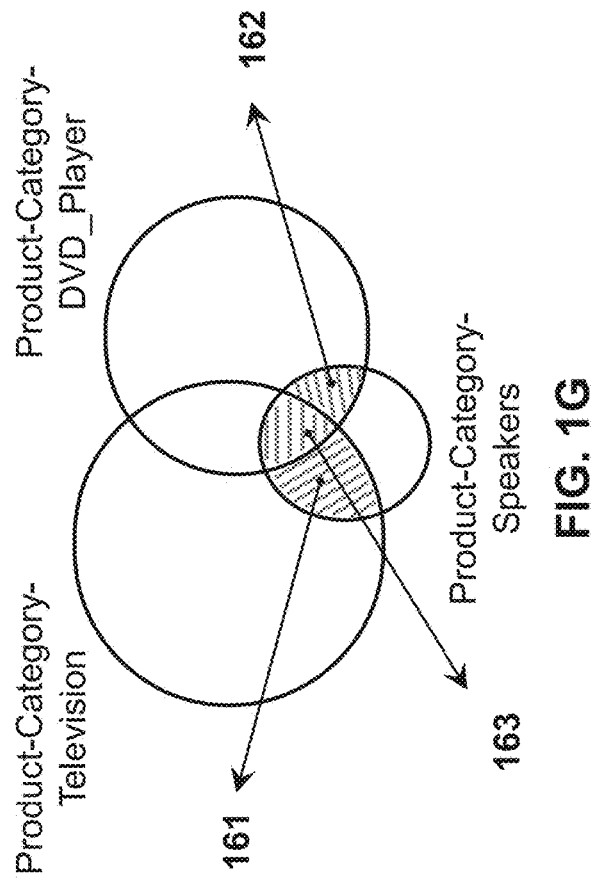

FIG. 1F illustrates a reduced version of record 100 showing the facts for associated order numbers, also termed Order_Facts. Thus, the table in FIG. 1F is also referred to as the result of "fact reduction" of the OLTP tables such as record 100 of FIG. 1A. The keyset selection discussed earlier using Venn diagram shown in FIG. 1E, for example, results in the unary keysets that can be used with set and mathematical operators with the above fact table of FIG. 1F to query and interrogate data: SUM(((May∩(Saturday∩Sunday))∩Year 2017)∩Order_Facts.Total).

FIG. 1G illustrates another querying aspect, wherein the hatched areas show intersection of all three product categories, Television, DVD players, and speakers in area 163, with the combination of areas 161 and 162 showing the intersection of Television and speakers and the combination of areas 162 and 163 showing DVD players and speakers. A comparison of the facts (such as quantity, revenue, margin, etc.) can be easily queried for any one or more of the above three product categories or the various intersections thereof, using set operators as all the data sets are simple sets or unary key lists.

Figure 1H:
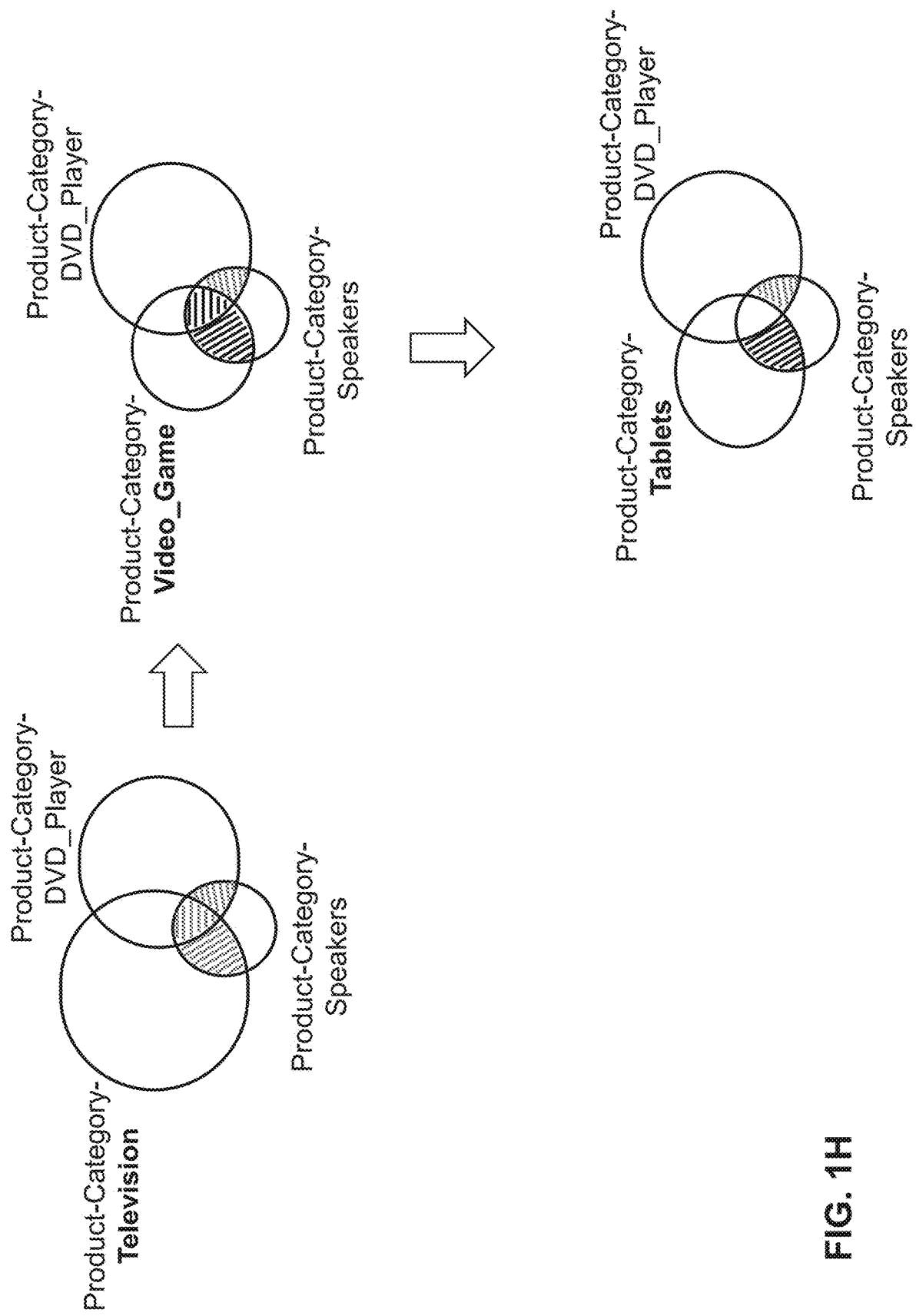

In exemplary aspects, it is possible to perform a sequence of queries as well as change a query during run-time of an existing query based on context changes related to interrogation of the set of data elements. FIG. 1H illustrates a sequence of queries with changing contexts (going from clusters comprising DVD players and speakers with combinations of Televisions, video games, and tablets in the various queries with changing contexts, per the illustration). The query context for the queries shown therein involves a plurality of datasets and set operators. When the result sets are combined with arithmetic functions such count, sum, average, percentage, etc., the sequence illustrates an example approach which can be used for querying on facts such as quantity, revenue, margin, etc. When the datasets, the operators and arithmetic functions are changed, this may result in a change in the context and granularity of information being queried, i.e., the context of the query expression may be changed. In FIG. 1H, rapid run-time iterative and interactive changes of query expression are illustrated, referred to herein as data interrogation. When supported by semantic metadata, such data interrogation can create a powerful data ecosystem that can be spoken to using Natural Language Processing (NLP) in the specialized metadata context or subject area the datasets are from.

FIGS. 1I-J illustrate aspects of facts reduction as a part of example information atomization wherein FIG. 1I shows an example of an OLTP table (before facts reduction), and FIG. 1J shows the fact dataset that would result from facts reduction. In more detail, starting with FIG. 1I, all attributes (e.g., product, manufacturer, department) are stripped from facts (e.g., quantity, cost, tax, total) to create a single key based fact dataset or a unary keyset for facts in FIG. 1J.

FIG. 1K shows notations that are used for the keys, e.g., the key M represents males, F represents females, O represents other, and U represents undisclosed.

Figures 1L, 1M:
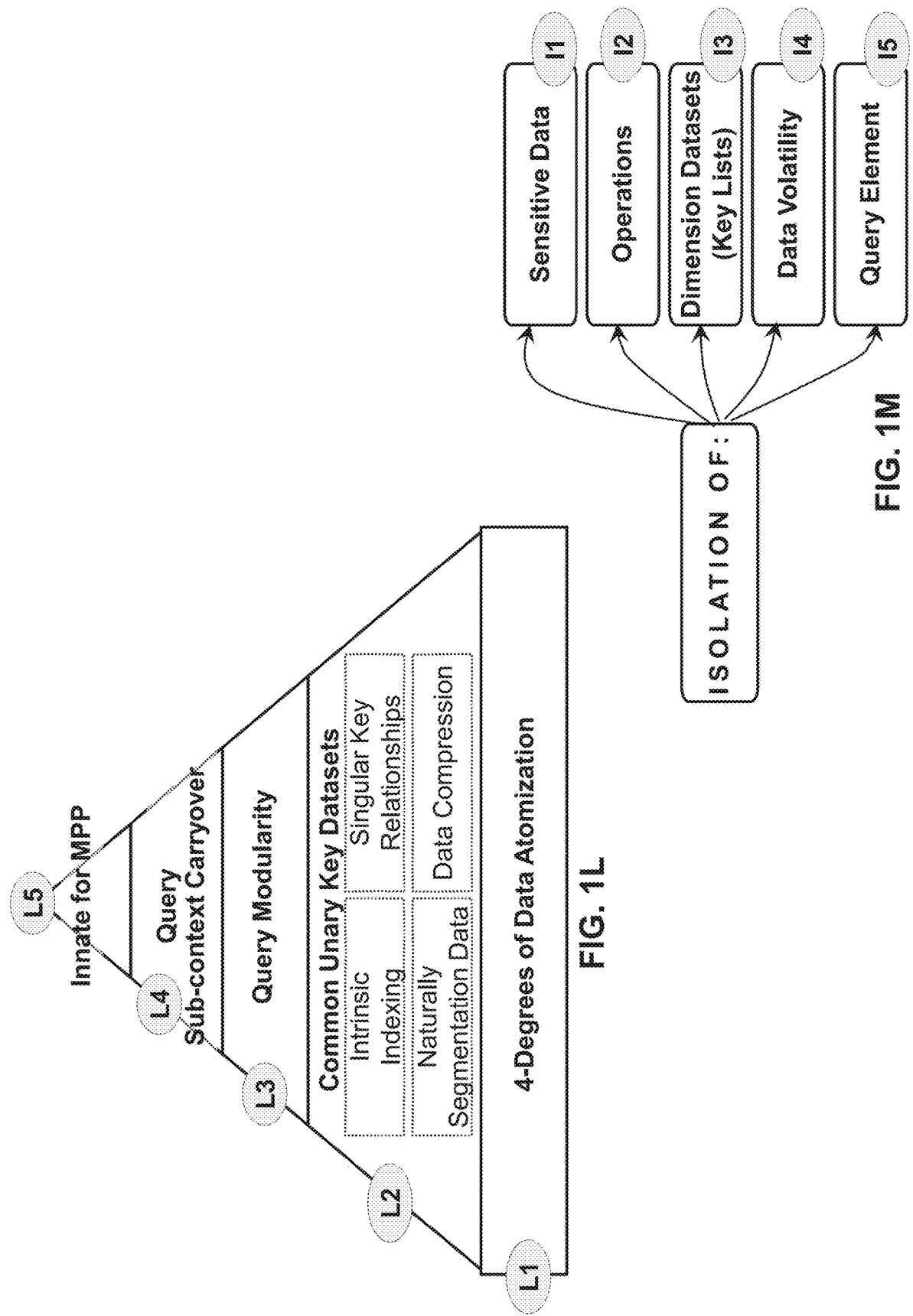
FIG. 1L illustrates exemplary aspects of Hierarchy of Enablers for High Performance Interrogation for HASIDS.
FIG. 1M illustrates exemplary aspects of The Five Architectural Capabilities of HASIDS.

FIG. 1L illustrates aspects of Hierarchy of Enablers of HASIDS architecture and design aspects that make HASIDS a High Performance Data Interrogation System. The simplicity of using unary keysets with one common key across all datasets in a cluster/subject area is a core feature which enables responsiveness of queries, which enables HASIDS to satisfy the 3Is of data interrogation and investigation: interactive, iterative and immediate. The following layers are shown in FIG. 1L.

Layer L1: Data Atomization is the foundation of HASIDS which supports all other enablers for high performance data interrogation.

Layer L2: Unary key distribution consistency leading to natural segmentation, elimination of indexing and associated overheads, simplified data manipulation operations based on one common type of compressed key across all datasets.

Layer L3: Modular query expression leading itself to dynamic runtime context changes to make interactions highly iterative.

Layer L4: Results of sub-queries inherently carried over and reused for subsequent query iterations increases processing throughput efficiency.

Layer L5: The combination of natural data segmentation along with query modularity and reuse of results across iterations makes HASIDS innately a massively parallel processing system.

FIG. 1M illustrates architectural and design capabilities of HASIDS directed to usability, maintainability, scalability, extensibility, responsiveness, testability, security and portability. In exemplary aspects, the one or more unary keysets may be isolated for one or more of security or privacy. The following five capabilities result in isolation of various aspects of data storage and their usage according to HASIDS: I1 shows Isolation of Sensitive data: Since all dimensions are unary keysets and isolated from one another, the privacy elements can be easily isolated within a security architecture without major overheads; I2 shows Isolation of Operations: New dimensions can be added by an administrator without exposure to the community, tested, validated, and then turned on for consumption by the larger audience; I3 shows Isolation of Dimension Datasets (key Lists) for Maintenance: New dimensions can be added without impacting existing structures, similarly existing dimensions can be dropped without impacting other datasets; I4 shows Isolation of Data Volatility: new keys added to a unary keyset are isolated, wherein major volatility or variation of data elements is restricted to a last segment of a unary keyset to which new keys are appended as each segment has a pre-defined range and all keys within a segmented are sorted; and I5 shows Isolation of Query Elements: Each sub query results are stored in temporary areas with their context till a change occurs to one of the underlying datasets, wherein another query can reuse pre-computed results isolating processing to only new parts not executed earlier.

Aspects of data partitioning will now be discussed. Each dataset may be represented as a unary keyset with a cluster of unary keysets comprising a common key, as noted above. The unary keysets in the cluster may each comprise the common key and one or more other similar keys (e.g., for other order numbers according to FIGS. 1A-B discussed above). Unary keysets are stored in serial order and thus accessing the unary keysets is based on the serial order, without further indexing required, thus reducing the need for storage and processing of large number of simple and compound indices. All keys are of the same type with an innate sort/serial order making storage and access of datasets very efficient with simple and clean partitioning of data. However complex the query expression, the keyset selection processes on one type of data may be the universal unary key in all datasets, making it highly efficient and effective for query processing. Such storage and access of unary keys leaning themselves to natural partitioning of data makes the use of HASIDS for high-performance data management applications well-suited for meeting the 3Is needed for information interrogation and investigation (i.e. Interactive, Iterative and Immediate).

An alternative aspect of the unary keysets comprises the previously mentioned Bit Offset Structure (BOS) and Bit Offset Byte Storage Structure (BOBSS), which will be further explained with reference to FIG. 10F.

As data is atomized it goes through a multistep process involving Attribute Flattening and Fact Reduction. Attribute flattening takes each item in the domain of an attribute and creates a separate dataset (stored key list). For example, a table in OLTP or ROLAP (Relational OLAP) system may capture potential list or types of customer as shown in FIG. 1K, wherein each of the four domain values may be flattened into their own respective datasets (list of stored keys) in HASIDS containing keys of customers (e.g., the data called 'DS_Males' will have all the keys corresponding to male customers). Semantic data about Males may be stored in the metadata which is language specific to aid in query statement parsing and subsequent creation of query expression.

When flattening happens using the Bit Offset Structure (BOS) for data storage, within 'DS_Males' the relative position of each matching unary key is set to a value of one as illustrated in FIG. 10F.

When flattening happens using BOBSS, there would be only one dataset 'DS_RACE' for an OLTP attribute 'RACE' having four domain values, and the matching key would be set to a domain byte value between 0-65535, e.g. byte value of 65 for Black, byte value of 66 for White as illustrated in FIG. 10F.

Facts may be reduced to facts associated with a unary key (illustrated earlier under fact reduction). Semantics about facts may be stored in the metadata which will be language specific to aid in query statement parsing and subsequent creation of query expression. The metadata for a fact is identical to that of a dimension in scope and semantics. However, facts have additional information like the data length and number of decimals. This is illustrated in an example depicted by FIG. 10I.

With atomized information, data-relationships and semantic context, HASIDS may not only support creation of higher-order information (contextualized, but compound query expressions), it may also provide metadata which is agnostic with regard to the data but is data-specific for natural language processing and/or Application Programming Interface (API).

Inter-cluster Data Interrogation: Data Interrogation can be performed by querying for data across different clusters by using link sets. Link sets store the mapping between cluster keys and define such relationship by providing the inter-cluster linkage. The relationship between the datasets (e.g., unary keysets) across the two clusters can be established by linking keys of the clusters belonging to the link sets. Respective keys in each cluster may be referred to as cluster keys, with a first cluster of a link set comprising a first cluster key and a second cluster of the link set comprising a second cluster key. The first cluster key may be in its natural sort order in the first cluster while the second cluster key may not be in its natural sort order in the second cluster in one example. The first cluster key may be mapped to the second cluster key and queries may be performed by searching the first cluster using the first cluster key and finding cluster keys such as the second cluster key of the second cluster which map to the first cluster key. If the direction of the query is changed, i.e. if the query is first performed on the second cluster and then linked to the first cluster—a reverse link set is said to be established, with the second cluster key appearing in the natural sort order and mapped to the cluster keys of the first cluster, such as the first cluster key.

While the example aspects in FIGS. 1A-K have been shown and described with reference to a record, such as record 100 with order details, it will be understood that the exemplary aspects may be extended to various other database management scenarios without deviating from the scope of this disclosure. For example, HASIDS implementations may be advantageously deployed for interrogation and investigation of data or content captured from almost any software application such as payroll management for companies, corporations, firms, etc., wherein employee IDs or other personnel identifications may be used in place of order numbers in creating the data sets (e.g., as shown in FIG. 1B). Similarly, billing software for accounting firms, law firms, etc., may also advantageously use HASIDS implementations with invoice numbers or other billing system identifiers instead of order numbers in analogous manner. In yet other examples, case management, docket management, etc., for such firms or companies may also benefit from HASIDS implementations with case reference numbers used in place of order numbers. Skilled persons will recognize efficient implementations of the above-described use cases with appropriate associated fact and attributes in creating unary key lists in data atomization and related querying as discussed above. Skilled persons will also recognize numerous other example cases wherein such HASIDS implementations may be advantageously deployed in accordance with the teachings of this disclosure.

With reference to FIG. 2, exemplary aspects wherein HASIDS may support various other forms of data intensive applications some of which are shown, typically such applications are classified as Decision Support, Business Intelligence (BI) or Analytics applications and these involve collection, analysis, presentation, and dissemination information that may involve historical, current and/or predictive data, with the following additional explanations provided.

Ad-hoc querying: HASIDS may natively support ad-hoc querying and creation of higher-order queries with the ability to support real-time higher order context creation by dynamic run-time association of data based on the universal key.

Data Visualization and Reporting: Presentation of data suitable for operational or strategic decision making that may involve management or operational reporting, collaboration, planning and monitoring of appropriate subject areas.

Text Mining: Atomization of unstructured information from sources such as web-pages, social media, customer complaints/comments, etc., and building content warehouse to derive patterns and trends based on text categorization, clustering, semantic/context extraction and granularization, and sentiment analysis. Such information is first converted and stored as text.

Business Performance Management: This involves collation of data regarding corporate or enterprise business processes with the intent of discerning pattern and meaning in business data to respond appropriately to manage performance and risks. Such an approach to performance management may be a part of a Strategic Management process involving benchmarking for comparative analysis of business process and performance metrics to industry best practices in order to support formulation, implementation and tracking of major goals.

Pattern Matching: Given the four-degrees of atomization—patterns and meta-patterns in the data can be searched by applying algorithms that may use a combination of correlations, rule-based or other techniques at different levels of information.

Data Mining: Discovery of patterns in large datasets using methods that involve one or more approaches such as Machine Learning and Statistics.

Other Business Analytics involving Predictive Modeling and Prescriptive Modeling that can benefit from highly atomized data with semantics/metadata or aspects involving interrogation and investigation of data.

OLAP (Online Analytical Processing): HASIDS meta data can be extended in two ways to create OLAP: (1) Stored Keys, Stored Facts Mode (like conventional OLAPs, the multidimensional coordinates and their pre-summarized data is stored); (2) Stored Keys, Dynamic Facts Mode (multidimensional coordinates are stored, but summarization is done at run-time); and/or (3) a Hybrid Mode—i.e., a hybrid of the above two modes.

Document Management and Analytics: Text data from documents can be used for text mining after the text has been atomized. A majority of the words of a language or a specialization can be related to independent keysets in a HASIDS database and such datasets can be used for document searches. Such searches may support contextualized search with semantic support for interrogating such documents. Such document specific HASIDS or document warehouse can then be integrated to associated data warehouse to truly manage data and associated documents as a common pool for data and knowledge base for information interrogation.

Structured and Unstructured Data Integrated Warehouse: Structured data from OLTP systems or other systems can be integrated with associated unstructured/text data (such as documents, web-pages, social media, etc.) to create an integrated HASIDS database with atomized data from such structured and unstructured sources.

Personal Information Warehouse: as HASIDS retains data at an atomized level, personal information from different sources such as banks, credit card companies, gas stations, retailers, membership clubs, airlines, hotels, etc., can be integrated into a personal information warehouse to provide detailed data about a person or a family to better understand, plan, forecast and manage personal financials. HASIDS can help integrate such information easily because of the atomization and further help with analysis, mining and benchmarking of such information as higher order context and pattern matching can be performed.

Context based Information Collaboration: Similar to the above, just that this would be the result to collaboration between two entities such as governments sharing specific and select information about persons of interest.

In exemplary aspects, Federated/Foundational Universal Data Warehouse is disclosed, wherein two or more clusters may be stored in federated data warehouses, wherein each of the two or more clusters comprise one or more unary keysets, wherein the two or more clusters associated with two or more contexts, and wherein the federated data warehouses comprise storage locations in two or more geographical areas. For example, a constellation of HASIDS database clusters with atomized data, sourced from structured and unstructured source systems, for different subject areas, across different geographies and in different languages, covering a variety of inter-relatable information can retain their respective cluster silos (i.e. be independent HASIDS databases) and at the same time be linked for inter-cluster data interrogation using Link Sets and additional metadata or semantic data. Such integrated cluster silos can form federated data warehouses that are independent and yet integrated with data management that provides for local-and-yet-global needs. Such needs may be competing-and-complementing independent-and-integrated required by a federated approach to enterprise data management. Such federated data warehouses can be the foundational data stores for all data management and data consumption requirements across a larger enterprise, providing granular and summarized data. This approach of integrating cluster silos across different subject areas with atomized data from structured and unstructured data sources makes it universal from a perspective of data management.

Figure 3:
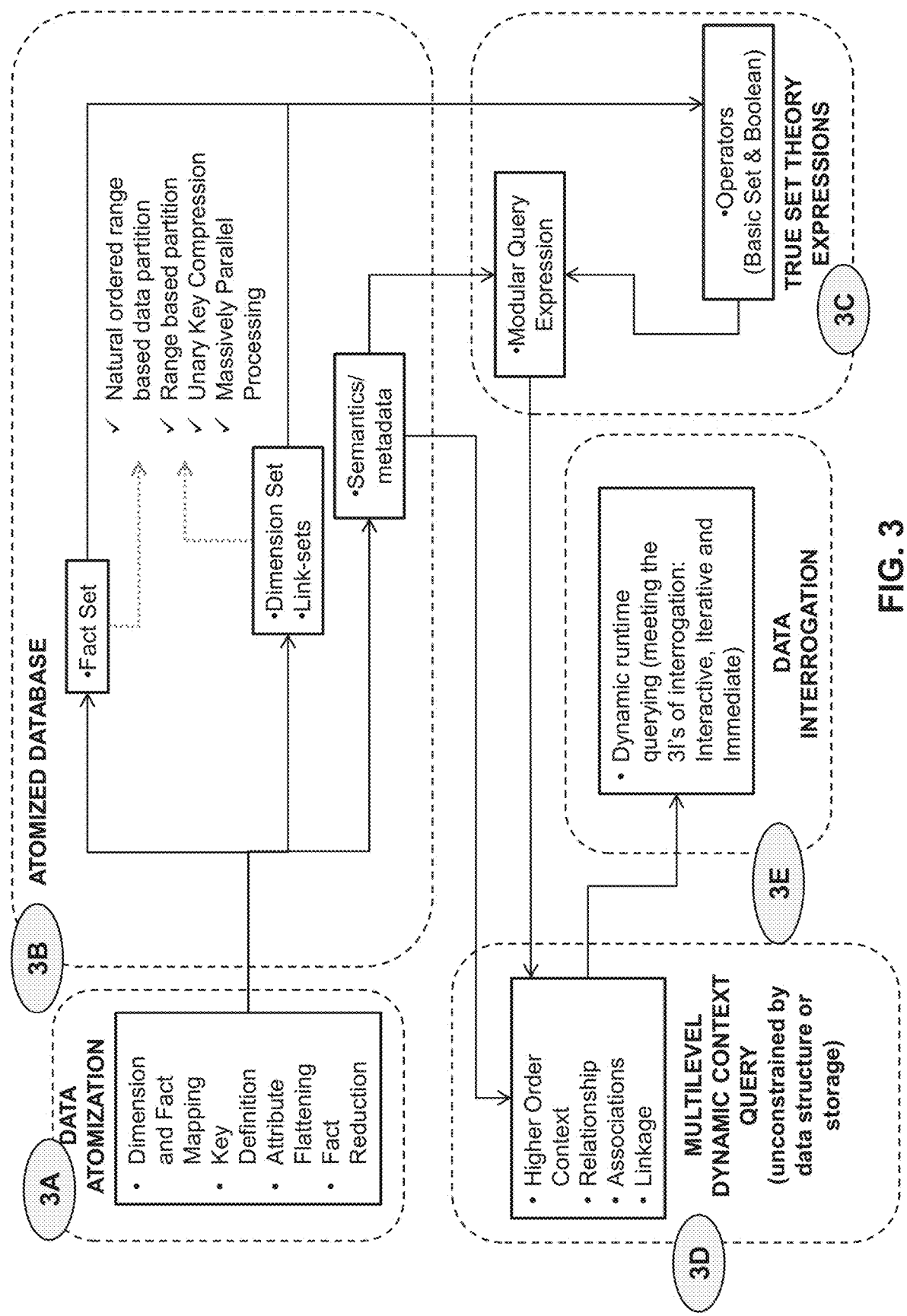
FIG. 3 illustrates an overall view of data creation and data consumption flows for the exemplary HASIDS architecture.

With reference to FIG. 3, an overall view of data creation and data consumption flows for the exemplary HASIDS architecture is shown. Each of these blocks will be discussed in greater detail in this disclosure. Briefly, block 3A refers to data atomization, as was previously discussed. Block 3B refers to creation of a database using the atomized data created in block 3A. Block 3C shows the true set theory expansions for query expressions and operators used thereof for querying the atomic data base in Block 3B. Block 3D shows aspects of multilevel dynamic context query using the modular expressions of Block 3C and the semantics/metadata from Block 3B. Block E illustrates aspects of the data interrogation and runtime querying which satisfy the 3Is criteria of interrogation noted above.

Figure 4:
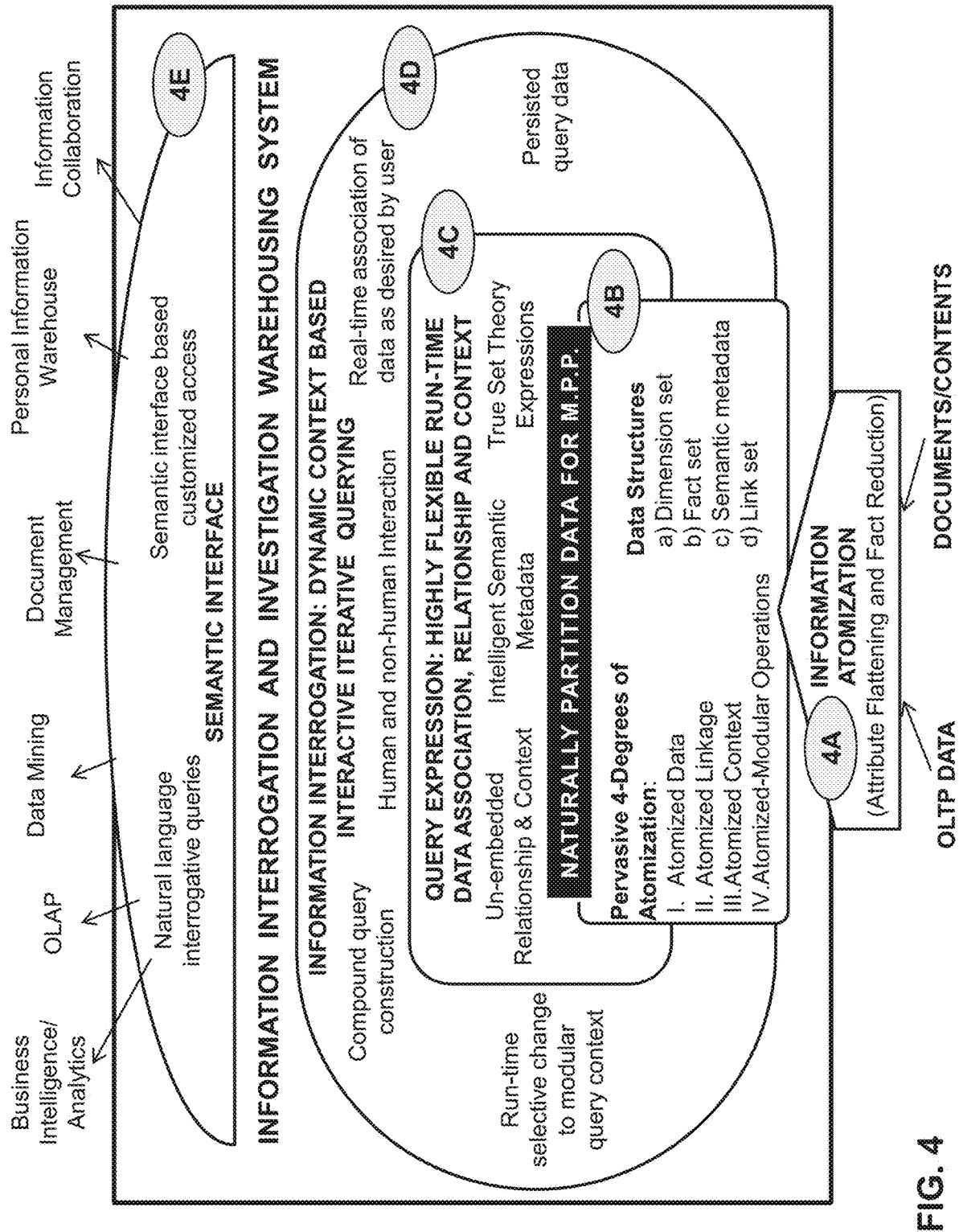
FIG. 4 illustrates the exemplary aspects of HASIDS solution architecture

FIG. 4 illustrates a HASIDS solution architecture according to an example aspect. The following layers are shown: Information Atomization 4A, Atomic Data Structures with Naturally Partitioned Data for Massive Parallel Processing 4B, Query Expression based on Set operators and Mathematical functions Highly Flexible Data Association 4C, Information Interrogation: Dynamic Context Based Interactive Iterative Querying 4D, and Semantic Interface for supporting NLP interface and APIs 4E. The above layers have already been described in various aspects of this disclosure and will be further explained in the following sections.

Figure 5:
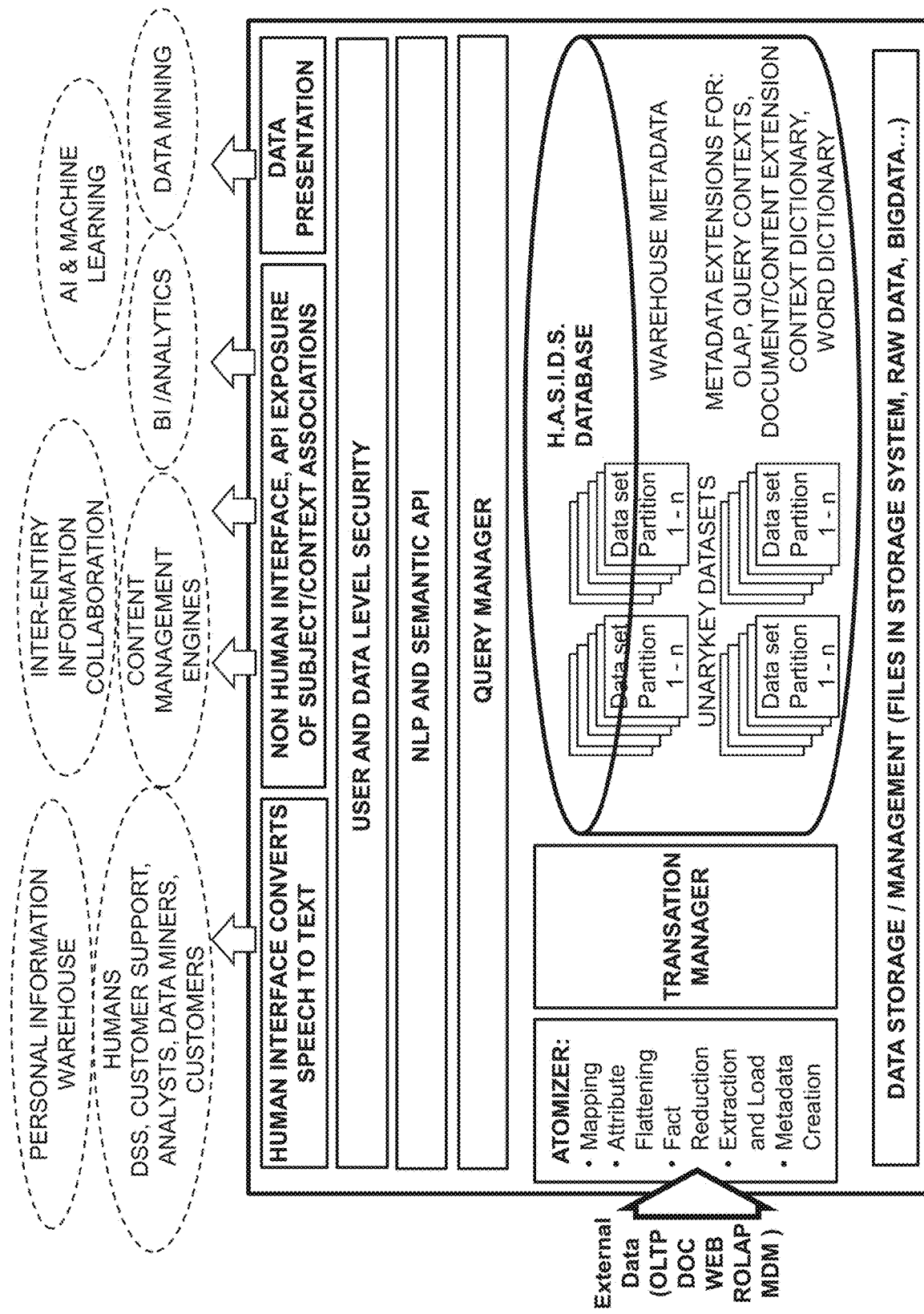
FIG. 5 illustrates a high-level technical architecture of HASIDS.

FIG. 5 shows a high-level technical architecture of HASIDS. The various functional blocks of FIG. 5 will be explained in later figures and related descriptions based on expanded views of the various functional blocks. The HASIDS system is generally configured to store data at contextualized indivisible atomized levels. Tabular data sourced from conventional OLTP systems must be sliced and diced in every dimension or field/attribute to its most indivisible level as noted above.

In some exemplary aspects, the following features of HASIDS may be present. When source tables contain facts, atomization is first performed across the dimensions, followed by reducing the source table to a keyset containing the keys and the facts only in exemplary aspects. Each atomized information set comprises a key list containing the same unique representation or keys of the source entity/table, essentially a unary keyset. In the event when an original or parent key is a composite key, a surrogate key may be generated to uniquely identify each parent entity/record. All keys comprise numbers only in exemplary aspects. When the original keys are non-numbers, surrogate keys using numbers may replace the original keys. All keysets associated with the same source entity/table may have the same representation or keys across them and naturally ordered. All keysets associated with the same source entity/table may be partitioned in the exact same ranges. Each keyset may be associated with a certain context, the context in turn derived from the element or column of the source entity/table that produced the keyset. When an element or column from a source entity/table has a domain of allowable values, each value may be represented as a distinct sub-context within the context representing the element/column. Each context is associated with the subject representing the source entity/table and may be associated with keys, tokens, phrases that typically represent semantics occurring in a natural language. There is no overlapping of keys within keysets associated with the same context and subject in exemplary aspects. All keysets associated with the same subject may have keys sourced from only one parent/source to ensure integrity of the data, linkage and context it represents. The above associations may be stored in a metadata or dictionary for run time association and relationship building between keysets (dynamic context generation) instead of any pre-defined relationships. Relationship between keysets may be expressed as mathematical expressions supporting the operations associated with sets and reduced to basic set theory operations such as those based on union, intersection and difference of sets. Human-machine or machine-machine interaction may be based on natural language semantics. Non-human interaction may be allowed to interface with external applications like data mining engines, report processing engines, business intelligence engines, data analytics engines etc. The above features are platform agnostic and management system agnostic.

The following behavior principles of HASIDS may be employed in some example aspects. An important goal of HASIDS is to overcome the constraints associated with traditional data warehousing systems, data mining systems and any system suitable for analytical and business intelligence processes. Humans may interact with the system directly using natural language/speech. HASIDS addresses this by incorporating a speech recognition interface that converts human speech to text for processing. Non-human interaction may also interface with external applications like data mining engines, report processing engines, business intelligence engines, data analytics engines etc. HASIDS addresses this by incorporating an API that exposes the subjects, contexts, key words, tokens and phrases from its dictionary and their associations. The natural human expression may be interpreted by the system dynamically eliminating the need for a human specialist to convert human expression into a structured language for the machine to understand. HASIDS addresses this by incorporating a natural language interpreter that breaks down human sentences and expressions into subjects, contexts, actions key words and phrases, to determine matching datasets and their associations and relationships. The need to know any specialized language by a specialist to convert human requirements into a language understood by the underlying system is eliminated. The system is designed to be highly interrogative, allowing inputs to change dynamically on the fly, adding/deleting/modifying contexts and associated meanings. HASIDS addresses this by allowing an original human expression to be changed at run time while the data is still being processed by intelligently associating changing contexts to the running processes. The system eliminates the need for an interrogator to wait for data from the original input before another input can be provided. The system provides for the rapid change of the output based on rapidly changing inputs, catering to reduction, expansion, comparison, what-if scenarios etc.

The following design principles may also be incorporated in some exemplary aspects of HASIDS. Data Structures are designed not restrict the scope of any interrogation from the minutest detail level to the highest aggregate level; allow drill up and drill down capabilities. HASIDS addresses this by storing data at contextualized indivisible atomized levels. Data is sliced and diced in every dimension to its most indivisible level. Each atomized information set contains the same unique representation of the parent entity, the unique keys from the parent entity, the representation itself is atomic. All datasets associated with a parent entity have the same representation across them, ordered in a similar manner and partitioned in a similar manner. Data structures are designed to be independent of each other and not have any pre-defined relationships between them confining their usage to only a certain way. Each dataset is associated with a certain context, the context in turn derived from the element that produced the dataset. Each context is associated with the subject representing the parent entity and is associated with keys, tokens, phrases that typically occur in a natural language. The above associations are stored in a dictionary for run time association and relationship building instead of any pre-defined relationships.

Additional design principles for some HASIDS implementations may also include the following. (1) in HASIDS the underlying storage structures and systems can be any of the available systems today. These can vary from file based systems on any operating system and platforms ranging from personal computers, middleware to BigData platforms, handheld devices like mobile, tablets etc., and direct storage on raw disks; (2) all datasets with a subject area or cluster have identical structures, dimension clusters have single elements and fact clusters can have two or more elements when stored in unary format. When stored in the BOBSS format, only one fact is stored in a dataset that can be accessed by direct position offset. Hence, the number of operations across these data sets is drastically reduced, preferably, to just three, e.g., union, intersection, and difference. For better efficiency BOBSS data may be loaded into memory as bit sets, wherein each bit within the bit set would represent an identifier (ID) having a value of zero (invalid) or one (valid). The set operations (union, intersection, and difference) are further simplified at the bit level. The simplicity of operations eliminates vast overheads required for processing; (3) the datasets in a cluster are partitioned in identical ranges, allowing massive parallel processing very naturally; (4) overheads associated with indexing are eliminated; (5) since the datasets are in the most granular form, no details are lost during aggregation operations. Drill-up and drill-down capabilities are a natural part of HASIDS; (6) because there is no loss of details associated with dimensions or facts, standing up separate operational data stores for slice and dice operations is eliminated. Data is already sliced and diced and ready to be used in any manner; (7) due to the granularity of the data, data mining operations are naturally aligned to HASIDS. Mining algorithms available in the market can be employed very effectively; (8) since each dataset is associated with a context within a subject through keys, tokens and phrases, interpretation of a human interaction in natural language form is logical, efficient and fast. The interpretation is naturally aligned to natural language processing; (9) the nature of the interpretation eliminates the need for a human to convert natural language to a structured query language as understood by traditional warehousing systems; (10) HASIDS is naturally oriented towards a process of high interaction between a human and a machine for typical warehousing operations, integrating the underlying data structures, data access and processing and human language interpretation; and (11) HASIDS can generate meaningful patterns from the datasets by associating datasets in a random manner within the confines of their associated context and subjects, e.g., a generated pattern could show that majority of customers who bought the LG washing machine were most likely to buy the Tide washing powder detergent.

An example DOMAIN/SITUATIONAL CONTEXT includes: Dynamic areas of business for analysis or interrogation wherein context can be built on the fly, e.g., demographics of employees, revenue of company, etc. In example aspects, HASIDS is therefore a dynamic context processing system based on atomized information across the enterprise associated with data contexts that define the behavior and interpretation of the data and their associations. Data relationships are not embedded directly within the data structures/objects, instead are dynamically contextualized based on interpretation of the inputs at runtime.

With respect to dynamic context processing, exemplary aspects of HASIDS include the following features: (1) Dynamic context based analysis, interrogation interfaced to human and non-human inputs (speech, automation); and (2) To derive meaning to interpret a human or non-human interrogation to achieve: Flexible and unconstrained information and data semantic, with the ability to quickly change and refine/redefine data semantics based on changing inputs.

The following types of datasets are included in exemplary aspects of HASIDS: (1) Atomized data refers to any data (the most atomized form of information) in HASIDS which has the characteristics: General Data Context derived from an attribute within an entity (such as the attribute 'sex'); each data context can be subdivided into specific sub-contexts derived from a domain of allowable values for an attribute (such as 'male', 'female' and 'other' within the sex attribute); and represented by a unique identifier or a key (sourced from the unique key within the parent entity); (2) Unary dataset: a list of atomic data identifiers or keys (one dimensional dataset); (3) Dimension dataset: A unary key data set or a list representing most atomic dimensional attribute of data; (4) Fact dataset: a list of atomic data identifiers or keys and associated facts (multidimensional array) referred to as a nD-List in a unary key list structure representation, further optimized in the BOBSS representation to a single dimension for each fact located at an offset from the beginning of the file and determined by the unary key; and (5) Link set: a set of only two key types that help join datasets across two clusters (two dimensional array) referred to as a 2D-List. Atomization in this contest refers to breaking information into atomized datasets (dimension dataset, fact dataset and link-set). It is noteworthy that the keys in all datasets are naturally ordered and partitioned by distinct unique ranges defined for the cluster; and there is no pre-structured or physical relationship assumed between the datasets.

A logical data model for an aspect of HASIDS includes the following: (1) a cluster, which is a collection of data sets that have common key, wherein the clusters typically capture information from an OLTP-entity, star-schema-dimension/fact or documents; (2) cluster key, which is the only key in any dimension or fact dataset; (3) dimension cluster, which is a logical grouping of dimension datasets (with a common key); (4) fact cluster, which is a logical grouping of fact datasets (with a common key); and (5) meta cluster, which is a collection of link sets.

Figure 6:
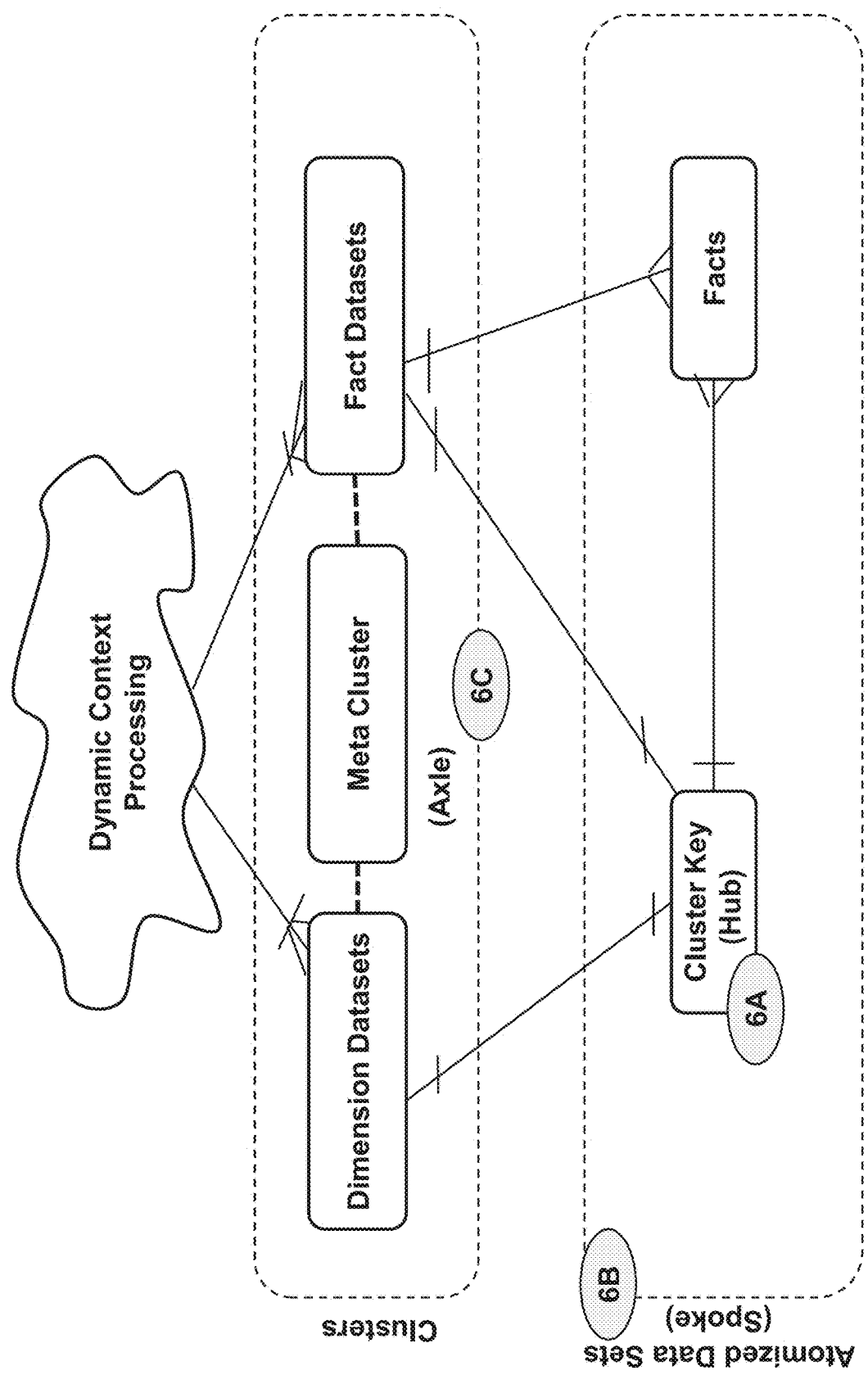
FIG. 6 illustrates an example schematic model using a logical data model of HASIDS.

Referring to FIG. 6, an example schematic model using the above logical data model may be as follows: a Representation Model elements may include elements of a wheel to represent a cluster. HUB 6A: Represents unique key for the clutters it belongs to (actual key values in the list—physical representation), SPOKE 6B represents atomized information set (dimension or fact dataset) (actual attribute information—exploded physical representation), and AXLE 6C represents a link set (physical).

Figure 7A:
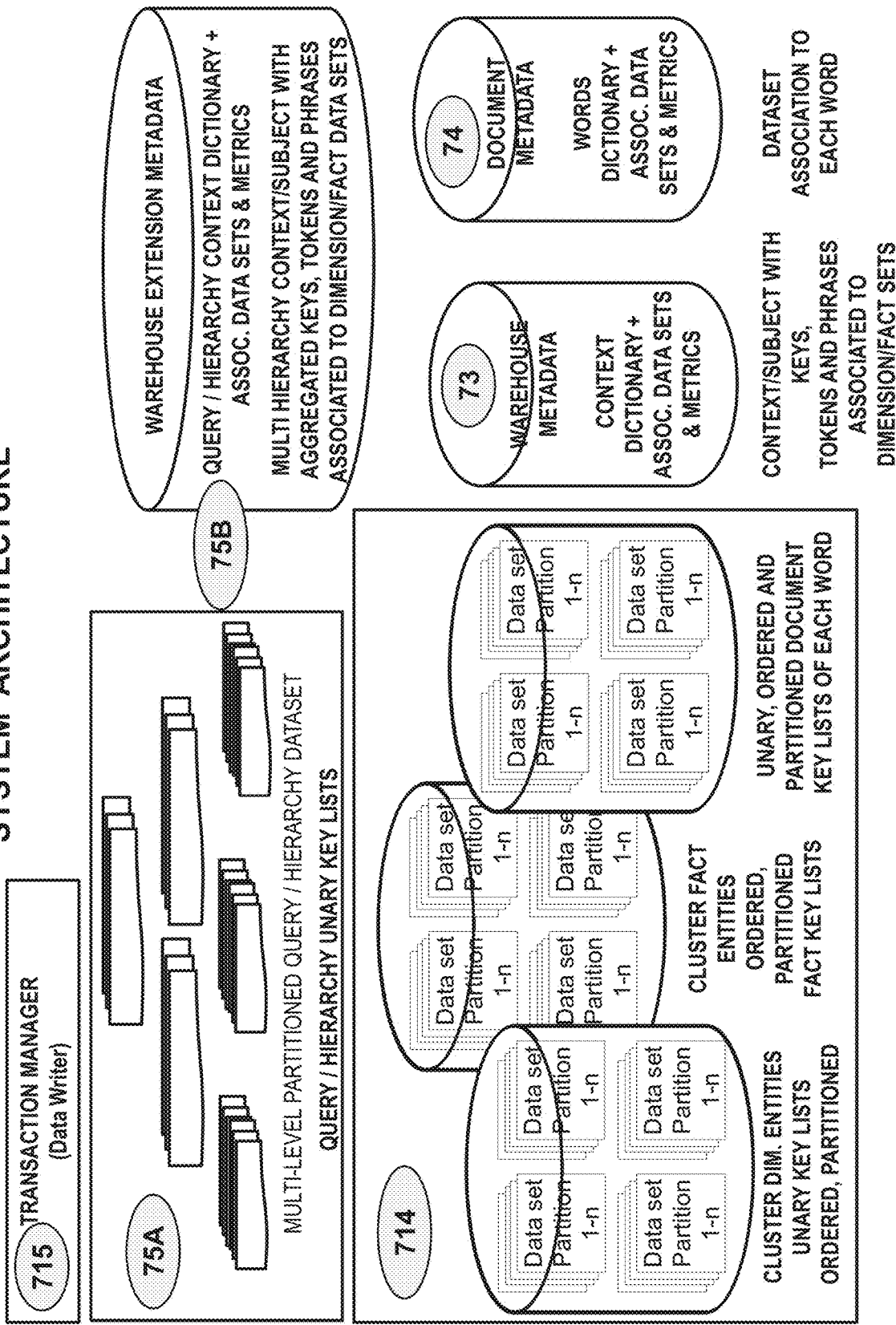
FIGS. 7A-C illustrates an exemplary detailed system architecture for a HASIDS deployment for the high level HASIDS architecture as depicted in FIG. 5.
Figure 7B:
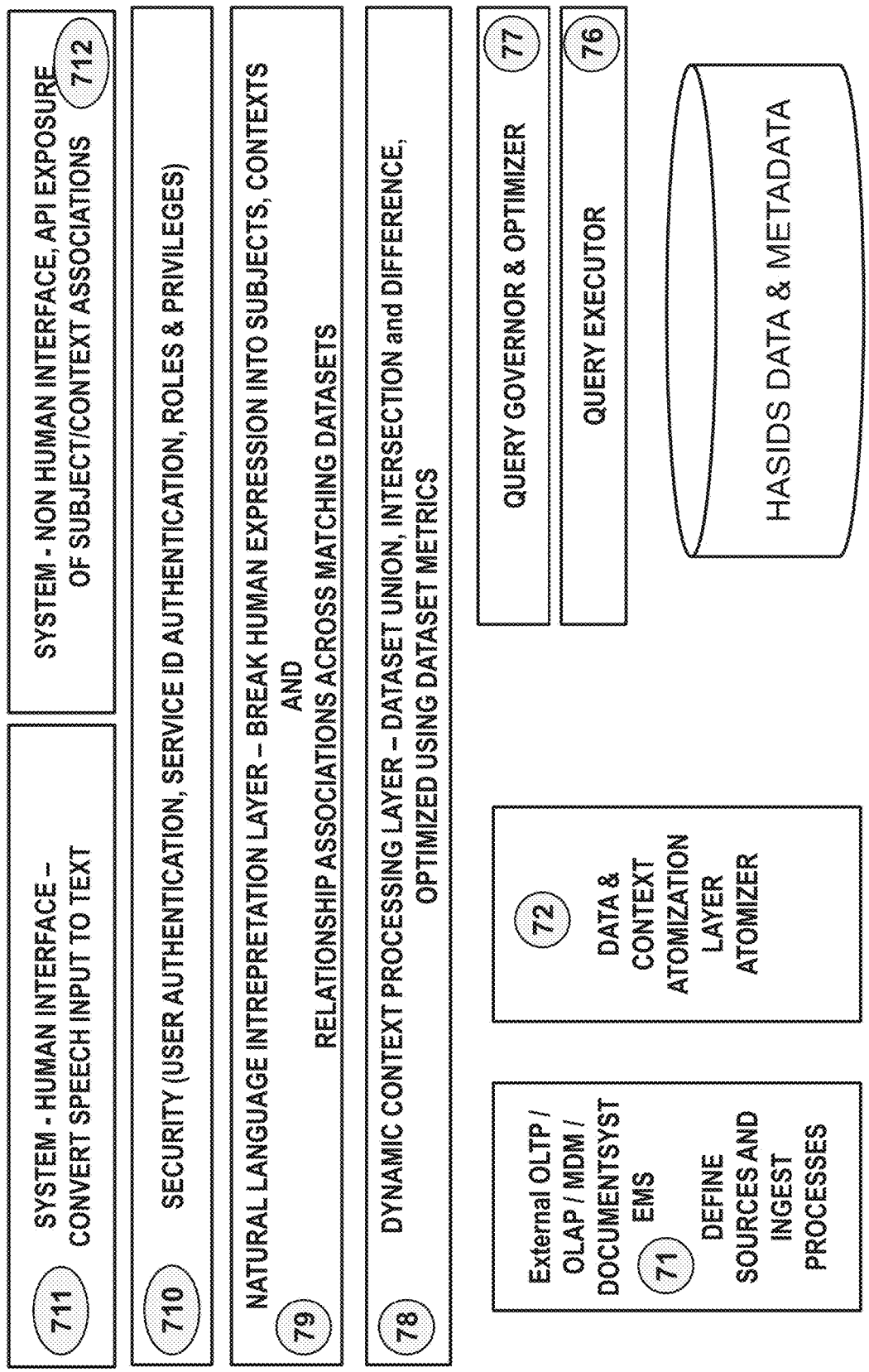
Figure 7C:
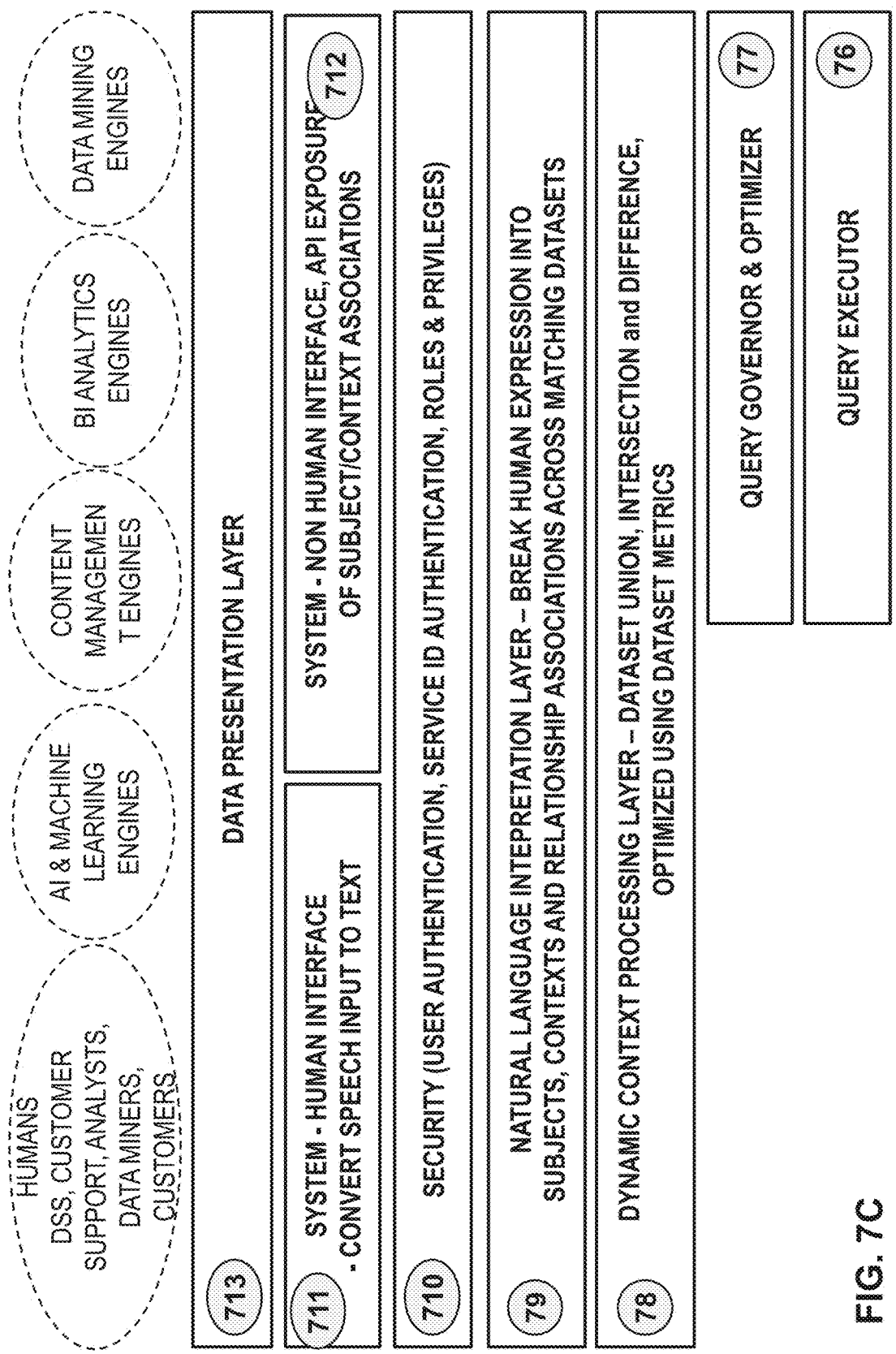

Runtime generation of query expressions may involve building associations and/or relationships between the datasets dynamically and on-the-fly by bridging the various contexts using key words, tokens, phrases extracted from human/system input via a process of highly interactive and interrogative sentences related to one or more subjects FIGS. 7A-C illustrate an exemplary system architecture for a HASIDS deployment. Reference numerals 1-15 designate respective blocks shown in FIG. 7A-C, which will be explained further below. In more detail, the architecture consists of the input components 71 comprising: source and target definitions, metadata generation, context separation from data via the metadata generation process and the basic information necessary for data extraction and atomization.

The above data is used by the atomization layer or atomizer 72 to perform the actual task of data extraction, dimension explosion and fact reduction and metadata statistics information generation. Datasets representing each exploded element are generated in this process by the Transaction Manager 715 along with the necessary partitions as defined by an administrator. The atomizer 72 sends data in bulk to the transaction manager 715. The transaction manager 715 maintains a list of transaction writers. A transaction writer is a cluster of data writers that write data into the datasets as one block of work. Either the entire block is written (commit in database parlance) or undone (rollback in database parlance) in case of a failure of any one data writer. If there are five attributes in a record, in BOBSS, there would be five data writers clustered into a transaction writer 715. If in the incoming block of atomized data, there are identifiers in one set and missing in another set, those records are considered invalid, unless the attribute associated with the set is defined to allow null values. The entire record of data is rejected from being written to the unary datasets. Only a complete record is defined to be a transaction. If the incoming data does not have keys/identifiers, the Atomizer 72 will request for a block of keys/identifiers from the Transaction Manager 715. The Transaction Manager 715 maintains key generators to guarantee a unique identifier/key for each incoming record. There would typically be one key generator for each cluster.

At the completion of the atomization process, HASIDS data and context data within the metadata structures (warehouse metadata 73, document metadata 74) are separated and atomized and all data storage structures flattened with a common cluster key. This is a core function of HASIDS.

These atomized information sets can be used to build hierarchies 75A of information trees that allow full context based interrogation and supporting important OLAP features like roll up and drill down.

A query governor & optimizer master component 77 with a slave query executor 76 form the backbone of actual dataset interactions using atomic set based actions like intersection, union and difference. The query governor 77 is responsible for tracking all resource allocations, computing free resources and determining the resource requirements for running queries, allocating priorities to them, allocating resources for their execution, placing them on queues during resource crunch and maintaining a cluster of query executors. Query executors 76 in turn take the input queries and break them into parallel processes, compute results and return the results to the governor.

Feeding the query governor component is the dynamic context processing component 78, which is responsible for building relationships between various contexts, identifying the associated datasets and building the most optimized mathematical representation using dataset names incorporating intersection, union and difference set operations.

The dynamic context processing component 78 is tightly integrated with the Natural Processing Interpretation Layer 79, which takes natural language sentences and expressions as input and breaks them into subjects and contexts, action identifiers, output requirements and in general cleans the input to remove all extraneous information irrelevant to contextual processing. Once cleaned, subjects identified, contexts evaluated, relationships identified, the dynamic context processing component 78 takes over to optimize the relationship processing.

In between all user interfaces and the processing layers is a security layer 710 that defines roles and privileges to be assigned by the administrator to user groups which drives what a user can and cannot query.

Inputs into HASIDS is two-fold, human interface 711 and non-human interface 712. The human interface 711 allows a user to input sentences and expressions as natural speech, which in turn is converted into text for downstream processing. The non-human interface 712 is a services layer exposing the metadata to external systems that can use the exposed APIs to interrogate HASIDS. In addition to the two interfaces above, a data presentation layer 713 provides a user interface allows to build relationships using exposed metadata to interrogate HASIDS.

In HASIDS Native Data Management 714, atomic data within HASIDS can be stored natively without the need for any external management system. When data is stored internally or natively, it is recommended that the data be stored on striped disks. Disk striping breaks the data into blocks and spreads them across multiple disks. Thus, two or more unary keysets may be stored in two or more memory locations, wherein the memory locations comprise segments or partitions on one or more disks. Since each dataset in HASIDS is comprised of multiple segments/partitions, each of the partitions may be striped across multiple disks. Doing this will allow faster reads and writes or increased performance. Striping can be either via redundant array of independent disks (RAID) or any other system widely used in the industry. Data can also be stored on multiple disks across different machines. This allows parallel processing of the data reads and writes. The Transaction Manager can manage data writers across multiple computers enabling massive parallel processing.

The following aspects pertain to the construction of HASIDS architecture. (1) The Atomizer is important for achieving the four degrees of atomization, the core of HASIDS and drives the separation of data from context, making the context the central theme by which dynamic context and higher order context is generated; (2) Warehouse Metadata 73 stores the most granular meaning/context of data along with the relations to the actual unary datasets enabling dynamic querying and generation of higher order context associated with natural language semantics inputs; (3) Document Warehouse metadata 74 stores the granular semantics from documents relevant for pattern search and context generation; (4) Warehouse extension metadata 75B includes higher order context of data along with relations to the unary datasets and metrics associated with summation, aggregation etc., relevant to data analytics and complex search patters; (5) Query Executor 76 implements the parallel execution of a sub-query by parallelizing the operation using natural segmentation of data; (7) Query Governor & Optimizer 77 exploits the metadata metrics to determine the most optimal method of query execution associated with resources (memory, central processing unit (CPU), etc.; (8) Dynamic Content Processing Layer 78 uses atomized and higher order context in the metadata to enable the three fundamental requirements of interrogation: Interactive, Iterative and Immediate; and (9) Natural Language Interpretation Layer 79 uses the innate semantics of the data defined at a granular and atomized level and higher order metadata to enable natural language based interrogation and investigation.

Figure 8:
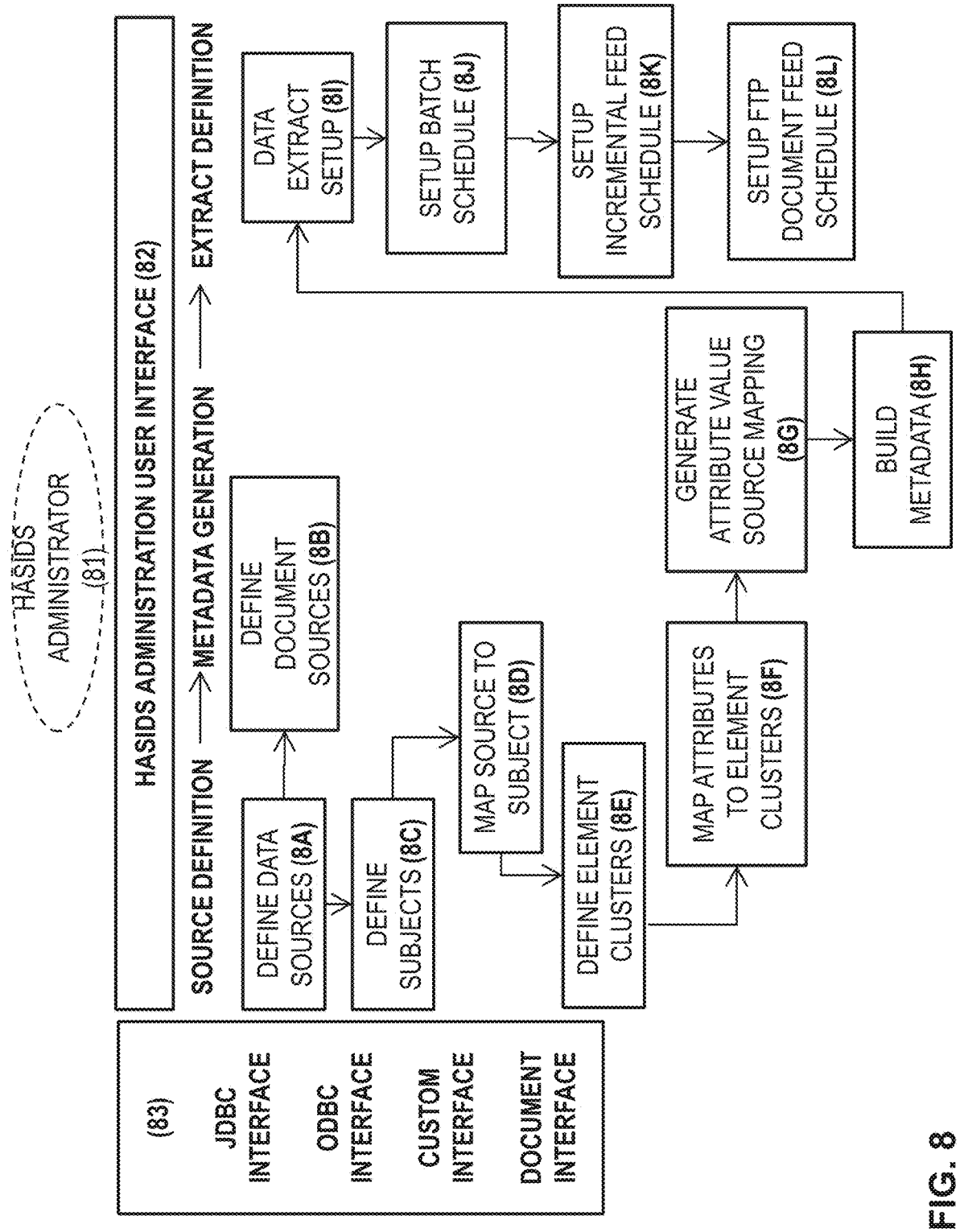
FIG. 8, a process flow pertaining to source definition/metadata generation of an example of HASIDS.

With reference to FIG. 8, a process flow comprising steps 8A-L show a process of source definition/metadata generation (e.g., implemented by Block 71 of FIG. 7B). The HASIDS source definition is the process of identifying the data sources from which HASIDS will extract data. These sources are varied; traditional DBMS systems both mainframe and non-mainframe, relational database management systems, Analytical systems in their various representations, mainframe files like GDG, VSAM, Flat, formatted data and document sources like XML data sources, flat files, spreadsheet files, csv files, delimited files and any other type of data sources having defined formats form one aspect of the sources. Unformatted documents form another source; these can be any kind of text documents based on any word processing systems like MS word, google docs, free form text based files from notepad, wordpad and any other kind of files that can be read using industry standard file readers.

HASIDS uses a combination of interfaces 83 comprising industry standard interfaces and custom built interfaces to extract data and definition from the above sources. Some of such interfaces are the typical JDBC and ODBC database drivers that can connect to any kind of a database management system, SAX and DOM parsers to parse XML data, OLE interfaces to documents, standard word and spreadsheet processors, etc.

Using the HASIDS user interface 82 an administrator 81 may define the various sources (steps 8A and 8B) along with their respective configuration information like server locations, database instance names, connect strings, connecting interfaces etc. These steps are particularly useful in identifying the various system catalogues from which definitions of various structures can be extracted to build the metadata in HASIDS.

Following the above steps, the administrator 81 may define the various subjects in HASIDS (step 8C) and identify the source structures that will make up the data inputs for each of the subjects (step 8D).

Once a subject and its source has been identified, the administrator 81 may define the element clusters associated with the subject (step 8E) and then identify each attribute of the source object mapped to the element cluster along with the sub-components (step 8F). For example, when the source attribute SEX of a Customer relational table is identified to correspond to the SEX element cluster of the CUSTOMER subject, the three domain values of 'M', 'F', 'O', defined in the source system catalog tables are used to define three respective elements, Male, Female and Other within the SEX element cluster (step 8G).

Once all mapping is complete, the administrator 81 may generate the HASIDS metadata (8H). The metadata is the context behind the data from the various sources and is cleanly separated from the data source itself. This is fundamental to HASIDS; the concept of atomized contexts that live independently of the actual data in HASIDS.

Once the metadata generation is complete, the administrator 81 may set up the data extraction processes (steps 8I-L), both the initial bulk extract and subsequent incremental extract batch processes, the transformation (explosion and reduction) processes and the load processes. Similar processes would be set up for document extractions and loads, along with document feed processes using standard transmission channels.

Figure 9A:
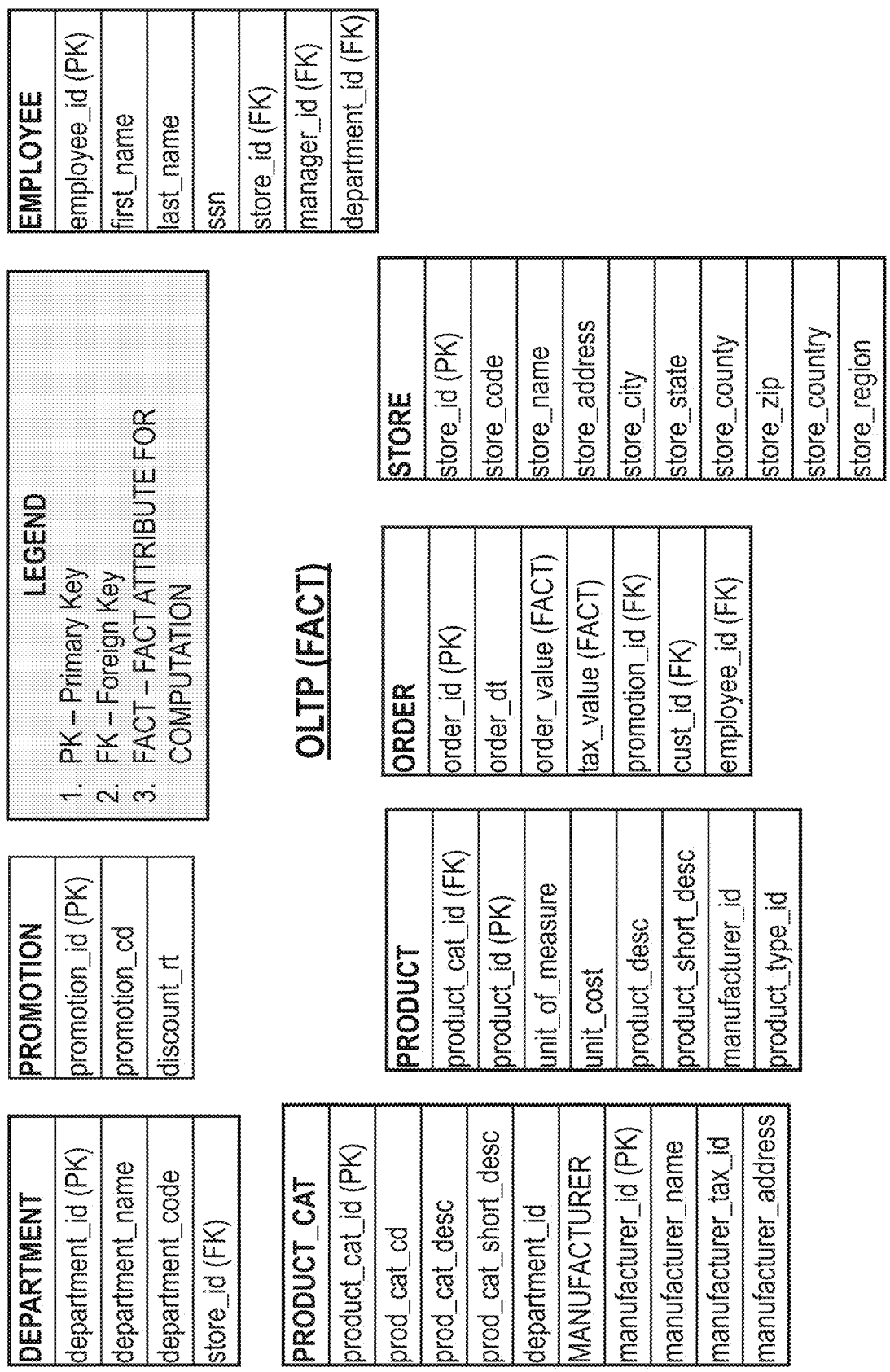
FIGS. 9A-B illustrate an example of source definition/metadata generation based on the example process of FIG. 8.
Figure 9B:
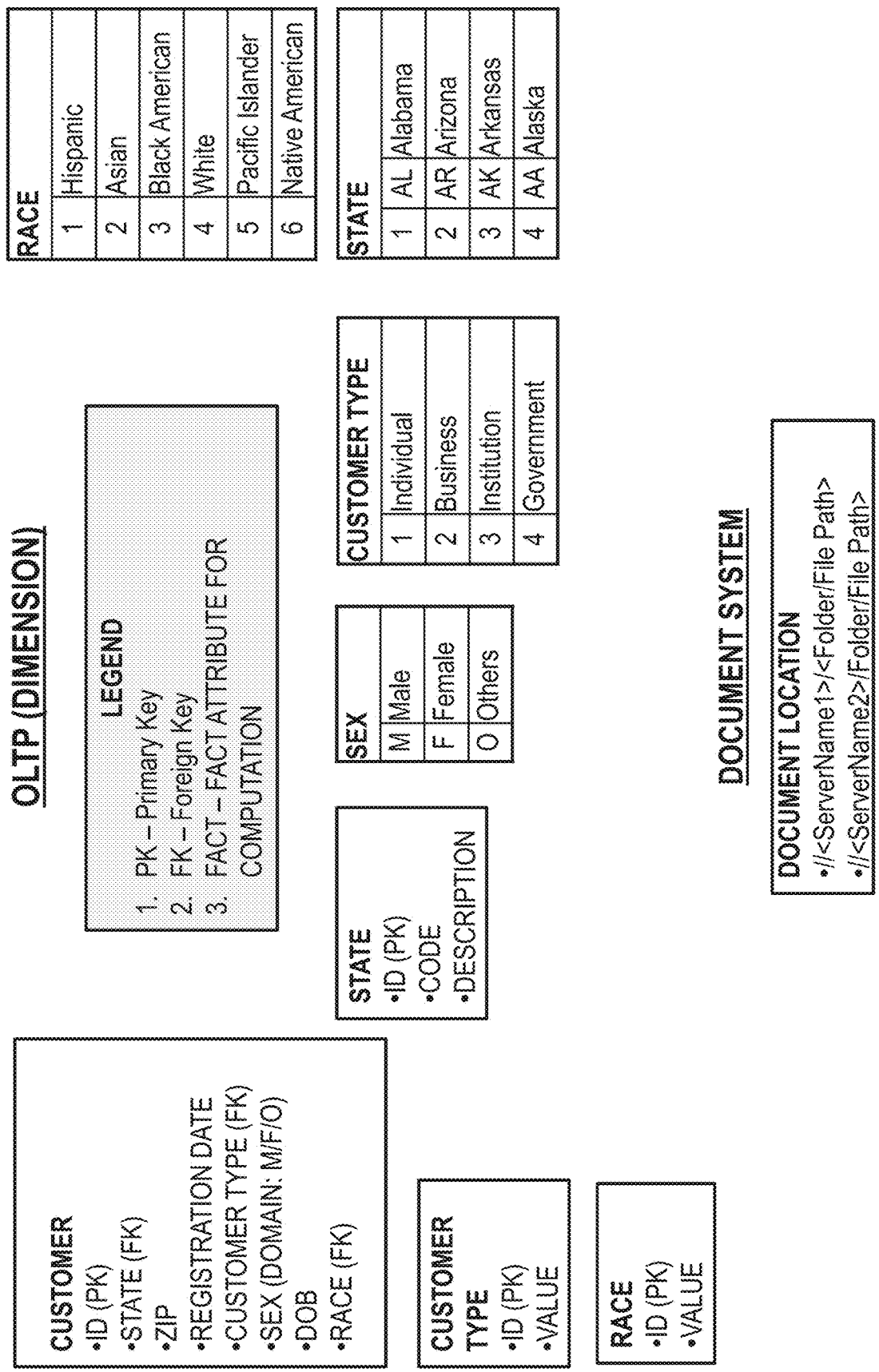

FIGS. 9A-B illustrate an example of source definition/metadata generation (Block 71 of FIG. 7B) based on the example process discussed with reference to FIG. 8 above. More specifically, FIGS. 9A-B depicts examples from an OLTP source system. The CUSTOMER relational table is an example of a dimension table with attributes having either domain values or values based on foreign keys to domain tables. Also shown is an example of a document management system with the shared file structure from which documents can be extracted. The fact examples represent an ORDERS OLTP database containing customer orders for products associated to product catalogues, promotion codes, stores, employees and departments along with the foreign key relationships.

FIGS. 10A-E depict examples of the HASIDS metadata after each step in the process flow of FIG. 8. These figures show the different types of datasets, including unary, BOS, and BOBSS which were previously mentioned.

In further detail, the Bit Offset Structure (BOS) comprises datasets wherein the unary keys are represented as a sequence of single-byte binary values of zero or one. A key in a unary set is identified by a location of a byte associated with the key in the sequence. For example, a key for the BOS is deduced by the relative location of the single byte to the beginning of the dataset and the starting value of the dataset held in a metadata. Thus, a dataset segment whose starting value is say 1,000,001 and size 100,000 may contain a sequence of 100,000 zeros or ones. Accordingly, the $5^{th}$ byte in this sequence represents an identifier 1,000,005 and the $5^{th}$ byte is set to "1", that means that the identifier is associated with the atomic representation defined for the dataset, e.g. Males. Thus, identifier 1,000,005 corresponds to a Male.

In some aspects, two or more sets of unary keysets stored in two or more Bit Offset Structures may be combined into a single set, wherein the binary values in the single set are replaced with unique character encodings. For example, the previously mentioned Bit Offset Byte Storage Structure (BOBSS) comprises datasets wherein multiple BOS sets within an element cluster are combined into a single set and the zero/one replaced by a unique byte as defined in the ASCII, UTF-8 and UFT-16 systems. When using ASCII or UTF-8 based character encoding in the key sets, up to 255 domain values or contexts associated to one attribute or element cluster can be represented. When using UTF-16 up to 32,767 domain values or contexts associated to one attribute or element cluster can be represented. However, in case of UTF-16, 2 bytes may be used to store a key and its associated value, instead of one byte when using ASCII or UTF-8.

In FIG. 10A, Blocks identified as 101A/101B depict sample metadata of source definitions. Blocks 101C/101D depict the subject definition along with the referenced source. In FIG. 10B, Blocks 101E/101F depict the Element (Elm.) Cluster definitions associated with the CUSTOMER subject mapped to the CUSTOMER table in the OLTP system along with its attributes and mapped element cluster definitions. In FIG. 10C, Block 101G depicts the attribute value mapping from the OLTP table CUSTOMER to the elements within the element clusters defined for the subject CUSTOMER.

In FIG. 10D, Block 101H(a) depicts the metadata generated by HASIDS, representing atomic context. A similar Block 101H(b) in FIG. 10E depicts the metadata generated by HASIDS, representing atomic context in BOBSS, wherein each context within an element cluster is assigned a unique byte representation.

FIG. 10F depicts the comparison of the data formats associated with the unary, BOS and BOBSS. FIGS. 10G-H depict the disk storage and memory associated with a single attribute/element cluster across the above three data formats for a set of 25 and 10 million keys respectively. Similarly, FIG. 10I depicts the organization of the fact data in BOBS S based dataset where each fact value is offset by the position of the identifier it represents.

Figure 11:
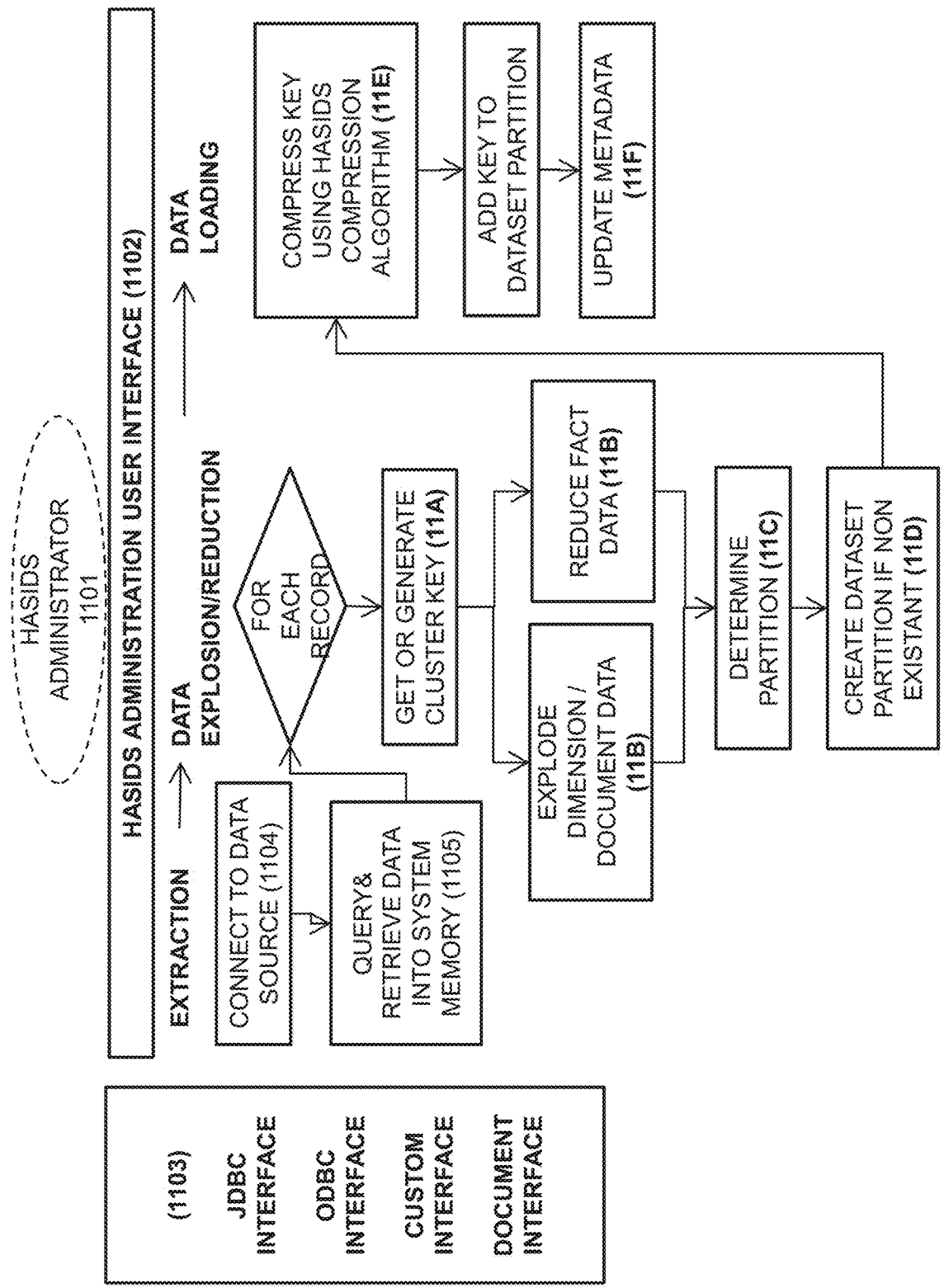
FIG. 11 shows an example process flow for atomization of data for an example of HASIDS.
Figure 12A:
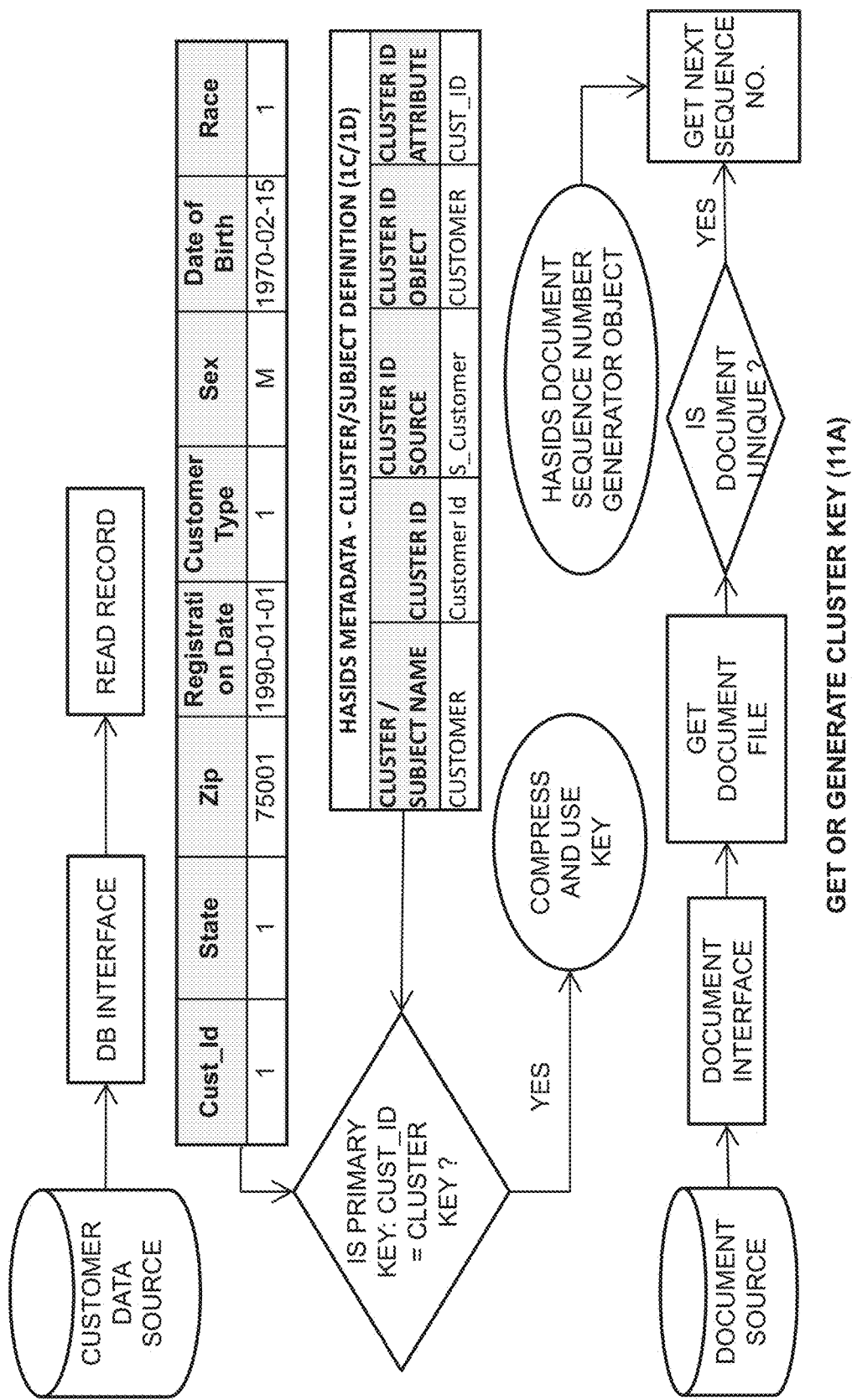
Figure 12B:
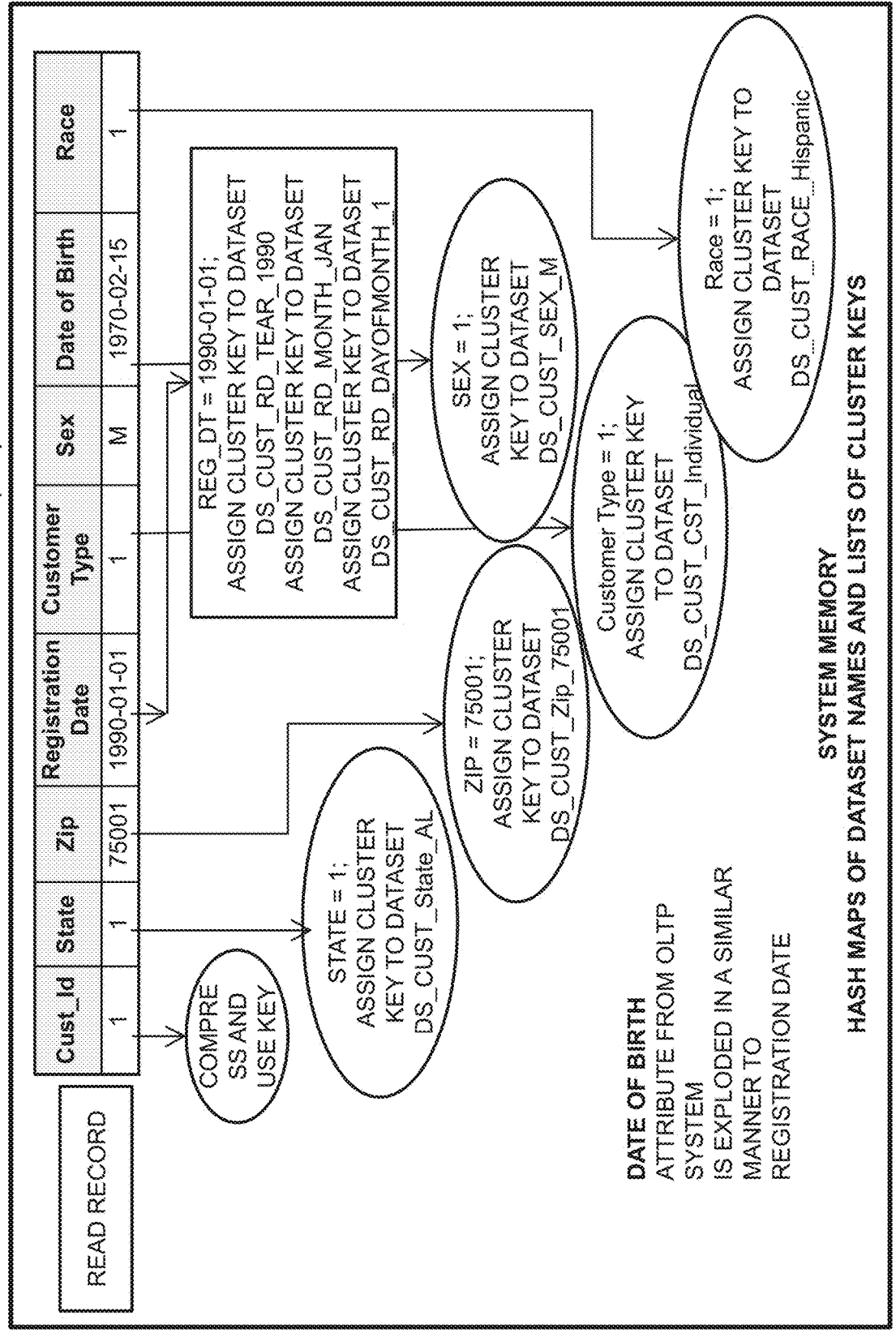
Figure 12D:
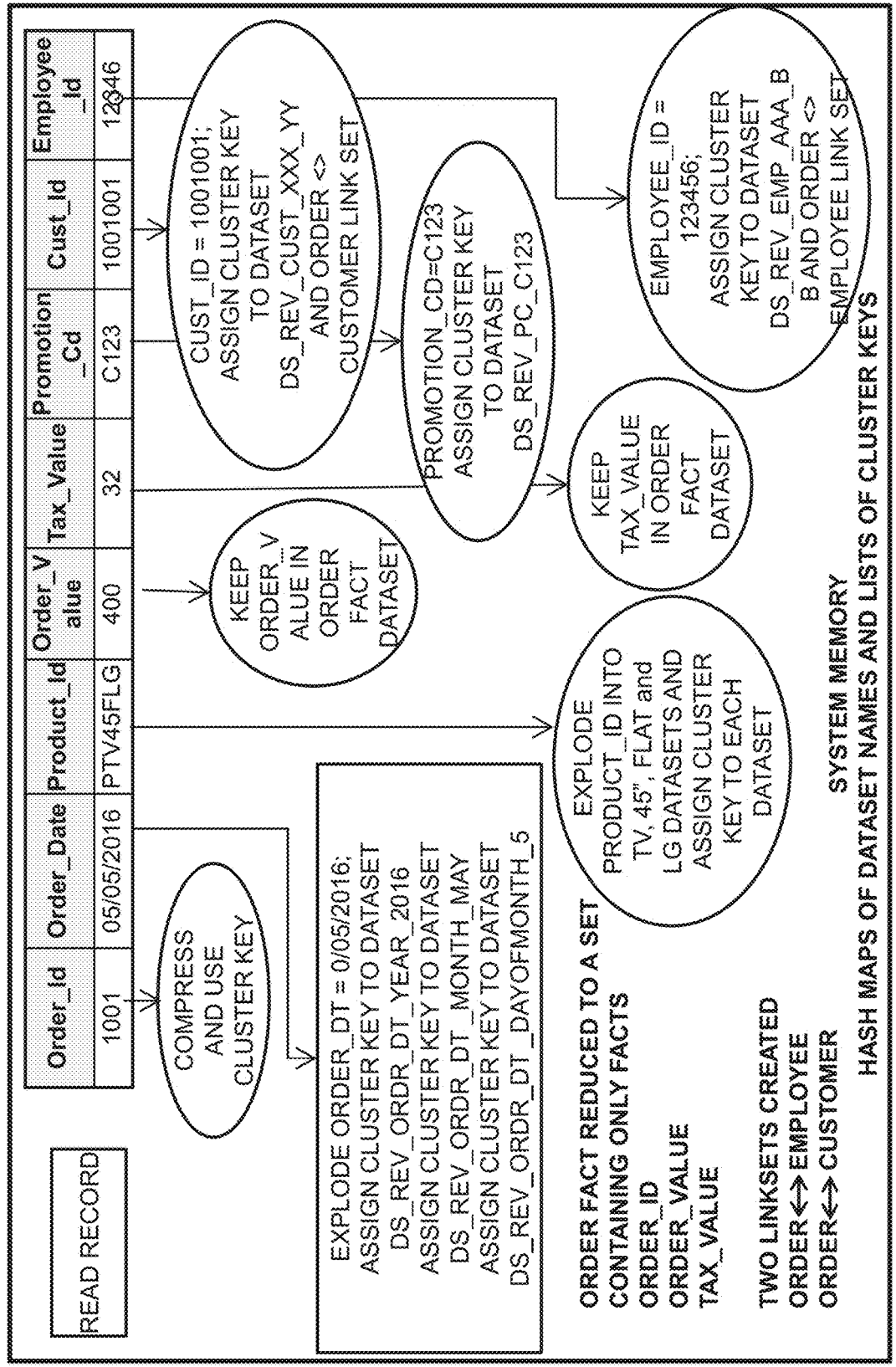
Figure 12F:
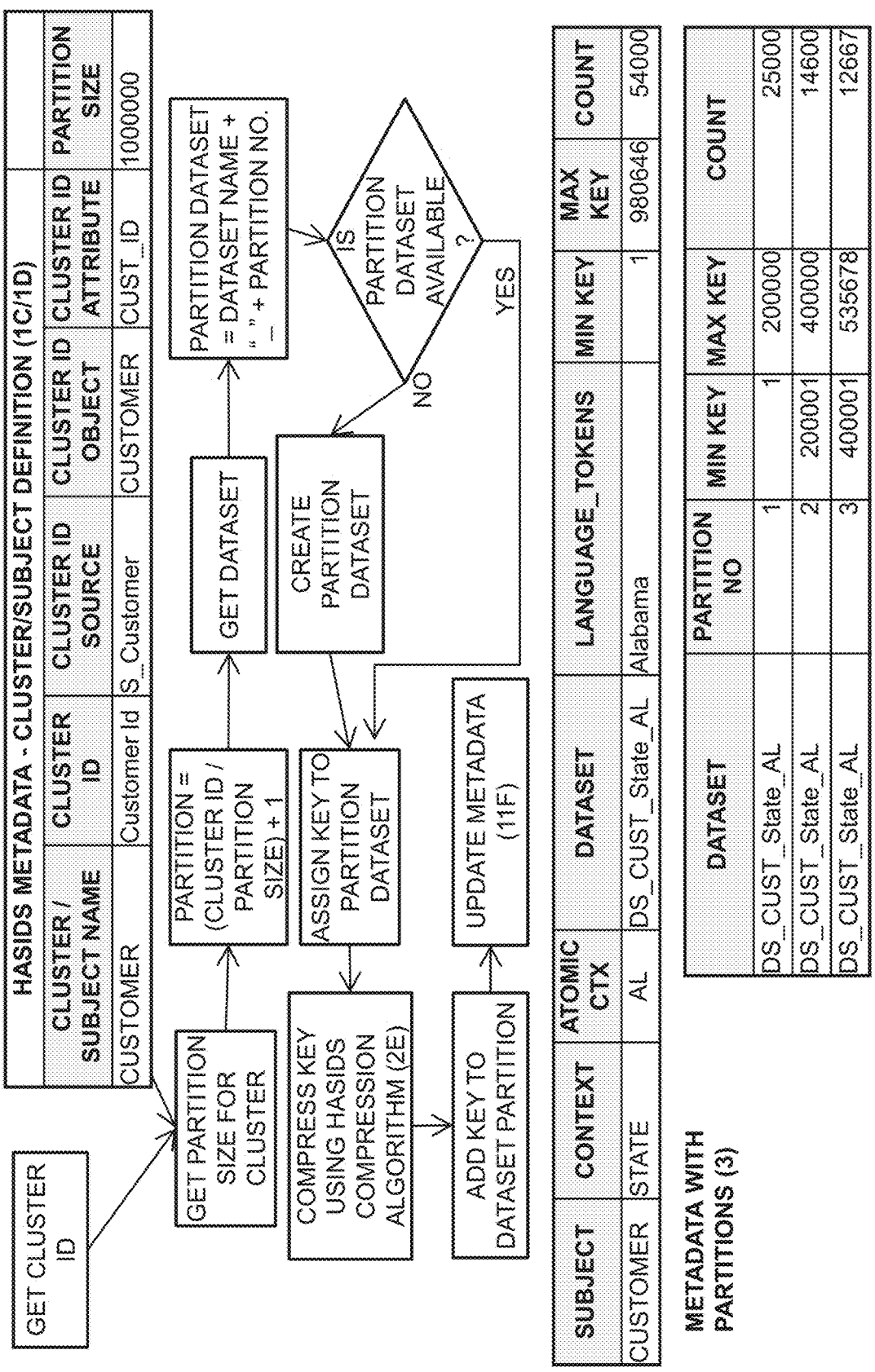

FIG. 11 shows an example process flow for atomization of data (Block 72 of FIG. 7B). The atomization process is broadly a three step process; data extraction, data transformation consisting of dimension explosion and fact reduction, and, data loading into the HASIDS datasets. These keysets are unary consisting of the cluster identifiers defined for the cluster or subject, for e.g., the unique customer identifier in the CUSTOMER relational table in an OLTP system which is defined as a primary key. All datasets in the CUSTOMER cluster or associated with the CUSTOMER subject will have these customer identifiers only as their data, in a set definition this would be a one dimension set or array of unique numbers. HASIDS administrator 1101 may control the process flow through user interface 1102.

The extraction step consists of HASIDS connecting to the source system (step 1104) and extracting the records from the source objects (step 1105). The connection is established by using interfaces 1103 comprising either the industry standard interface drivers or HASIDS custom interface drivers. The extracted record is then passed to the next step for transformation.

The transformation step is responsible for dimension explosion, fact reduction or document explosion. During the dimension explosion, each input record's cluster key is first determined (step 11A). The cluster key is a unique key associated with the record and is picked up based on the metadata definition. Next, each dimension or attribute is exploded (step 11B). Each dimension or attribute is exploded based on the rules defined in the metadata. For example, a date is broken into many components like day, month, year etc. Each of these components has a dataset associated with it. The cluster key of the record is added to each of these datasets. When the dimension is exploded out of a fact table, it is called fact reduction. As each dimension out of a fact table is exploded, the end result is a fact table with only the facts. A dimension table when exploded, does not have any residual attributes left. In case of a document, a unique key is first generated for the document in step 11A. Each word from the document is extracted from the document and the document key added to the dataset corresponding to the word. Along with the cluster key a fact is added to the document word dataset, the number of occurrences of that word in that document. Before the keys are added to the datasets, the partition associated with the dataset is determined based on the cluster key/document key range (step 11C). Only the dataset segment/partition associated with the key range is used to add the key. Before adding the key to the dataset segment/partition, the system will check for its existence and create one if none exists (step 11D).

The loading step consists of adding the cluster/document key to the identified dataset segment/partition. The key is first compressed (step 11E) using the HASIDS technique. Once the key is added to the dataset segment/partition, the metadata metrics associated with the dataset and segment/partition is updated (step 11F).

FIGS. 12A-I illustrate examples and further details of steps 11A-F discussed above in the process flow discussed with reference to FIG. 11. It is noted that within HASIDS (e.g., the key compression step 11E) all cluster keys are numbers stored in the dataset segments compressed using the HASIDS compression algorithm. Instead of typical decimal system having 10 digits; 0-9, the HASIDS numbering system has 100 digits; 0-99. These digits are derived from the UTF-8 representation, with a majority matching the ASCII set.

With the HASIDS compression technique, a 16 digit/character decimal number is reduced to 8 characters. The formula for calculating the length of an equivalent decimal number in HASIDS is length of decimal number/2+remainder. A 15 digit decimal number would therefore be 15/2+1=8 characters long in HASIDS.

Figure 13A:
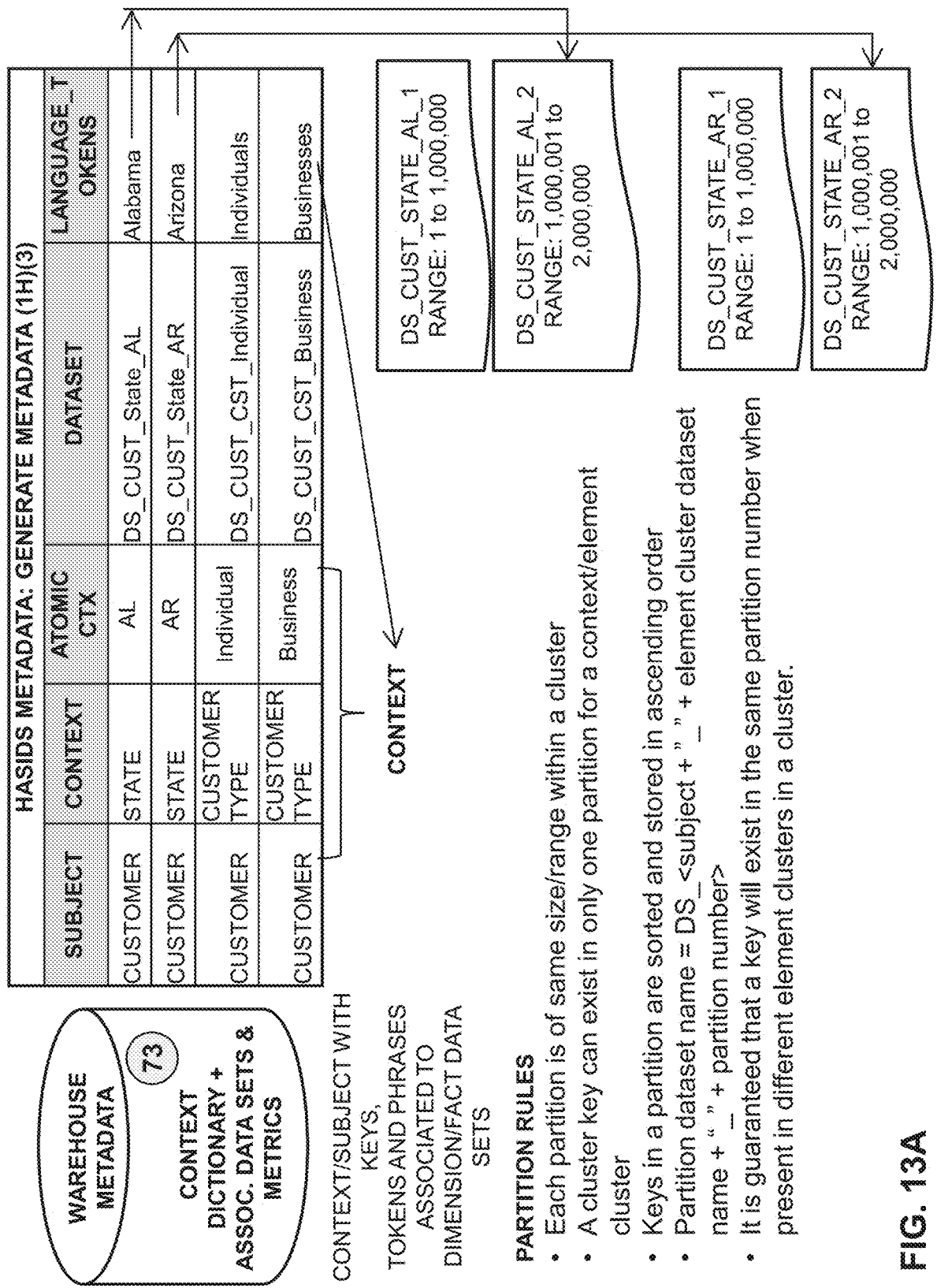
FIGS. 13A-B illustrates an overview of warehouse metadata and document metadata with dataset partitions for an example of HASIDS.
Figure 13B:
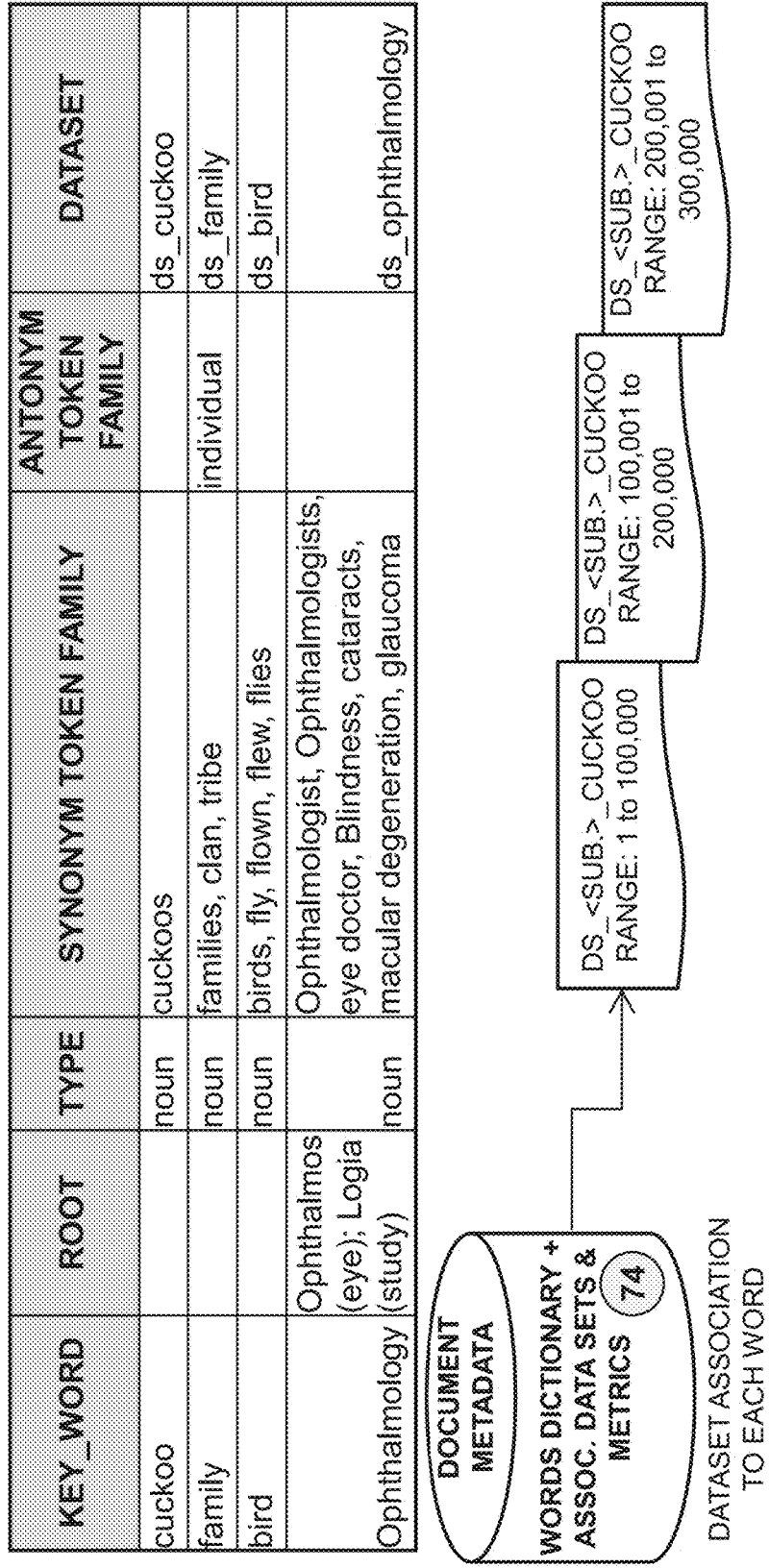

FIGS. 13A-B illustrates an overview of warehouse metadata (Block 73 of FIG. 7A) and document metadata (Block 74 of FIG. 7A).

Figure 14:
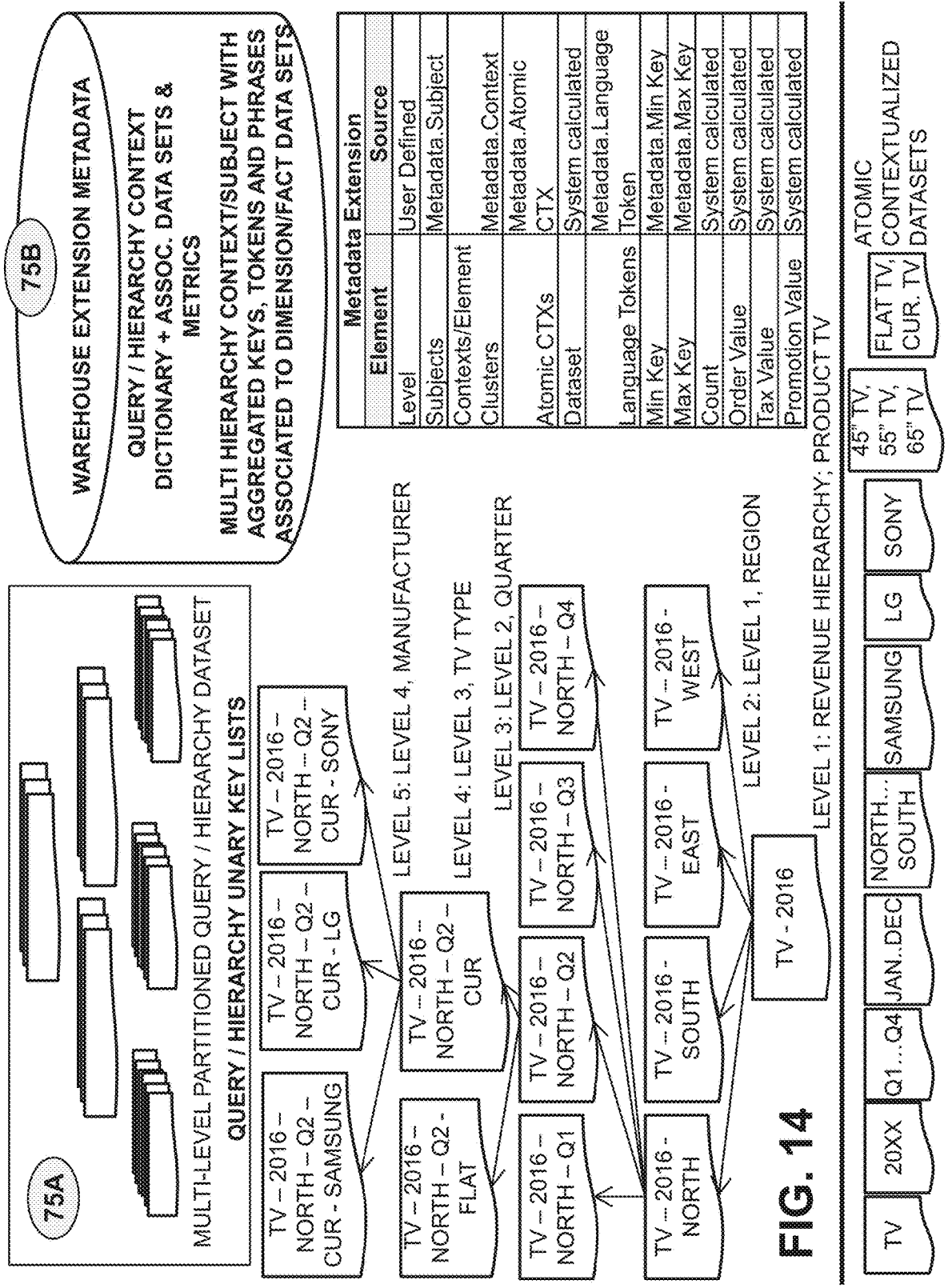
FIG. 14 illustrates an overview of the hierarchy (OLAP) and query structure for an example of HASIDS.

FIG. 14 illustrates an overview of the hierarchy (OLAP) and query structure (Block 75A of FIG. 7A). At the end of the atomization process, atomized and contextualized datasets are created within HASIDS. These metadata associated with these datasets contain the metrics of the keys within these datasets. Together, the metrics and the datasets form the core of HASIDS on which interrogation can be applied.

However, for analytical purposes, a hierarchy of pre-defined data hierarchies can be established. These data hierarchies are subject oriented. One such example is depicted which shows the hierarchy of TV sales. Level 1 is revenue of TV sales in Year 2016. This is formed by intersecting the core atomized information sets of TV sales and atomized sales of 2016. Level 2 is a data hierarchy of intersecting level 1 tv-2016 dataset with each of the atomized region datasets, North, South, East and West. Level 3 is a data hierarchy of each dataset of level 2 intersecting with each of the atomized quarter sales datasets. Similarly Level 4 hierarchy is an intersection of each of the level 3 datasets with the atomized TV type datasets; Flat, Curved etc. Level 5 datasets are created by the intersection of each of the level 4 datasets with the manufacturer atomized information sets.

The above fundamental hierarchy is one of the fundamental concepts of data analytics with roll-up and drill-down capabilities. Having atomized and contextualized data provides the flexibility to create any hierarchy of data view across one or more subjects. As each of the data hierarchies are built, the metadata associated with that hierarchy is built with metrics around the associations. This metrics in the metadata extension layer becomes the context on which operations are applied that emanate from the unconstrained data interrogation subjected by an external user/system.

When a new level has to be introduced within a hierarchy, the administrator of HASIDS can quickly clone which initially involves only the metadata referring to the original hierarchy datasets. This clone can then be modified to add a new level and generate the additional datasets as required. The new level is then progressively applied to the higher levels. Only the new level datasets and the modified higher level datasets are generated leaving the original levels intact. The user now has the capability to either keep both hierarchies by versioning them or keep the new one and drop the old one. Dropping the old one would entail dropping the metadata and only those datasets that are not part of the new hierarchy (the old higher levels before the new level was introduced). The flexibility, speed of the above operation with minimal steps is one of the major advantages of having an atomized tier of data at the lowest level which has an independent atomized context.

Figure 15:
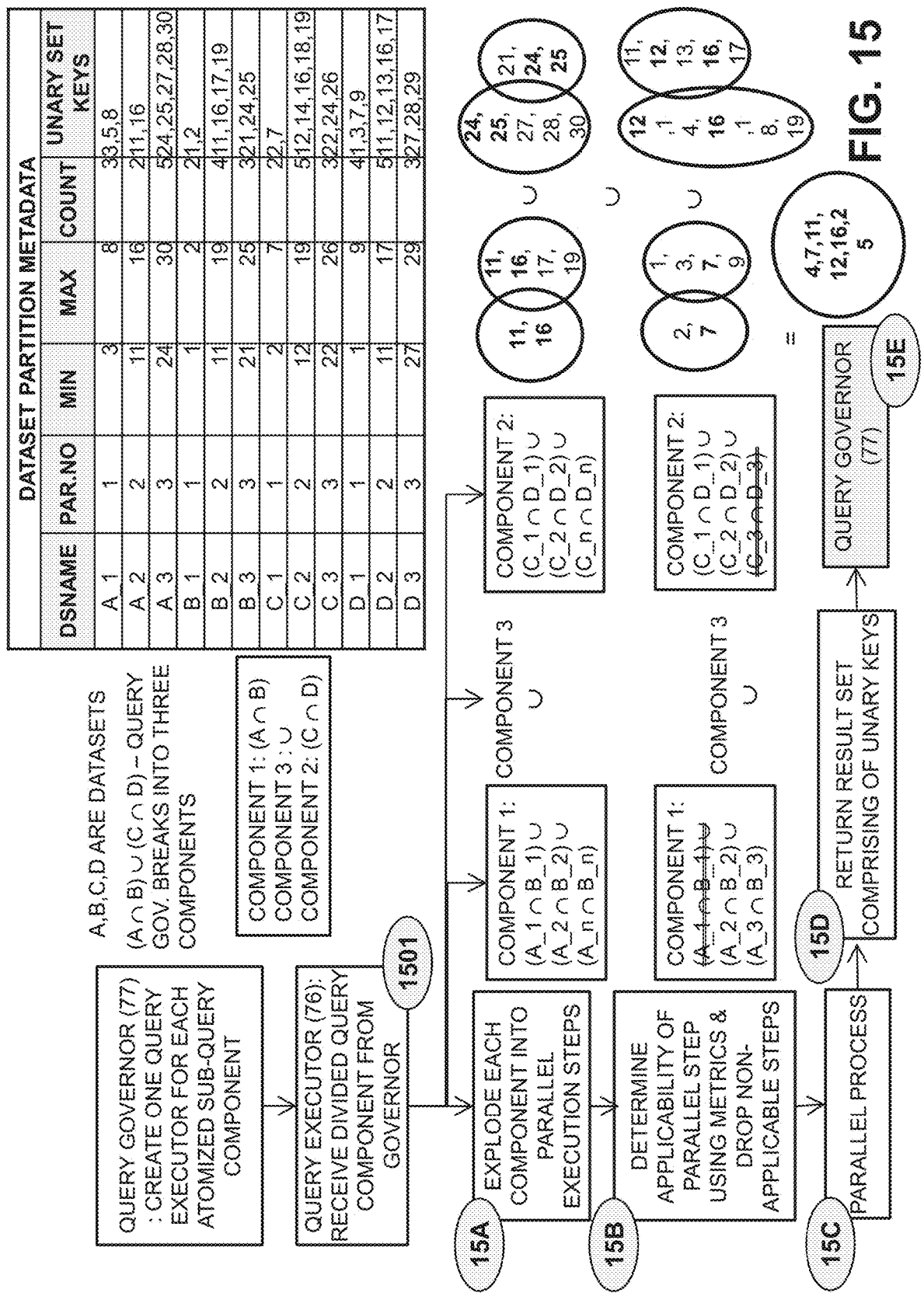
FIG. 15 illustrates a process flow pertaining to the Query Executor component for an example of HASIDS.

FIG. 15 illustrates a process flow comprising steps 15A-E pertaining to the Query Executor (Block 76 of FIG. 7B). The Query Executor receives a query sub-expression or the most atomized operation between two sets from the Query Governor (step 1501). The actual parallelized execution of a query is carried out by the Query Executor. Each sub-query or atomized component operation is broken down into operations between individual segments of the corresponding datasets. All these segment operations are run in parallel (steps 15A-D). All parallel component results are then combined into the final result set to be returned back to the Query Governor (step 15E).

When operations between each parallel segment is executed, metrics is first checked to see if the operation is valid in the first place. If the values on either side of the operation do not fall within the same range, the operation is discarded. This ensures that only valid operations based on value ranges are executed thereby reducing the number of operations upfront instead of actual blind execution and producing zero result.

An advantage of segmentation is that in normal operation mode, it is the last segment that is most volatile as new keys are added to it. As soon as the keys reach the maximum range of the segment and a new segment is created, the previous segment moves from a volatile state to a static state. Metrics collected for this segment will therefore be static (generally few changes that are not performance overheads) lending very cleanly to statistical analysis models. Therefore, isolation of volatility is one of the fundamental concepts of HASIDS.

The Query Executor 76 is a slave of the Query Governor & Optimizer component 77. The Query Executor 76 comes into existence when the Query Governor & Optimizer component 77 creates it and puts it on the execution stack. Once the Query Executor 76 completes its task, it is discarded and garbage collected.

In the above example three components are created from the original query expression. The Query Governor & Optimizer component 77 creates a Query Executor 76 for each of the three components. The first component is intersection between sets A and B. The second Query Executor executes the intersection between sets C and D. The third Query Executor combines the results from the first and second Query Executors and returns the same to the Query Governor.

Figure 16:
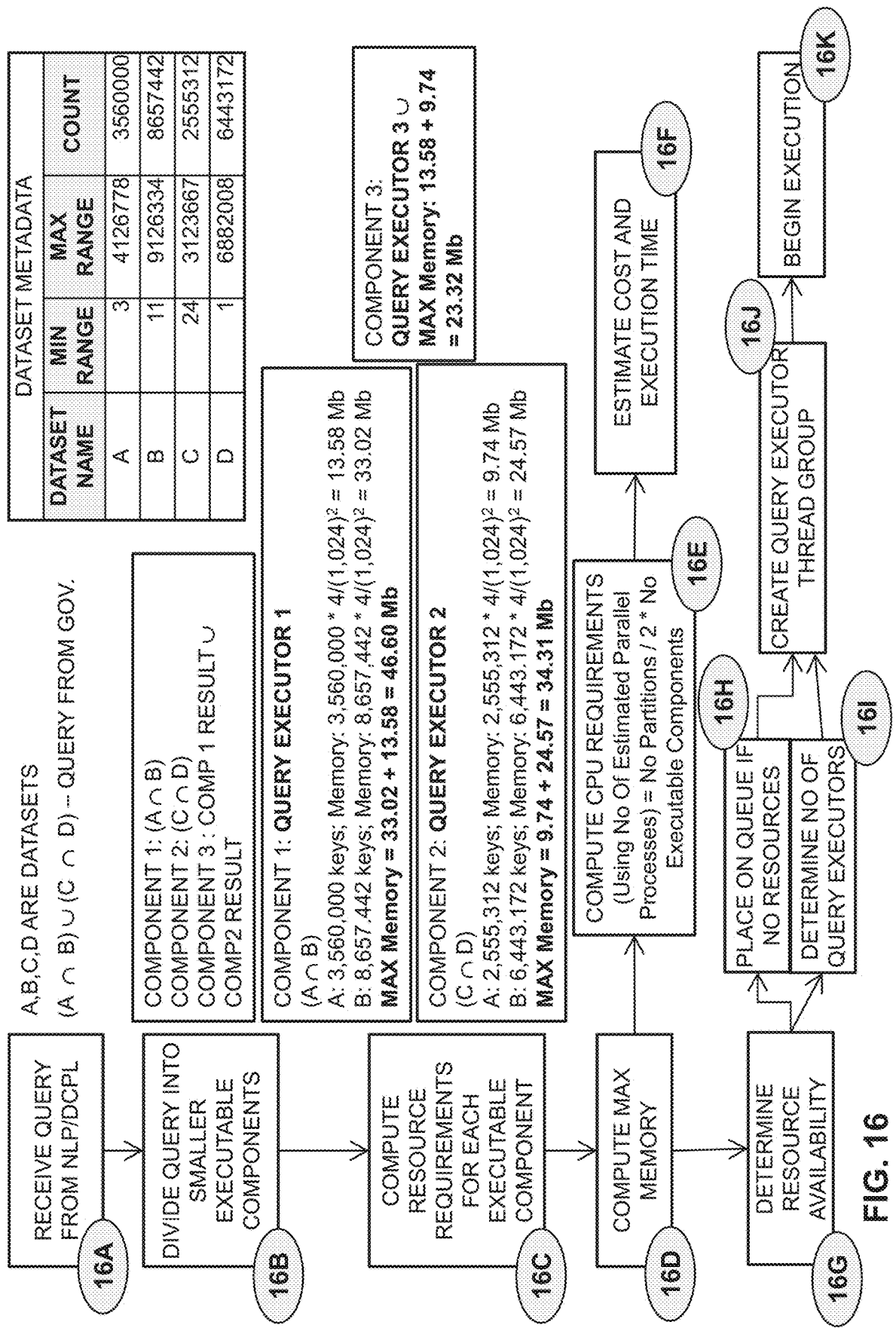
FIG. 16 illustrates a process flow pertaining to the query governor & optimizer master component for an example of HASIDS

FIG. 16 illustrates a process flow pertaining to the query governor & optimizer master component (Block 77 of FIG. 7B). The query governor & optimizer master with the slave query executor (Block 76 discussed above) form the backbone of actual dataset interactions using atomic set based actions like intersection, union and difference. The query governor 77 is responsible for tracking all resource allocations, computing free resources and determining the resource requirements for running queries, allocating priorities to them, allocating resources for their execution, placing them on queues during resource crunch and maintaining a cluster of query executors. Query executors 76 in turn take the input queries and break them into parallel processes, compute results and return the results to the governor.

The query governor & optimizer 77 is responsible for generating the execution map using resource availability as its guide. In an ideal case of complete unhindered resource availability, the number of parallel executable components would be maximum, with each executable component executed in parallel in relation to other executable components and each component in turn parallelized by the Query Executor 76 based on the number of segments. However, in practical conditions with many queries running, the optimizer would sequence the executable components or instruct the Query Executor to sequence the segment parallelism, in order to fit the entire processing within a pre-determined set of resources (memory and CPU). At the same time, as resources are freed up on completion of executing queries, freed resources are allocated back to executables on queue to complete partial allocated/running queries in order of priority.

In the above example, the Query Governor & Optimizer 77 receives the query (step 16A) breaks the query into three executable sub-queries or atomized operations (step 16A). It then creates a Query Executor for each of the query sub-components (16C-K), results of component 1/Query Executor 1 and component 2/Query Executor 2 are passed in as inputs into component 3/Query Executor 3, which in turn returns the final results back to the Query Governor.

Figure 17A:
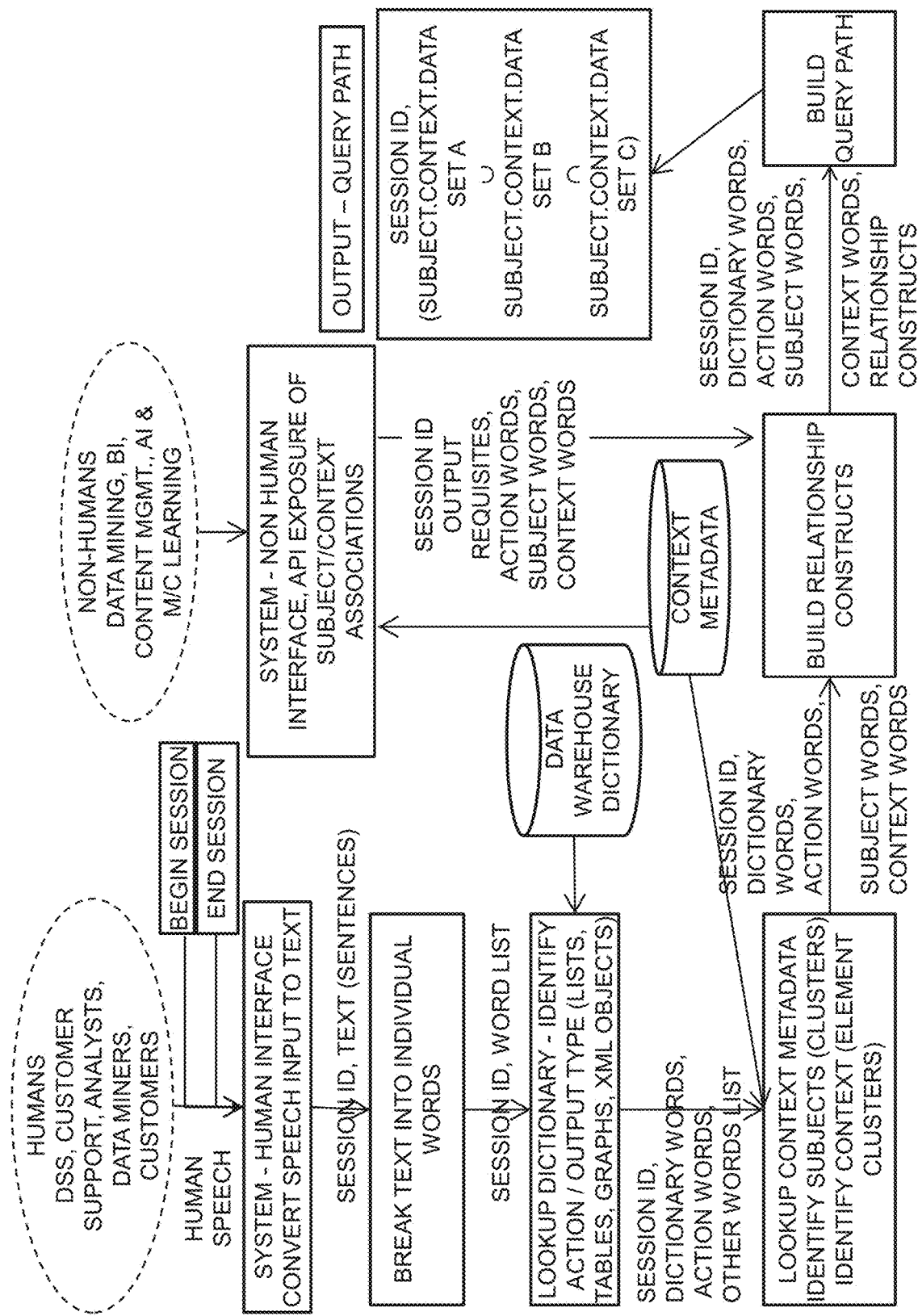
FIGS. 17A-B illustrate a data and document warehouse interrogation layer's data and process flow for an example of HASIDS.
Figure 17B:
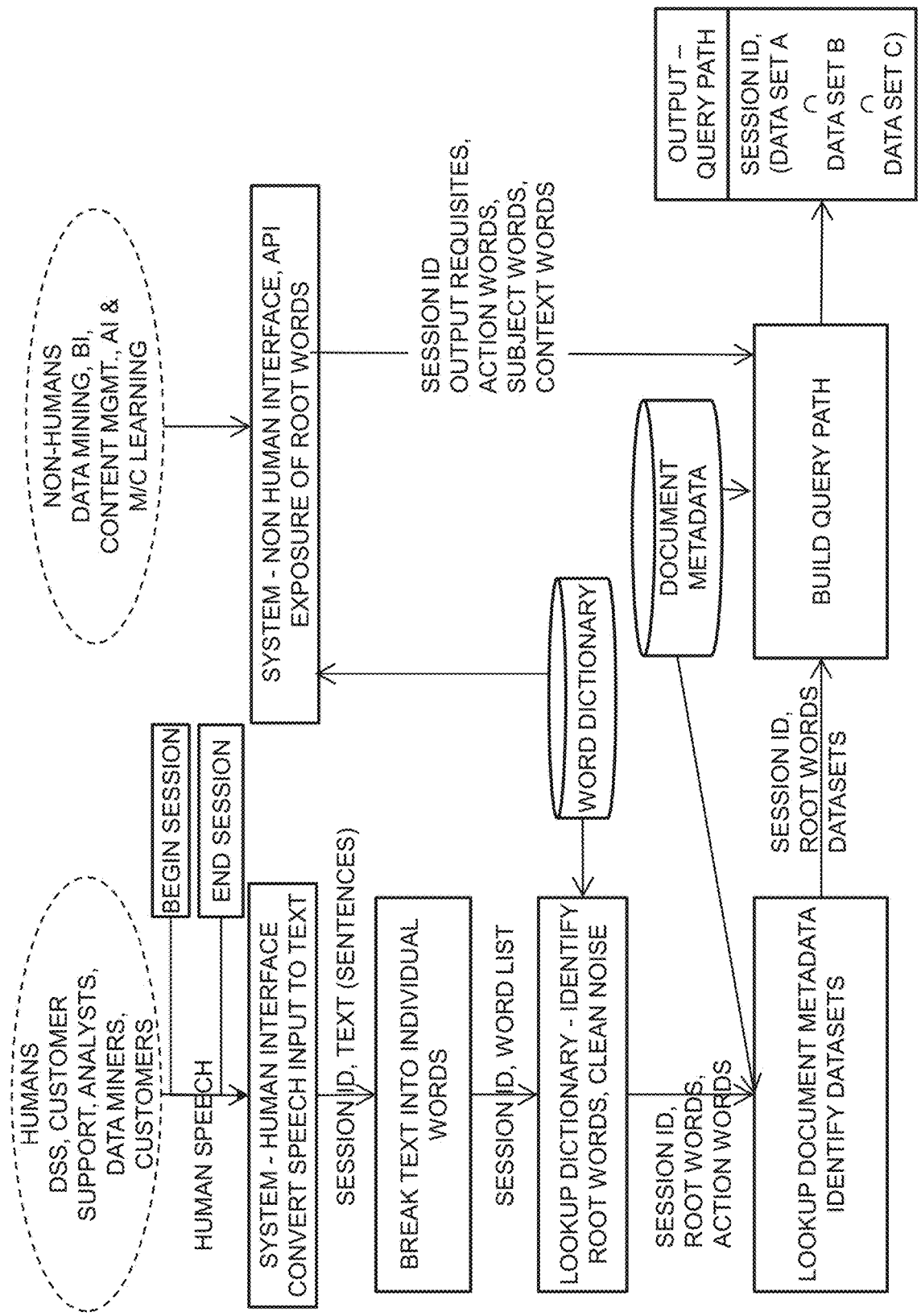

FIGS. 17A-B illustrate a data warehouse interrogation layer's data and process flow, e.g., compatible with FIG. 7C. Referring to FIG. 17A, the interrogation process flow is initiated either by a human speaking to HASIDS through a speech recognition module or by a non-human initiating interrogation using HASIDS interface that exposes the metadata through API and services.

The input speech is converted to text and the text is broken down to individual words. Once sentences are broken down into words, a cleanup process is applied in conjunction with identification of subjects, contexts, output requirements and context relationships. E.g., When a human says "Give me a list of customers born on 1st Jan 1980" to HASIDS, HASIDS processes the input to interpret a Customer subject, List of customer ids as output, 1st Day of Month Date of Birth Context, January Date of Birth context and Year 1980 Date of Birth context with a relationship that states that a customer must exist in each of the above context.

The way HASIDS determines the Output format is by looking up an output dictionary and comparing the input words to the output dictionary. The output dictionary contains words like list, table, group, chart, compare etc.

Similarly HASIDS identifies the subject by comparing the words with the Metadata and identifying the matching subjects like Customer, Revenue etc. The same process is applied for the context as well by matching the element cluster keys and tokens. Any word that does not match any of the dictionaries or metadata is treated as irrelevant for processing and is cleaned out.

Once the above has been identified, relationship constructs are created. In this case it is the intersection of data associated with the above three contexts resulting in a query expression that denotes the same. This query expression is provided to the Query Governor & Optimizer for processing.

Referring now to FIG. 17B, the interrogation process flow is initiated either by a human speaking to HASIDS through a speech recognition module or by a non-human initiating interrogation using HASIDS interface that exposes the metadata through API and services.

The input speech is converted to text and the text is broken down to individual words. Once sentences are broken down into words, a cleanup process is applied in conjunction with identification of words against the dictionaries of key words, their roots, synonyms and token words.

Once the above has been identified, relationship constructs are created. In this case it is the intersection of data associated with the all the matching words to narrow down the documents that best reflect the user context. HASIDS uses document metadata metrics to determine the most probable set of documents matching the user context. This includes the word count metrics stored in each dataset associated with the document keys.

FIGS. 18A-E illustrate representative and illustrative examples of using HASIDS, e.g., for various aspects of data analysis and interrogation as discussed above.

FIGS. 19A-B illustrates a data model pertaining to an exemplary HASIDS implementation as discussed above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for data atomization, organization, and querying thereof using HASIDS. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of managing data across a plurality of physical computer servers, the method comprising:
receiving, by at least one processor, a source set of data records, each data record comprising one or more rows and one or more columns, the one or more columns representing one or more attributes, and the one or more rows storing values of the one or more attributes;
atomizing, by the at least one processor, the source set of data records, wherein the atomizing comprises splitting at least one attribute of the one or more attributes into a plurality of attributes and splitting the values of the at least one attribute into a plurality of columns corresponding to the plurality of attributes;
distributing, by the at least one processor, the one or more columns and the plurality of columns across the plurality of physical computer servers, wherein only positions of the values of the one or more attributes in the one or more columns and the values of the plurality of attributes in the plurality of columns act as indices to the values of the one or more attributes and the values of the plurality of attributes;
associating, by the at least one processor, a common key with each row of the one or more columns and the plurality of columns; and
generating, by the at least one processor, a plurality of unary keysets, each unary keyset corresponding to one of the one or more attributes and the plurality of attributes, and each unary keyset being single-dimensional and comprising one or more common keys.

2. The method of claim 1, further comprising linking the plurality of unary keysets with the common key, and forming a cluster of unary keysets comprising the plurality of unary keysets with the common key.

3. The method of claim 2, further comprising querying the cluster of unary keysets with set operators comprising one or more of intersection, union, subset, or difference operators.

4. The method of claim 3, further comprising performing one or more of a sequence of queries or changing a query during run-time of an existing query, based on context changes related to interrogation of the set of data records.

5. The method of claim 2, further comprising forming a link set comprising mappings between keys of two or more clusters, including a mapping between a first cluster key of a first cluster of unary keysets and a second cluster key of a second cluster of unary keysets, and querying at least the first and the second clusters using the mapping in the link set.

6. The method of claim 1, wherein the common key and one or more other keys in each of the unary keysets are stored in serial order, the method further comprising accessing the unary keysets based on the serial order without further indexing the unary keysets.

7. The method of claim 6, comprising determining that range limits associated with the ordered unary keysets are satisfied prior to executing querying operations.

8. The method of claim 1, comprising querying two or more unary keysets in parallel.

9. The method of claim 8, further comprising determining resources in a query governor and running the parallel queries based on available resources in a system for querying.

10. The method of claim 1, further comprising isolating the plurality of unary keysets for one or more of security or privacy, the isolating comprising one or more of: isolating data elements of the one or more attributes and the plurality of attributes, isolating operations on the data elements of the one or more attributes and the plurality of attributes, isolating dimensions between two or more unary keysets, isolating new keys added to a unary keyset, or isolating queries directed to the one or more unary keysets.

11. The method of claim 1, further comprising converting natural language into the source set of data records based on context associated with one or more of tokens, subjects, or phrases representing semantics occurring in the natural language.

12. The method of claim 1, further comprising converting structured or unstructured sources including one or more of a table, record, documents, message objects, or webpage text into the source set of data records.

13. The method of claim 1, further comprising storing one or more keys of the plurality of unary keysets, facts, or attributes of the one or more attributes and the plurality of attributes, as a single block of logical work unit, wherein the single block of logical work unit represents a record for online transaction processing.

14. The method of claim 1, further comprising storing two or more unary keysets in two or more memory locations, wherein the two or more memory locations comprise segments or partitions on one or more disks of the plurality of physical computer servers.

15. The method of claim 1, further comprising storing the plurality of unary keysets in a Bit Offset Structure, wherein the Bit Offset Structure comprises a sequence of single-byte binary values, and wherein the common key is identified by a location of a byte associated with the common key in the sequence.

16. The method of claim 15, further comprising combining two or more sets of unary keysets stored in two or more Bit Offset Structures into a single set, wherein the single-byte binary values in the single set are replaced with unique character encodings.

17. The method of claim 1, further comprising storing two or more clusters in federated data warehouses, wherein each of the two or more clusters comprise one or more of the plurality of unary keysets, the two or more clusters associated with two or more contexts, and wherein the federated data warehouses comprise storage locations in two or more geographical areas.

18. The method of claim 1, wherein the at least one attribute cannot be split into any additional attributes.

19. A database management system for managing data across a plurality of physical computer servers comprising:
a memory storing instructions; and
at least one processor communicatively coupled to the memory, wherein the instructions, when executed by the at least one processor, cause the at least one processor to:
receive a source set of data records, each data record comprising one or more rows and one or more columns, the one or more columns representing one or more attributes, and the one or more rows storing values of the one or more attributes;
atomize the source set of data records by splitting at least one attribute of the one or more attributes into a plurality of attributes and splitting the values of the at least one attribute into a plurality of columns corresponding to the plurality of attributes;
distribute the one or more columns and the plurality of columns across the plurality of physical computer servers, wherein only positions of the values of the one or more attributes in the one or more columns and the values of the plurality of attributes in the plurality of columns act as indices to the values of the one or more attributes and the values of the plurality of attributes;
associate a common key with each row of the one or more columns and the plurality of columns; and
generate a plurality of unary keysets, each unary keyset corresponding to one of the one or more attributes and the plurality of attributes, and each unary keyset being single-dimensional and comprising the common key.

20. The apparatus of claim 19, further comprising means for querying the plurality of unary keysets with set operators comprising one or more of intersection, union, subset, or difference operators.

* * * * *